US010004061B2

(12) United States Patent
Iwami

(10) Patent No.: US 10,004,061 B2
(45) Date of Patent: Jun. 19, 2018

(54) INFORMATION PROCESSING DEVICE AND INFORMATION PROCESSING METHOD

(71) Applicant: SONY CORPORATION, Tokyo (JP)

(72) Inventor: Hideki Iwami, Saitama (JP)

(73) Assignee: SONY CORPORATION, Tokyo (JP)

(*) Notice: Subject to any disclaimer, the term of this patent is extended or adjusted under 35 U.S.C. 154(b) by 79 days.

(21) Appl. No.: 15/037,246

(22) PCT Filed: Oct. 6, 2015

(86) PCT No.: PCT/JP2015/078390
§ 371 (c)(1),
(2) Date: May 17, 2016

(87) PCT Pub. No.: WO2016/084485
PCT Pub. Date: Jun. 2, 2016

(65) Prior Publication Data
US 2016/0353425 A1    Dec. 1, 2016

(30) Foreign Application Priority Data

Nov. 27, 2014  (JP) .................................. 2014-239444
Apr. 17, 2015  (JP) .................................. 2015-085320

(51) Int. Cl.
*H04W 72/04* (2009.01)
*H04N 21/436* (2011.01)
(Continued)

(52) U.S. Cl.
CPC .... *H04W 72/0406* (2013.01); *H04N 21/4126* (2013.01); *H04N 21/436* (2013.01);
(Continued)

(58) Field of Classification Search
None
See application file for complete search history.

(56) References Cited

U.S. PATENT DOCUMENTS

2011/0107388 A1*  5/2011  Lee .................... H04L 65/1066
                                                          725/118
2013/0002949 A1   1/2013  Raveendran et al.
(Continued)

FOREIGN PATENT DOCUMENTS

EP    2 682 859 A2      1/2014
JP    2008-278388 A    11/2008
(Continued)

OTHER PUBLICATIONS

Extended European Search Report dated Feb. 2, 2017 in Patent Application No. 15862151.6.
(Continued)

*Primary Examiner* — Kibrom T Hailu
(74) *Attorney, Agent, or Firm* — Oblon, McClelland, Maier & Neustadt, L.L.P.

(57) ABSTRACT

To improve manipulability.
An information processing device includes a wireless communication unit and a control unit. The wireless communication unit performs real-time image transmission with at least one sink device according to a Wi-Fi CERTIFIED Miracast specification. The control unit performs control related to the real-time image transmission based on control information for controlling the information processing device according to the Wi-Fi CERTIFIED Miracast specification, the control information being received from the at least one sink device. The control unit performs control such that on-off switching of a UIBC for transmitting manipulation information in the sink device that has transmitted the control information is performed when a plurality of pieces of control information are received.

13 Claims, 38 Drawing Sheets

(51) Int. Cl.
*H04W 80/06* (2009.01)
*H04W 84/12* (2009.01)
*H04N 21/41* (2011.01)
*H04N 21/4363* (2011.01)

(52) U.S. Cl.
CPC . *H04N 21/43615* (2013.01); *H04N 21/43637* (2013.01); *H04W 80/06* (2013.01); *H04W 84/12* (2013.01)

(56) References Cited

U.S. PATENT DOCUMENTS

| | | | | |
|---|---|---|---|---|
| 2013/0179605 A1* | 7/2013 | Huang | ................ | H04L 65/4092 710/20 |
| 2013/0304794 A1 | 11/2013 | Verma et al. | | |
| 2014/0009394 A1 | 1/2014 | Lee et al. | | |
| 2014/0132536 A1* | 5/2014 | Ikenaga | ................ | G06F 3/0488 345/173 |
| 2014/0210693 A1* | 7/2014 | Bhamidipati | ....... | H04L 65/4092 345/2.3 |
| 2014/0331263 A1* | 11/2014 | Smadi | ................ | H04N 21/4126 725/81 |
| 2015/0350288 A1* | 12/2015 | Verma | .............. | H04N 21/43637 709/219 |
| 2015/0363153 A1 | 12/2015 | Kato et al. | | |
| 2017/0171892 A1* | 6/2017 | Lee | ........................ | H04W 76/02 |

FOREIGN PATENT DOCUMENTS

| | | |
|---|---|---|
| JP | 2014-506082 A | 3/2014 |
| JP | 2014-507862 A | 3/2014 |
| JP | 2014-096074 A | 5/2014 |
| WO | WO 2014/115387 A1 | 7/2014 |

OTHER PUBLICATIONS

WiFi Alliance: "Wi-Fi Certified Miracast (TM): Extending the Wi-Fi Experience to Seamless Video Display", Internet Citation, XP002700078, Sep. 19, 2012, pp. 1-18, Retrieved from the Internet: URL:https://www.wi-fi.org/sites/default/files/uploads/wp_Miracast_Industry_20120919.pdff [retrieved on Jul. 4, 2013].
International Search Report dated Dec. 28, 2015 for PCT/JP2015/078390 filed on Oct. 6, 2015 (with translation of category of cited documents).

* cited by examiner

FIG. 4

MANAGEMENT INFORMATION RETENTION UNIT
390

| 391 | 392 | 393 RADIO WAVE PROPAGATION MEASUREMENT INFORMATION | | | | | 394 | 395 | 396 | 397 | 398 |
|---|---|---|---|---|---|---|---|---|---|---|---|
| TERMINAL IDENTIFICATION INFORMATION | FREQUENCY CHANNEL | PER | BER | NUMBER OF RETRANS- MISSIONS OF PACKETS | THROUGHPUT | FRAME DROP | SIR (RSSI) | DEVICE INFORMATION | BAND USE LEVEL | DISPLAY FORM | STANDBY OR WAKE-UP | MULTI- RECEPTION DIVERSITY CORRES- PONDENCE |
| DSC200 | 60GHz | ... | ... | | | ... | ... | MOBILE | 20Mbps | SUB (PERIPHERAL CHANNEL) | STANDBY | NO |
| DR400 | 2.4GHz | ... | ... | | | ... | ... | STATIONARY | 20Mbps | MAIN (MIDDLE CHANNEL) | WAKE-UP | YES |

FIG. 5
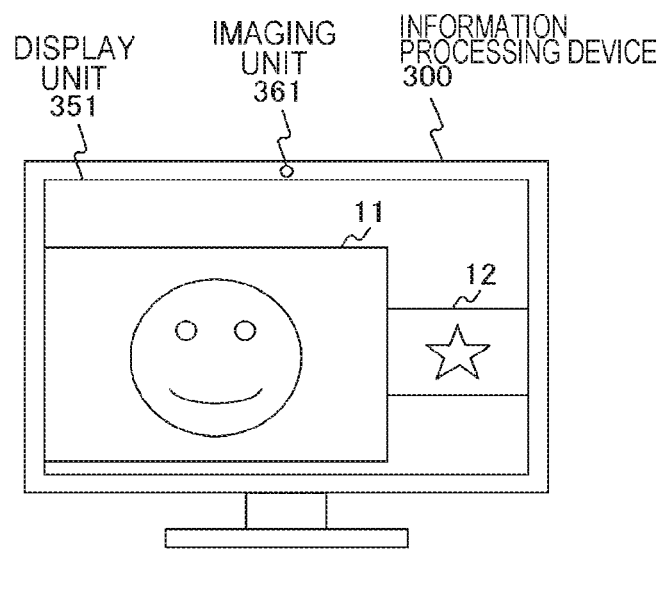
a
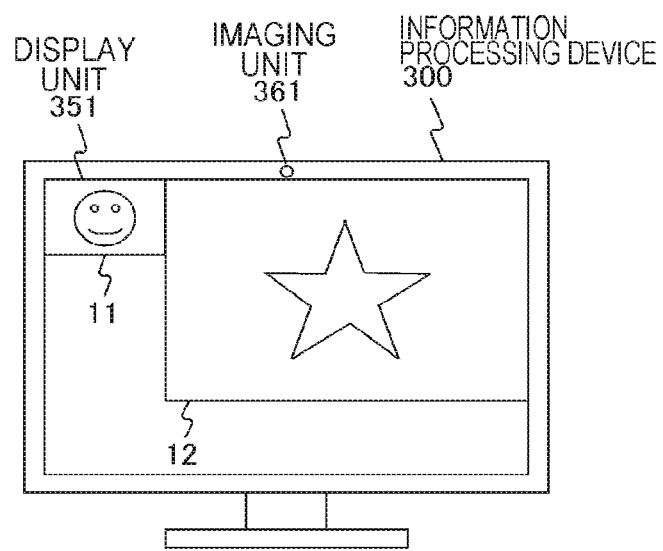
b

ON-OFF CONTROL EXAMPLE OF Forward Channel

ON-OFF CONTROL EXAMPLE OF Forward Channel

COMMUNICATION EXAMPLE WHEN REQUEST FOR DISPLAY POSITION OF SINK DEVICE IS PERFORMED THROUGH Capability Negotiation

FIG. 20
COMMUNICATION EXAMPLE OF SETTING Capabilities
OF UIBC AND WebSocket SEPARATELY
SETTING EXAMPLE OF UIBC
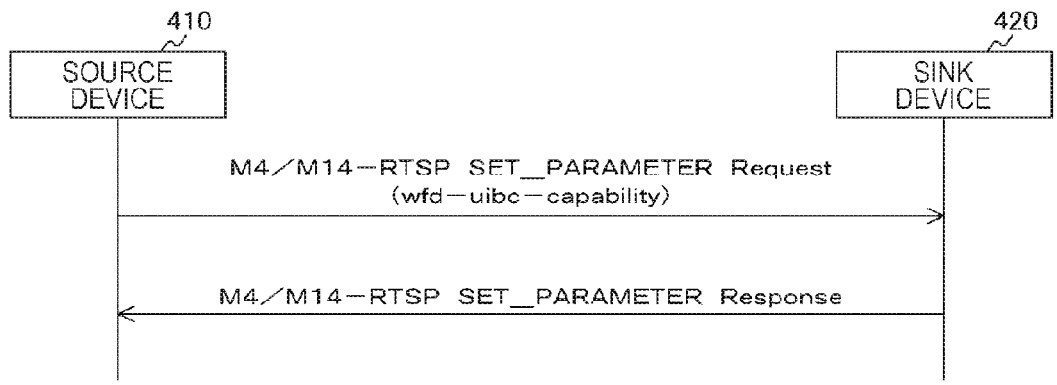
a
COMMUNICATION EXAMPLE OF REQUESTING
CONNECTION Enable FROM SOURCE DEVICE
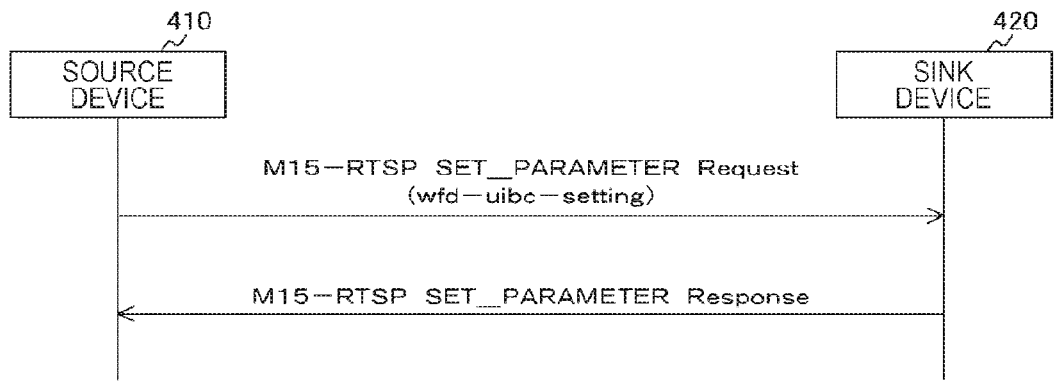
b

FIG. 21
COMMUNICATION EXAMPLE OF SETTING Capabilities
OF UIBC AND WebSocket SEPARATELY
COMMUNICATION EXAMPLE OF REQUESTING
FROM SINK DEVICE AFTER SETTING OF UIBC
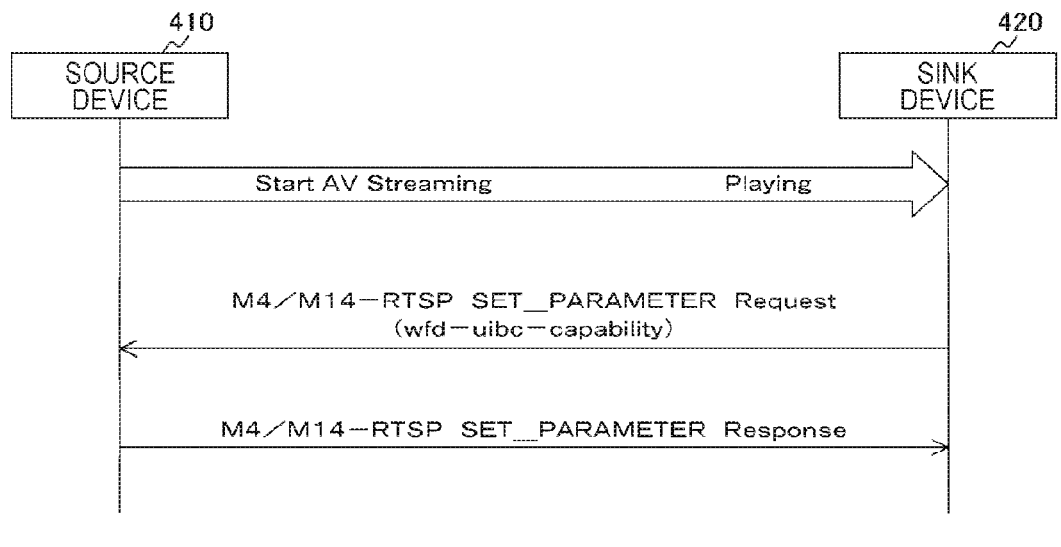
a
COMMUNICATION EXAMPLE OF REQUESTING
CONNECTION Enable FROM SINK DEVICE
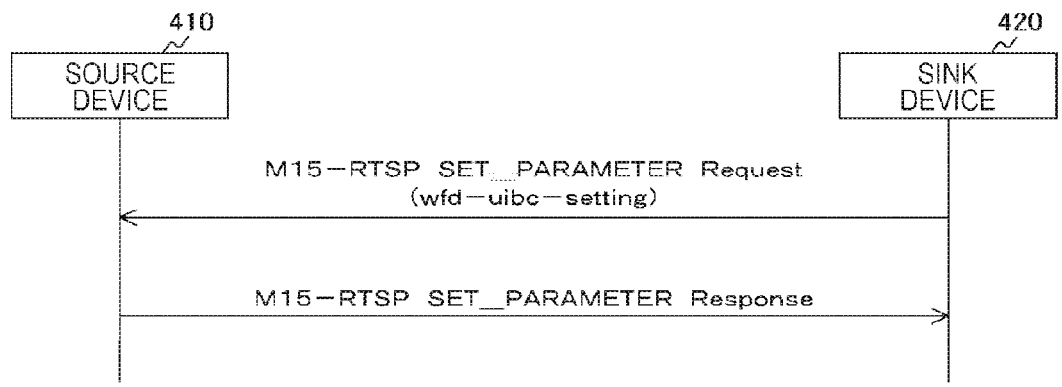
b

FIG. 22
COMMUNICATION EXAMPLE OF SETTING
Capabilities OF UIBC AND WebSocket SEPARATELY
SETTING EXAMPLE OF WebSocket
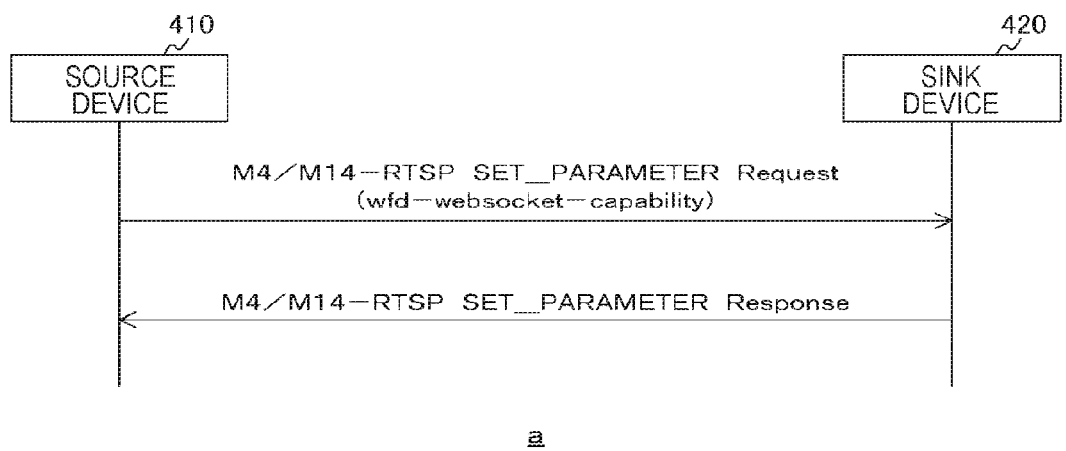
a
COMMUNICATION EXAMPLE OF REQUESTING
CONNECTION Enable FROM SOURCE DEVICE
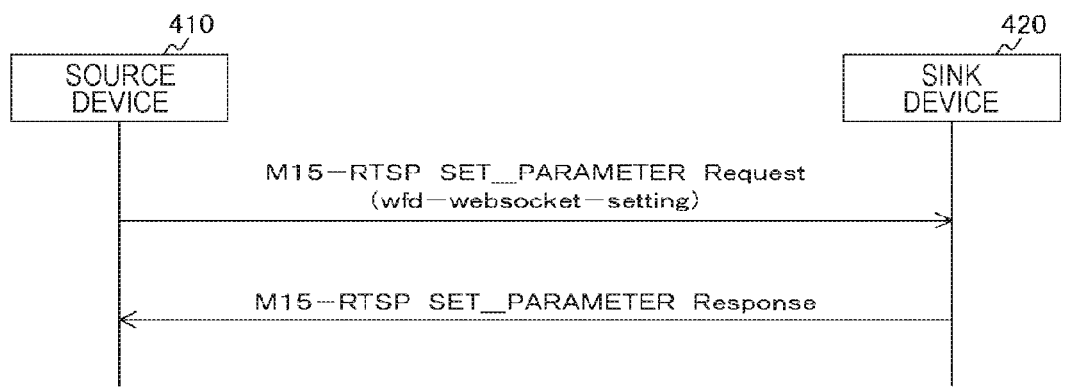
b

FIG. 23
COMMUNICATION EXAMPLE OF SETTING
Capabilities OF UIBC AND WebSocket SEPARATELY
COMMUNICATION EXAMPLE OF REQUESTING
FROM SINK DEVICE AFTER SETTING OF WebSocket
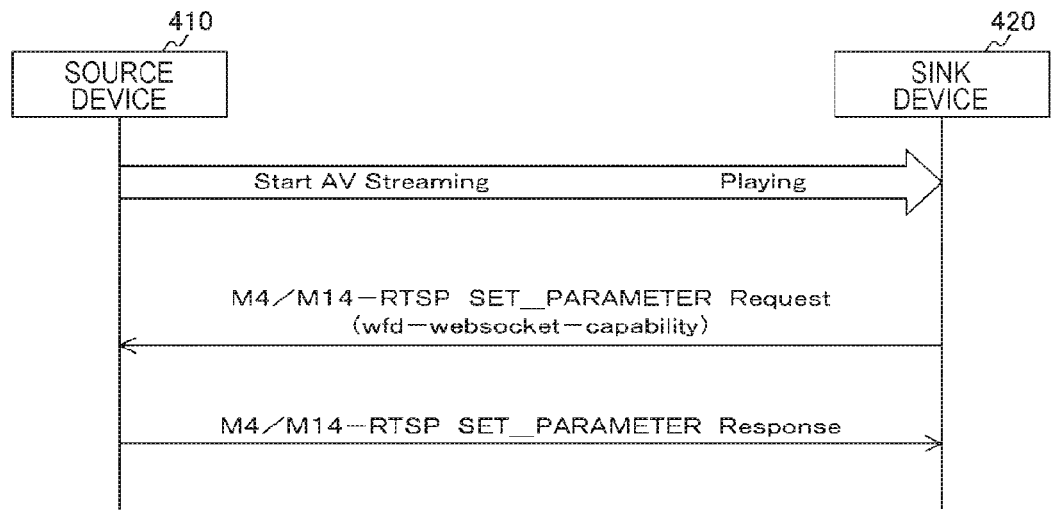
a
COMMUNICATION EXAMPLE OF REQUESTING
CONNECTION Enable FROM SINK DEVICE
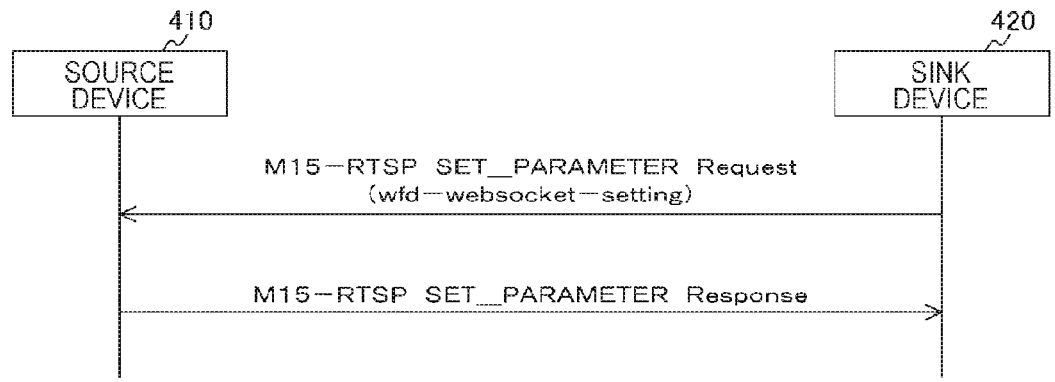
b

FIG. 25
FRAME FORMAT EXAMPLE OF UIBC (EXAMPLE OF Generic Input)

| Field | Size(Octet) | Value |
|---|---|---|
| Generic Input Type ID | 1 | Input type such as Zoom In, Scroll, etc. See Table 4-5 |
| Length | 2 | Length of the following fields in octets |
| Describe | Variable | The details of the user inputs | a

| Generic Inputs Type ID | Notes |
|---|---|
| 0 | Left Mouse Down/Touch DoWn |
| 1 | Left Mouse Up/Touch Up |
| 2 | Mouse Move/Touch Move |
| 3 | Key Down |
| 4 | Key Up |
| 5 | Zoom |
| 6 | Vertical Scroll |
| 7 | Horizontal Scroll |
| 8 | Rotate |
| 9—255 | Reserved | b

| Field | Size(Octet) | Notes |
|---|---|---|
| Number of pointers (n) | 1 | Number of pointers of a multi-touch motion event. When set to 0x01, it indicates a single-touch motion event. |
| For i = 1 : n { | | |
| Pointer ID | 1 | The identification number of this pointer. The value lies in [0,1,···] |
| X—coordinate | 2 | X—coordinate for mouse/touch down event normalized with respect to the negotiated resolution of the video stream. |
| Y—coordinate | 2 | Y—coordinate for mouse/touch down event normalized with respect to the negotiated resolution of the video stream. |
| } | | | c

INFORMATION PROCESSING DEVICE AND INFORMATION PROCESSING METHOD

TECHNICAL FIELD

The present technology relates to an information processing device. Particularly, the present technology relates to an information processing device, a communication system, an information processing method, and a program causing a computer to execute the method in which various kinds of information are exchanged using wireless communication.

BACKGROUND ART

In the related art, wireless communication technologies for exchanging various kinds of data using wireless communication are known. For example, a wireless communication technology for exchanging various kinds of information through wireless communication between two information processing devices has been proposed (for example, see Patent Literature 1).

CITATION LIST

Patent Literature

Patent Literature 1: JP 2008-278388A

SUMMARY OF INVENTION

Technical Problem

According to the above-described technologies of the related art, various kinds of information can be interchanged between two information processing devices through wireless communication even when connection is not established by wired lines. For example, an image based on image data transmitted from a transmission side information processing device can be displayed on a display unit of a reception side information processing device.

When the reception side information processing device displays the image through the display unit based on the image data transmitted from the transmission side information processing device as described above, the user is considered to perform a manipulation in the transmission side or reception side information processing device. In this regard, it is important to improve manipulability of the user.

The present technology was made in light of the foregoing, and it is an object of the present technology to improve manipulability.

Solution to Problem

The present technology was made to solve the problem, and a first aspect thereof is an information processing device, an information processing method thereof, and a program for causing a computer to execute the information processing method, the information processing device including: a wireless communication unit configured to perform real-time image transmission with at least one sink device according to a wireless fidelity (Wi-Fi) CERTIFIED Miracast specification; and a control unit configured to perform control related to the real-time image transmission based on control information for controlling the information processing device according to the Wi-Fi CERTIFIED Miracast specification, the control information being received from the at least one sink device. The control unit performs control such that on-off switching of a user input back channel (UIBC) for transmitting manipulation information in the sink device that has transmitted the control information is performed when a plurality of pieces of control information are received. Thus, there is an operation in which on-off switching of a user input back channel (UIBC) for transmitting manipulation information in the sink device that has transmitted the control information is performed when a plurality of pieces of control information are received.

According to the first aspect, the wireless communication unit may receive the control information on a transmission control protocol (TCP) session generated between the information processing device and the sink device. Thus, there is an operation in which the control information is received on a transmission control protocol (TCP) session generated between the information processing device and the sink device.

According to the first aspect, the control of the on-off switching may be control of any one of a connection, a disconnection, a start, a stop, validation, and invalidation. Thus, there is an operation in which the control of the on-off switching is control of any one of a connection, a disconnection, a start, a stop, validation, and invalidation.

According to the first aspect, the control unit may perform control such that the UIBC is validated for a first sink device among the at least one sink device, and the UIBC is invalidated for a second sink device. Thus, there is an operation in which the UIBC is validated for a first sink device among the at least one sink device, and the UIBC is invalidated for a second sink device.

According to the first aspect, the wireless communication unit may give a notification indicating that the UIBC is set to be valid to the first sink device, and may give a notification indicating that the UIBC is set to be invalid to the second sink device. Thus, there is an operation in which a notification indicating that the UIBC is set to be valid is given to the first sink device, and a notification indicating that the UIBC is set to be invalid is given to the second sink device.

According to the first aspect, the control information may be a GET_PARAMETER Response. The notification may be transmitted as SET_PARAMETER. Thus, there is an operation in which the control information is a GET_PARAMETER Response, and the notification is transmitted as SET_PARAMETER.

According to the first aspect, the control unit may perform control such that the UIBC is validated for a first sink device among the at least one sink device, and the UIBC is invalidated for all the sink devices except the first sink device among the sink devices that have transmitted the control information. Thus, there is an operation in which the UIBC is validated for a first sink device among the at least one sink device, and the UIBC is invalidated for all the sink devices except the first sink device among the sink devices that have transmitted the control information.

According to the first aspect, the wireless communication unit may receive a plurality of pieces of manipulation information associated with ID information as UIBC information. The control unit may identify corresponding manipulation information with reference to an ID header included in the ID information. Thus, there is an operation in which a plurality of pieces of manipulation information associated with ID information are received as UIBC information, and corresponding manipulation information is identified with reference to an ID header included in the ID information.

According to the first aspect, the at least one sink device may include a plurality of input devices. The plurality of pieces of manipulation information may be transmitted from the plurality of input devices via the at least one sink device. Thus, there is an operation in which the plurality of pieces of manipulation information are transmitted from the plurality of input devices via the at least one sink device.

According to the first aspect, the wireless communication unit may set one port for a bundle of the plurality of pieces of UIBC information, and may perform communication. Thus, there is an operation in which one port is set for a bundle of the plurality of pieces of UIBC information, and communication is performed.

According to the first aspect, the wireless communication unit may perform communication as a source device. Thus, there is an operation in which communication as a source device is performed.

A second aspect of the present technology is an information processing device, an information processing method thereof, and a program for causing a computer to execute the information processing method, the information processing device including: a wireless communication unit configured to perform real-time image transmission with at least one source device according to a wireless fidelity (Wi-Fi) CERTIFIED Miracast specification; and a display unit configured to display an image received through the real-time image transmission. The wireless communication unit receives control information related to turning-on or off of a user input back channel (UIBC) for transmitting manipulation information in the information processing device among at least one sink device from a first source device when the first source device among the at least one source device performs the real-time image transmission with the at least one sink device. Thus, there is an operation in which control information related to turning-on or off of a user input back channel (UIBC) for transmitting manipulation information in the information processing device among at least one sink device is received from a first source device when the first source device performs the real-time image transmission with the at least one sink device.

Advantageous Effects of Invention

According to the present technology, an excellent effect that that manipulability can be improved can be obtained. The effect described herein is not necessarily limited, and any effect described in the present disclosure may be included.

BRIEF DESCRIPTION OF DRAWINGS

FIG. 4 is a diagram schematically illustrating a content example retained in a management information retention unit 390 according to the first embodiment of the present technology.

FIG. 5 is a diagram illustrating a transition example of images displayed on a display unit 351 of the information processing device 300 according to the first embodiment of the present technology.

FIG. 20 is a sequence chart illustrating a communication process example between a source device 410 and a sink device 420 according to the first embodiment of the present technology.

FIG. 21 is a sequence chart illustrating a communication process example between a source device 410 and a sink device 420 according to the first embodiment of the present technology.

FIG. 22 is a sequence chart illustrating a communication process example between a source device 410 and a sink device 420 according to the first embodiment of the present technology.

FIG. 23 is a sequence chart illustrating a communication process example between a source device 410 and a sink device 420 according to the first embodiment of the present technology.

FIG. 25 illustrates an example of a frame format of a UIBC interchanged between a source device 410 and a sink device 420 according to the first embodiment of the present technology.

DESCRIPTION OF EMBODIMENT(S)

Hereinafter, modes (hereinafter, "embodiments") for carrying out the present technology will be described. The description will proceed in the following order:

1. First embodiment (example in which UIBC and WebSocket are set between source device and sink device)

2. Second embodiment (example in which connection between source device and sink device via access point and direct connection between source device and sink device are switched) (or simultaneous used))

3. Third embodiment (example in which source device is connected to sink device or access point through manipulation of user or operation of user)

4. Fourth embodiment (example in which one source device is connected to plurality of sink devices)

5. Application examples

1. FIRST EMBODIMENT

[Configuration Example of Communication System]

Figure 1:
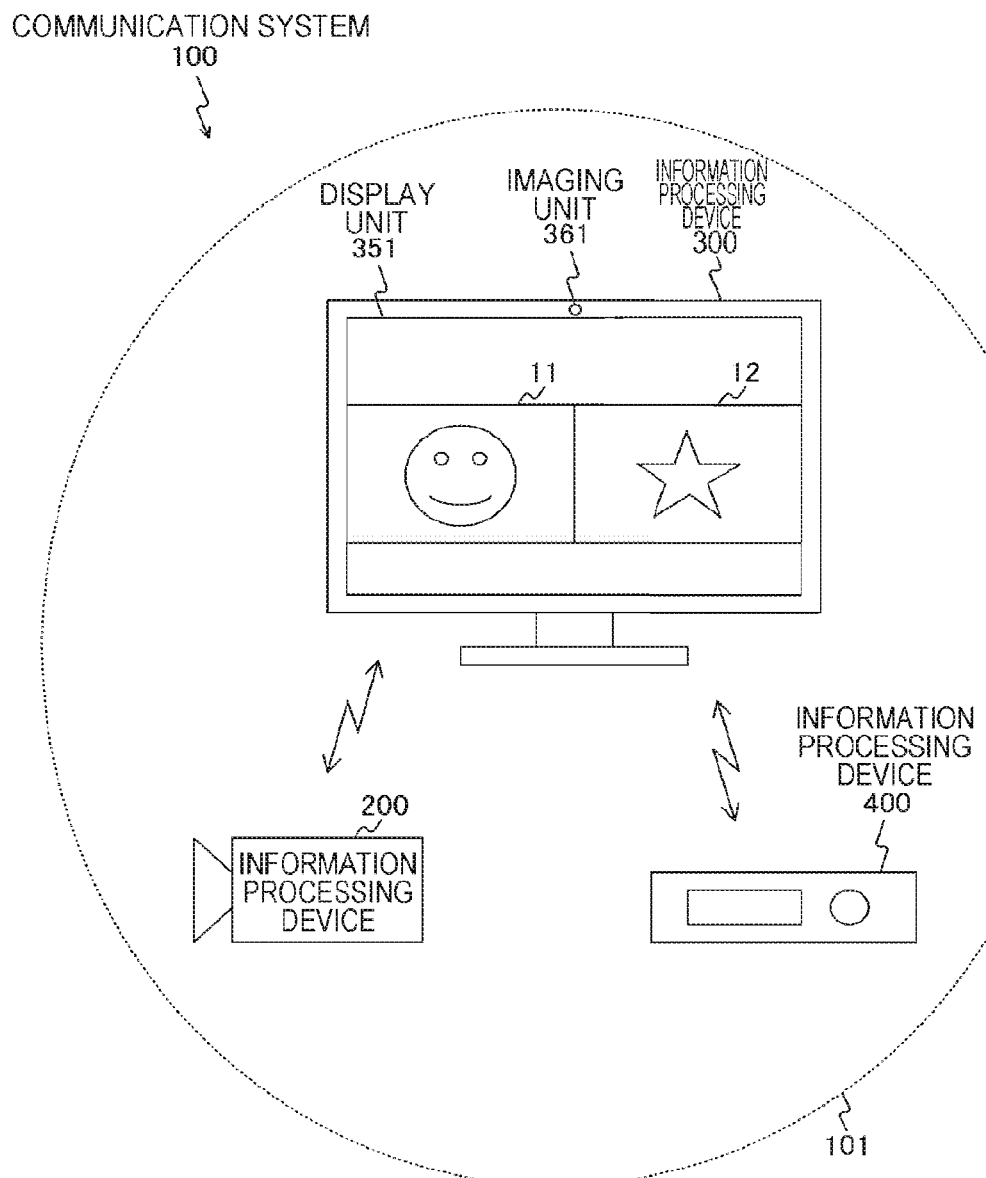
FIG. 1 is a block diagram illustrating a system configuration example of a communication system 100 according to a first embodiment of the present technology.

FIG. 1 is a block diagram illustrating a system configuration example of a communication system 100 according to the first embodiment of the present technology. FIG. 1 illustrates an example of a communication system capable of performing wireless connection through peer to peer (P2P) direct communication.

The communication system 100 includes information processing devices 200, 300, and 400. The communication system 100 is a communication system in which the information processing device 300 receives data (for example, image data or audio data) transmitted from at least one of the information processing devices 200 and 400.

The information processing devices 200, 300, and 400 are transmission and reception devices that have a wireless communication function. The information processing devices 200, 300, and 400 are, for example, display devices (for example, personal computers) or portable information processing devices (for example, smartphones or tablet terminals) that have a wireless communication function. The information processing devices 200, 300, and 400 are, for example, wireless communication devices that conform to Institute of Electrical and Electronics Engineers (IEEE) 802.11, 802.15, or 802.16, 3rd Generation Partnership Project (3GPP) specification (for example, Wideband Code Division Multiple Access (W-CDMA)), Global system for Mobile Communications (GSM: registered trademark), Worldwide Interoperability for Microwave Access (Wi-MAX), WiMAX2, Long Term Evolution (LTE), LIE-A (Advanced), or the like. The information processing devices 200, 300, and 400 can interchange various kinds of information using the wireless communication function.

Here, an example of a case in which wireless communication using wireless Local Area Network (LAN) is performed between the information processing devices 200 and 300 or between the information processing devices 400 and 300 will be described.

As the wireless LAN, for example, Wireless Fidelity (Wi-Fi) Direct, Tunneled Direct Link Setup (TDLS), an ad-hoc network, or a mesh network can be used. As short-range wireless audio visual (AV) transmission communication used in the communication system 100, for example, Wi-Fi Certified Miracast (technical specification title: Wi-Fi Display) can be used. Wi-Fi Certified Miracast is a mirroring technology for transmitting an audio or a display image reproduced with one terminal to another terminal using the technology of Wi-Fi Direct or TDLS and outputting the audio or image data similarly with the other terminal.

In Wi-Fi Certified Miracast, user Input Back Channel (UIBC) is realized on Transmission Control Protocol/Internet Protocol (TCP/IP). UIBC is a technology for transmitting manipulation information of an input device such as a mouse or a keyboard from one terminal to another terminal.

Instead of Wi-Fi Certified Miracast, another remote desktop software (for example, Virtual Network Computing (VNC)) may be applied.

Here, in Wi-Fi Certified Miracast, for example, it is established that an image (video) is compressed and decompressed using H.264. For example, in Wi-Fi Certified Miracast, H.264 can be adjusted on a transmission side. An embodiment of the present technology is not limited to H.264, but can also correspond to various codecs such as H.265 (for example, high efficiency video coding (HEVC) and scalable video coding extensions of high efficiency video coding (SHVC)) and Moving Picture Experts Group (MPEG4), Joint 1Photographic Experts Group (JPEG) 2000. Further, it can also correspond to a line-based codec in which one or more lines are bundled and compressed or two or more lines are divided into 2×2 or more macro blocks to be compressed and decompressed. For example, by obtaining a difference with a previous code amount region of a specific code amount region (such as a picture, a bundle of a plurality of lines, or a macro block), it is possible to correspond to a codec that reduces a transmission rate without performing compression such as DCT or Wavelet. Further, an image (video) may be transmitted or received with non-compression.

In the first embodiment of the present technology, an example in which the information processing device 200 sets image data and audio data generated through an imaging operation as a transmission target will be described. In the first embodiment of the present technology, an example in which the information processing device 400 sets content (for example, content formed by image data and audio data) stored in a storage unit (for example, a hard disk) as a transmission target. An electronic device (for example, a PC, a game device, a smartphone, or a tablet terminal) on which a camera is mounted as the information processing device 200 may be used. Another electronic device (for example, an imaging device, a game device, a smartphone, or a tablet terminal) that includes a display unit as the information processing device 300 may be used. If the information processing device 400 has a tethering function, the information processing device 400 may acquire content stored in an internet services provider (IPS) via wireless or wired network and set the content as a transmission target.

For example, image data generated through an imaging operation of the information processing device 200 is transmitted to the information processing device 300 and an image 11 based on the image data is displayed on a display unit 351 of the information processing device 300. Further, content stored in a storage unit (for example, a hard disk) of the information processing device 400 is transmitted to the information processing device 300 and an image 12 based on this content is displayed on the display unit 351 of the information processing device 300.

In this way, in the first embodiment of the present technology, an example in which the information processing devices 200 and 400 serve as source side information processing devices (source devices) and the information processing device 300 serves as a sink side information processing device (sink device) will be described.

In FIG. 1, a range in which the information processing device 300 can perform direct communication via peer to peer (P2P) direct connection using wireless communication is indicated as an information transfer range 101. The information transfer range 101 is an information transfer range (a service range) based on the information processing device 300.

[Configuration Example of Information Processing Device (Source Device)]

Figure 2:
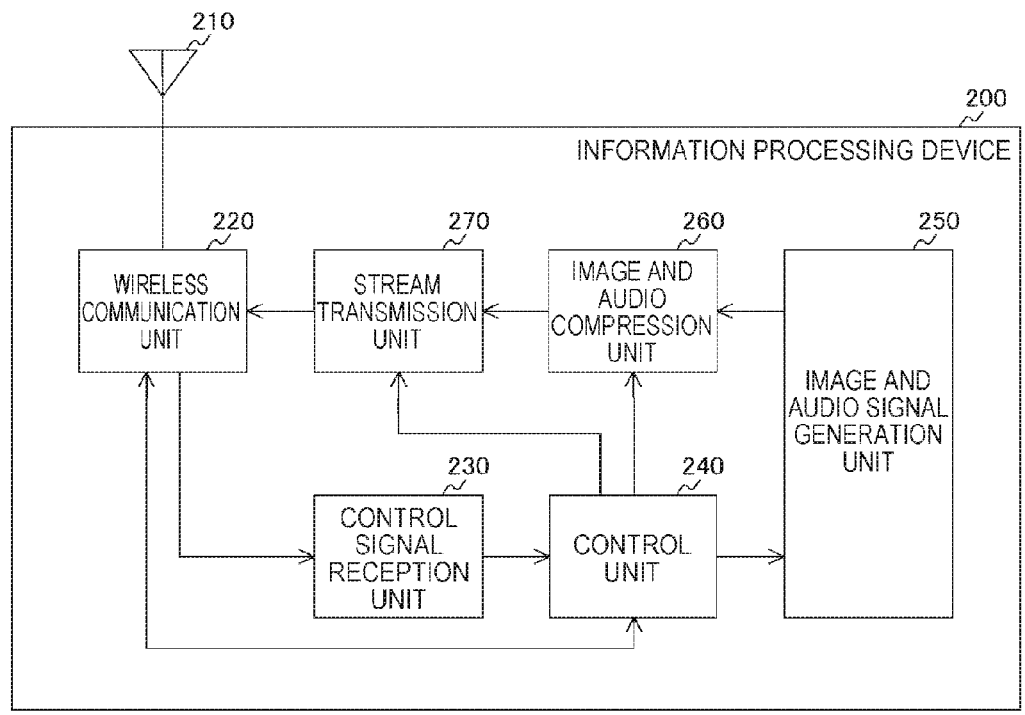
FIG. 2 is a block diagram illustrating a functional configuration example of an information processing device 200 according to the first embodiment of the present technology.

FIG. 2 is a block diagram illustrating a functional configuration example of the information processing device 200 according to the first embodiment of the present technology. The functional configuration of the information processing device 400 related to wireless communication is substantially the same as that of the information processing device 200. Therefore, in the first embodiment of the present technology, only the information processing device 200 will be described and the description of the information processing device 400 will be omitted.

The information processing device 200 includes an antenna 210, a wireless communication unit 220, a control signal reception unit 230, a control unit 240, an image and audio signal generation unit 250, an image and audio compression unit 260, and a stream transmission unit 270.

The wireless communication unit 220 transmits and receives each piece of information (for example, image data and audio data) to and from another information processing device (for example, the information processing device 300) via the antenna 210 using wireless communication under the control of the control unit 240. For example, when an image data transmission process is performed, the image data generated by the image and audio signal generation unit 250 is compressed by the image and audio compression unit 260 and the compressed image data (image stream) is transmitted from the antenna 210 via the wireless communication unit 220.

The wireless communication unit 220 is assumed to be able to transmit and receive each piece of information to and from another information processing device (for example, the information processing device 300) using a plurality of frequency channels. In the first embodiment of the present technology, an example in which the wireless communication unit 220 has a function of transmitting and receiving three kinds of frequency channels, 2.4 GHz, 5 GHz, and 60 GHz will be described. In this way, when the source device has the function of transmitting and receiving the plurality of frequency channels, a sink device (for example, the information processing device 300) can control a frequency channel to be used by each source device.

The control signal reception unit 230 acquires a control signal (for example, information interchanged with the information processing device 300) transmitted from another information processing device (for example, the information processing device 300) among the pieces of information received by the wireless communication unit 220. Then the control signal reception unit 230 outputs the acquired control signal to the control unit 240.

The control unit 240 performs control on each piece of information to be transmitted from the information processing device 200. For example, the control unit 240 performs control on the image and audio signal generation unit 250 and the image and audio compression unit 260 based on the control signal received by the control signal reception unit 230. For example, the control unit 240 performs control such that the number of channels of audio or the resolution of image data which is a transmission target is changed or performs control such that an image region of the image data which is a transmission target is changed. That is, the control unit 240 performs transmission control of a stream which is a transmission target based on the control signal received by the control signal reception unit 230. The transmission control of a stream is, for example, data transmission speed control, scalability transmission rate control.

The control unit 240 may have a function of measuring a radio wave propagation situation (link radio wave propagation situation) when data is transmitted to and received from the sink device using the wireless communication and may transmit a measurement result (radio wave propagation measurement information) to the sink device.

Here, the radio wave propagation measurement information is, for example, information used to determine whether line quality with the sink device is quality with which the image data and the audio data can be transmitted and received. The radio wave propagation measurement information is used, for example, when stream transmission control is performed. The radio wave propagation measurement information will be described in detail with reference to FIG. 4. Instead of the radio wave propagation measurement information, the control unit 240 may count the number of retransmissions of the same packet and perform the stream transmission control corresponding to the counted number of retransmissions.

Here, the data transmission speed mainly means an occupancy ratio to a communication line and is assumed to include a meaning of a communication speed or a communication capacity. For example, the resolution is defined as an index of image quality configured to include a component such as an image frame (the number of vertical and horizontal pixels) of the image data, or a bit rate (compression ratio) of the image data. As the index of the quality, the throughput of a stream can be used. The number of channels of audio is assumed to include a meaning of an audio recording and reproducing method such as a monaural (1.0 ch), a stereo (2.0 ch), 5.1 ch, 9.1 ch, or high-resolution audio. The number of channels of audio is defined as an index of audio quality configured to include a component such as a bit rate (compression ratio) of audio data or the number of channels. As the index of the audio quality, the throughput of a stream can be used.

The control unit 240 performs control such that a state unstable in the data rate control is improved. For example, the control unit 240 comprehends system performance information of a sink device (for example, the information processing device 300) by interchanging information with the sink device. Here, the system performance information is, for example, performance information regarding the system of the sink device. For example, the system performance information is a usable frequency channel, a resolution, Transmission Control Protocol (TCP), and User Datagram Protocol (UDP). The system performance information is, for example, information indicating each of correspondence of an encryption method, correspondence of standard definition (SD)/high definition (HD), and correspondence of a low power consumption mode. For example, the control unit 240 can select a method for the stream transmission control to further improve the entire system stability of the communication system 100 according to whether the sink device corresponds to the lower power consumption mode.

For example, the control unit 240 is assumed to insert information regarding whether the information processing device 200 is a mobile device during interchange of information with the information processing device 300. For example, capability information regarding the information processing device 200 can include information regarding whether the information processing device 200 is a mobile device. When it is comprehended that the information processing device 200 is the mobile device, the information processing device 300 can determine that it is not necessary to operate the information processing device 200 based on association with other connected information processing devices. In this way, when it is determined that it is not necessary to operate the information processing device 200, the information processing device 200 receives a transmission stop command from the information processing device 300. When the control unit 240 comprehends the transmission stop command, the control unit 240 can be powered down the function of each of the image and audio signal generation unit 250, the image and audio compression unit 260, and the stream transmission unit 270 for a given time. The control unit 240 can transition the wireless communication unit 220 to intermittent reception (which is a mode in which the wireless communication unit 220 rises up periodically so that the wireless communication unit 220 can receive a command from the information processing device 300 and the device is powered down in other cases).

The image and audio signal generation unit 250 generates data (image data and audio data) which is an output target under the control of the control unit 240 and outputs the generated data to the image and audio compression unit 260. For example, the image and audio signal generation unit 250 includes an imaging unit (not illustrated) and an audio acquisition unit (not illustrated). The imaging unit (for example, a lens, an image sensor, or a signal processing circuit) images a subject and generates an image (image data). The audio acquisition unit (for example, a microphone) acquires a surrounding audio when the image data is generated. The data generated in this way is a transmission target to be transmitted to another information processing device (for example, the information processing device 300).

The image and audio compression unit 260 compresses (encodes) the data (the image data and the audio data) generated by the image and audio signal generation unit 250 under the control of the control unit 240. Then, the image and audio compression unit 260 outputs the compressed data (the image data and the audio data) to the stream transmission unit 270. The image and audio compression unit 260 may be realized by performing the encoding by software or may be realized by performing the encoding by hardware. The image and audio compression unit 260 is assumed to function as a codec, but is assumed to be able to handle an uncompressed image or audio. Further, the image and audio compression unit 260 can also function as a scalable codec. Here, the scalable codec means, for example, a codec which can be applied freely according to the resolution of a reception side information processing device (sink device), a network environment, or the like.

The stream transmission unit 270 performs a transmission process of transmitting the data (the image data and the audio data) compressed by the image and audio compression unit 260 as a stream from the antenna 210 via the wireless communication unit 220 under the control of the control unit 240.

The information processing device 200 can include a display unit, an audio output unit, and a manipulation reception unit in addition to the above-described units, but these units are not illustrated in FIG. 2. The example in which the information processing device 200 generates the image data and the audio data which are the transmission targets has been described. However, the information processing device 200 may acquire image data and audio data which are transmission targets from an external device. For example, the information processing device 200 may acquire image data and audio data which are transmission targets from a web camera equipped with a microphone. The information processing device 200 may set content (for example, content formed by image data and audio data)

stored in a storage device (for example, a hard disk) as a transmission target irrespective of the inside or outside of the information processing device 200. In this case, the content stored in the storage device is also assumed to be compressed content. In this case, when the compressed content is compressed in accordance with an encoding scheme defined in a standard adopted in the communication system 100, the compressed content may be transmitted without being decrypted (decoded).

A display unit (not illustrated) of the information processing device 200 is, for example, a display unit that displays an image generated by the image and audio signal generation unit 250. As the display unit, various display panels can be used. For example, a display panel such as an electro-luminescence (EL) or crystal light-emitting diode (LED) display or a liquid crystal display (LCD) can be used.

An audio output unit (not illustrated) of the information processing device 200 is, for example, an audio output unit (for example, a speaker) that outputs an audio generated by the image and audio signal generation unit 250. An image can be output from both of a transmission device and a reception device, but an audio is preferably output from only one of the transmission device and the reception device.

A manipulation reception unit (not illustrated) of the information processing device 200 is a manipulation reception unit that receives a manipulation input performed by a user and is, for example, a keyboard, a mouse, a game pad, a touch panel, a camera, or a microphone. The manipulation reception unit and the display unit can be integrally configured using a touch panel capable of performing a manipulation input when the user touches or approaches a display surface with his or her finger.

[Configuration Example of Information Processing Device (Reception Side)]

Figure 3:
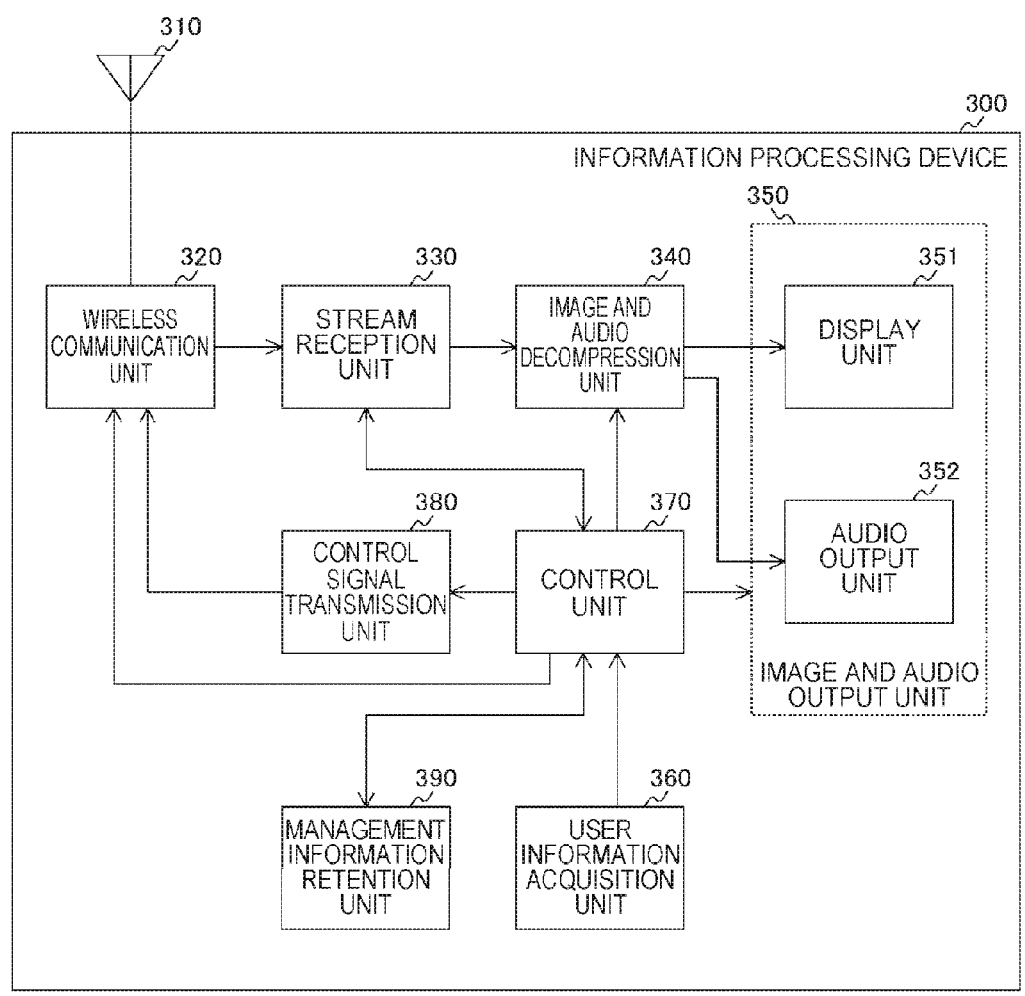
FIG. 3 is a block diagram illustrating a functional configuration example of an information processing device 300 according to the first embodiment of the present technology.

FIG. 3 is a block diagram illustrating a functional configuration example of the information processing device 300 according to the first embodiment of the present technology.

The information processing device 300 includes an antenna 310, a wireless communication unit 320, a stream reception unit 330, an image and audio decompression unit 340, an image and audio output unit 350, a user information acquisition unit 360, a control unit 370, a control signal transmission unit 380, and a management information retention unit 390.

The wireless communication unit 320 transmits and receives each piece of information (for example, image data and audio data) to and from another information processing device (for example, the information processing device 200) via the antenna 310 using wireless communication under the control of the control unit 370. For example, when an image data reception process is performed, the image data received by the antenna 310 is decompressed (decoded) by the image and audio decompression unit 340 via the wireless communication unit 320 and the stream reception unit 330. Then, the decompressed image data is supplied to the image and audio output unit 350 and an image according to the decompressed image data is output from the image and audio output unit 350. That is, the image according to the decompressed image data is displayed on a display unit 351.

The wireless communication unit 320 is assumed to be able to transmit and receive each piece of information to and from another information processing device (for example, the information processing device 200) using a plurality of frequency channels. In the first embodiment of the present technology, an example in which the wireless communication unit 320 has a function of transmitting and receiving three kinds of frequency channels, 2.4 GHz, 5 GHz, and 60 GHz will be described. That is, the wireless communication unit 320 can perform communication using a first frequency band and communication using a second frequency band of a higher data transmission speed than the first frequency band. The control unit 370 controls a frequency channel to be used among a plurality of frequency channels in wireless communication with each source device.

Link between the information processing devices 200 and 300 and link between the information processing devices 400 and 300 may be established with the same frequency channel or may be established with different frequency channels.

In the first embodiment of the present technology, an example in which the wireless communication unit 320 has the function of transmitting and receiving three kinds of frequency channels, 2.4 GHz, 5 GHz, and 60 GHz will be described, but an embodiment of the present technology is not limited thereto. For example, the wireless communication unit 320 may have a function of transmitting and receiving other frequency channels, two frequency channels, four or more frequency channels.

The stream reception unit 330 receives streams (for example, an image stream and an audio stream) and interchange information with each source device among the pieces of information received by the wireless communication unit 320 under the control of the control unit 370. Then, the stream reception unit 330 outputs the received command information to the control unit 370 and outputs the received streams to the image and audio decompression unit 340 and the control unit 370.

Here, the interchange information with each source device is information transmitted from a source device (for example, the information processing device 200) and includes, for example, a request for acquiring system performance information of the information processing device 300. The system performance information is, for example, information indicating a usable frequency channel, a resolution, TCP, and UDP or each of correspondence of an encryption method, correspondence of SD/HD, and correspondence of a low power consumption mode.

The stream reception unit 330 has a function of measuring a radio wave propagation situation (link radio wave propagation situation) when data is transmitted to and received from a sink device using the wireless communication. The stream reception unit 330 outputs a measurement result (radio wave propagation measurement information) to the control unit 370. The radio wave propagation measurement information will be described in detail with reference to FIG. 4.

The image and audio decompression unit 340 decompresses (decodes) the streams (image data and the audio data) transmitted from another information processing device (for example, the information processing device 200) under the control of the control unit 370. Then, the image and audio decompression unit 340 outputs the decompressed data (the image data and the audio data) to the image and audio output unit 350. The image and audio decompression unit 340 may be realized by performing the decoding by software or may be realized by performing the decoding by hardware. The image and audio decompression unit 340 is assumed to function as a codec, but is assumed to be able to handle an uncompressed image or audio. Further, the image and audio decompression unit 340 can also function as a scalable codec.

The image and audio output unit 350 includes a display unit 351 and an audio output unit 352.

The display unit 351 is a display unit that displays each image (for example, the images 11 and 12 illustrated in FIG. 1) based on the image data decompressed by the image and audio decompression unit 340. As the display unit 351, for example, a display panel such as an organic EL panel, a crystal LED display, an LCD panel can be used. As the display unit 351, a touch panel capable of performing a manipulation input when a user touches or approaches a display surface with his or her finger may be used.

The audio output unit 352 is an audio output unit (for example, a speaker) that outputs various audios (an audio and the like related to an image displayed on the display unit 351) based on the audio data decompressed by the image and audio decompression unit 340. Here, as an audio output method, for example, a method of reproducing only an audio of a source device allocated to a middle channel (a main image) from a speaker and reproducing no audio of a source device allocated to a peripheral channel (a sub-image) can be used. As another audio output method, for example, a method of setting the volume of an audio of a source device allocated to the middle channel as a main and lowering the volume of an audio of a source device allocated to the peripheral channel and reproducing the audio can be used. Other audio output methods may be used.

The user information acquisition unit 360 acquires information regarding a user (user information) and outputs the acquired user information to the control unit 370. For example, the user information acquisition unit 360 can acquire the user information by receiving an input from a manipulation reception unit (a keyboard, a mouse, a remote controller, a game pad, or a touch panel) for which the user can directly set a display method. The manipulation reception unit is, for example, a manipulation member that designates any region in an image displayed on the display unit 351. For example, the user information acquisition unit 360 can acquire the user information by receiving an input from a device which can comprehend a user's intention, such as a camera, a microphone, or any of various sensors (for example, gyro sensors and sensors detecting human bodies).

For example, the user information acquisition unit 360 acquires the user information generated through a user motion when information based on the stream received from another information processing device (for example, the information processing device 200) using the wireless communication is output from the image and audio output unit 350. The user information is, for example, user information generated through a user motion related to an image displayed on the display unit 351. For example, the user information is information generated based on a user manipulation related to the image displayed on the display unit 351.

For example, the user information acquisition unit 360 can acquire the image data generated by the imaging unit 361 (illustrated in FIG. 1) and generate user information. For example, the user information acquisition unit 360 may acquire information (for example, position information and identification information) acquired by an external device (for example, each sensor or a wearable device) and generate the user information.

The control unit 370 causes the management information retention unit 390 to retain each piece of information acquired by the stream reception unit 330 and manages each source device based on management information retained the management information retention unit 390. The control unit 370 performs the stream transmission control so that stability is improved for streams transmitted from a plurality of source devices in the entire system.

For example, the control unit 370 performs the stream transmission control based on the user information acquired by the user information acquisition unit 360 and the management information retained in the management information retention unit 390. Specifically, the control unit 370 generates a control signal for each source device to perform the stream transmission control based on the management information retained in the management information retention unit 390 and outputs the generated control signal to the control signal transmission unit 380. For example, the control unit 370 changes the resolution of an image displayed on the display unit 351 based on the user information and the management information and generates a control signal to request a transmission rate equivalent to the resolution to each source device. For example, the control unit 370 generates a control signal to decide a display region of an image on the display unit 351 based on the user information and the management information. For example, the control unit 370 generates a control signal to decide the size of an image on the display unit 351 based on the user information and the management information.

The control unit 370 performs control such that a frequency channel and a resolution to be used are set based on the user information and the management information. For example, the control unit 370 sets a frequency channel to be used for each source device in the plurality of frequency channels of the wireless communication unit 320. When the power consumption mode is different from each frequency channel, the control unit 370 comprehends each mode and sets the frequency channel for caring the power consumption of a mobile device. That is, the control unit 370 can separately set a first power consumption mode related to the first frequency band and a second power consumption mode related to the second frequency band of a higher data transmission speed than the first frequency band.

The control signal transmission unit 380 performs a transmission process of transmitting the control signal output from the control unit 370 to another wireless communication device via the wireless communication unit 320 and the antenna 310.

The management information retention unit 390 is a table that retains information (management information) to manage each source device connected to the information processing device 300 using the wireless communication. Content retained in the management information retention unit 390 will be described in detail with reference to FIG. 4.

[Content Example Retained in Management Information Retention Unit]

FIG. 4 is a diagram schematically illustrating a content example retained in the management information retention unit 390 according to the first embodiment of the present technology.

The management information retention unit 390 is a table that retains information (management information) to manage each source device connected to the information processing device 300 using the wireless communication. For example, in the management information retention unit 390, terminal identification information 391, a frequency channel 392, a radio wave propagation measurement information 393, device information 394, a band use level 395, a display form 396, standby or wake-up 397, and multi-reception diversity correspondence 398 are retained in association therewith.

In the terminal identification information 391, identification information is stored to identify the source devices connected to the information processing device 300 using the wireless communication.

In the frequency channel 392, a frequency channel actually used by the source device connected to the information processing device 300 using the wireless communication is stored.

In the radio wave propagation measurement information 393, radio wave propagation measurement information regarding the source device connected to the information processing device 300 using the wireless communication is stored. The radio wave propagation measurement information is measured by the stream reception unit 330 for each source device connected to the information processing device 300 using the wireless communication.

As the radio wave propagation measurement info illation 393, for example, a packet error rate (PER), a bit error rate (BER), the number of retransmissions of packets, and a throughput are stored. As the radio wave propagation measurement information 393, for example, frame drop, a signal to interference ratio (SIR), and a received signal strength indicator (RSSI) are stored. Here, instead of the SIR, a signal to interference plus noise ratio (SINR) may be used. The radio wave propagation measurement information 393 illustrated in FIG. 4 is an example. At least one piece of information among the pieces of information may be stored or another piece of radio wave propagation measurement information may be measured by the stream reception unit 330 to be stored. The radio wave propagation measurement information measured by the source device may be acquired and stored. Packet delay received by a reception side may be determined and information regarding the packet delay may be used as radio wave propagation measurement information. The packet delay serves as one index related to radio wave propagation since delay occurs in transmission to the reception side through a retransmission process in layer 2 at the time of occurrence of an error. The packet delay serves as, for example, an index indicating where link characteristics deteriorate in a wireless system in which a plurality of devices share wireless bands.

In the device information 394, classification of the source device (an attribute of the source device) connected to the information processing device 300 using the wireless communication is stored. For example, either of a mobile device and a stationary device is stored as the classification of the source device. Either of a device of which a power source is inserted and another device may be stored as the classification of the source device. Either of a battery-driven device and another device may be stored as the classification of the source device.

In the band use level 395, a band use level of the source device connected to the information processing device 300 using the wireless communication is stored. As the band use level, for example, a resolution or a throughput can be used. For example, in the band use level, a throughput during use may be stored, a pre-decided table may be prepared, and a number indicating correspondence of a range of the table may be stored and managed.

In the display form 396, a data display form (an output form) based on a stream transmitted from the source device connected to the information processing device 300 using the wireless communication is stored. For example, a display form (a main image (a middle channel) or a sub-image (a peripheral channel)) of the image data which is displayed on the display unit 351 and which is based on the stream transmitted from the source device is stored. For example, an output form (a main audio or a sub-audio) of the audio data which is output from the audio output unit 352 and which is based on the stream transmitted from the source device is stored. A format in which the peripheral channel is not displayed may be realized in accordance with the display form.

In the standby or wake-up 397, a mode (a standby mode or a wake-up mode) of the source device connected to the information processing device 300 using the wireless communication is stored.

In the multi-reception diversity correspondence 398, information indicating whether the source device connected to the information processing device 300 using the wireless communication corresponds to the multi-reception diversity is stored.

In this way, the management information retained in the management information retention unit 390 is information for associating the identification information (the terminal identification information 391) used to identify the other information processing device with the capability information regarding the other information processing device for management. The management information includes at least the information (the radio wave propagation measurement information 393) regarding the radio wave propagation measurement related to the communication with the other information processing device and the information (the standby or wake-up 397) regarding power consumption as the capability information regarding the other information processing device. The management information retained in the management information retention unit 390 includes the information (the display form 396) regarding a display form for displaying the image information as the capability information regarding the other information processing device. The information regarding the display form is, for example, information indicating that the image information is displayed as main information or sub-information.

As described above, since the sink device side manages the information related to the source device, it is possible to display the information (for example, the terminal identification information 391 or the name of the source device) related to the source device detectable by the sink device. Further, it is possible to display the information (for example, the terminal identification information 391 or the name of the source device) related to the source device detectable by the sink device in association with the display screen of the source device. In other words, the control unit 370 can cause an image of the source device and information indicating the source device to be displayed on the display unit 351 in association with each other. In this case, by causing the information (for example, the terminal identification information or the name) related to the source device to be displayed on (or nearby) a part of the image of the source device, it is possible to easily detect the user and the display screen referred to by the user. Thus, the other user can recognize manipulatable source devices. In this case, for example, the sink device can perform each control in the order in which the manipulation received.

[Transition Example of Image]

FIG. 5 is a diagram illustrating a transition example of images displayed on the display unit 351 of the information processing device 300 according to the first embodiment of the present technology.

FIG. 5*a* illustrates an example of a display form in which the images 11 and 12 are displayed on the display unit 351 of the information processing device 300 by setting the image 11 as a middle channel and setting the image 12 as a peripheral channel.

FIG. 5b illustrates an example of a display form in which the images 11 and 12 are displayed on the display unit 351 of the information processing device 300 by setting the image 11 as a peripheral channel and setting the image 12 as a middle channel.

For example, a case in which each of the information processing devices 200 and 400 transmits a stream (the image data and the audio data) with a standard resolution to the information processing device 300 is assumed. In this case, as illustrated in FIG. 1, the image 11 based on the image data from the information processing device 200 and the image 12 based on the image data from the information processing device 400 can be displayed on the display unit 351 of the information processing device 300 so that the sizes of the images 11 and 12 are the same. In this example, a given resolution and a display region are defined to be the same, but a scaler function may be added to the display unit 351 so that the images 11 and 12 are resealed and displayed on the display unit 351. However, in the embodiments of the present technology, to facilitate the description, this function is assumed not to be used in the description.

In the display forms of the images 11 and 12, for example, the display forms set at the time of the previous communication may be retained and the images 11 and 12 may be displayed on the display unit 351 of the information processing device 300 according to the display forms.

The display forms of the images 11 and 12 may be decided based on an order of connection to the information processing device 300. For example, a case in which the information processing device 200 is first connected to the information processing device 300 and the information processing device 400 is connected to the information processing device 300 after the connection is assumed. In this case, the images 11 and 12 are displayed on the display unit 351 of the information processing device 300 by setting the image 11 as the middle channel and setting the image 12 as the peripheral channel. That is, the images may be displayed in the procedure of the middle channel and the peripheral channel based on the order of the connection to the information processing device 300.

As illustrated in FIG. 5a, when the images 11 and 12 are displayed on the display unit 351 by setting the image 11 as the middle channel and setting the image 12 as the peripheral channel, user information for setting the image 12 as the middle channel is assumed to be acquired by the user information acquisition unit 360. For example, when a viewer performs a manipulation of setting the image 12 as the middle channel using a pointer such as a remote controller or a gesture, the user information for setting the image 12 as the middle channel is acquired by the user information acquisition unit 360. In this case, as illustrated in FIG. 5b, the images 11 and 12 are displayed on the display unit 351 by setting the image 12 as the middle channel and setting the image 11 as the peripheral channel. Further, display positions of the images 11 and 12 on the display surface of the display unit 351 are decided based on user information (for example, a manual manipulation or a line of sight) acquired by the user information acquisition unit 360.

[Communication Example]

Figure 6:
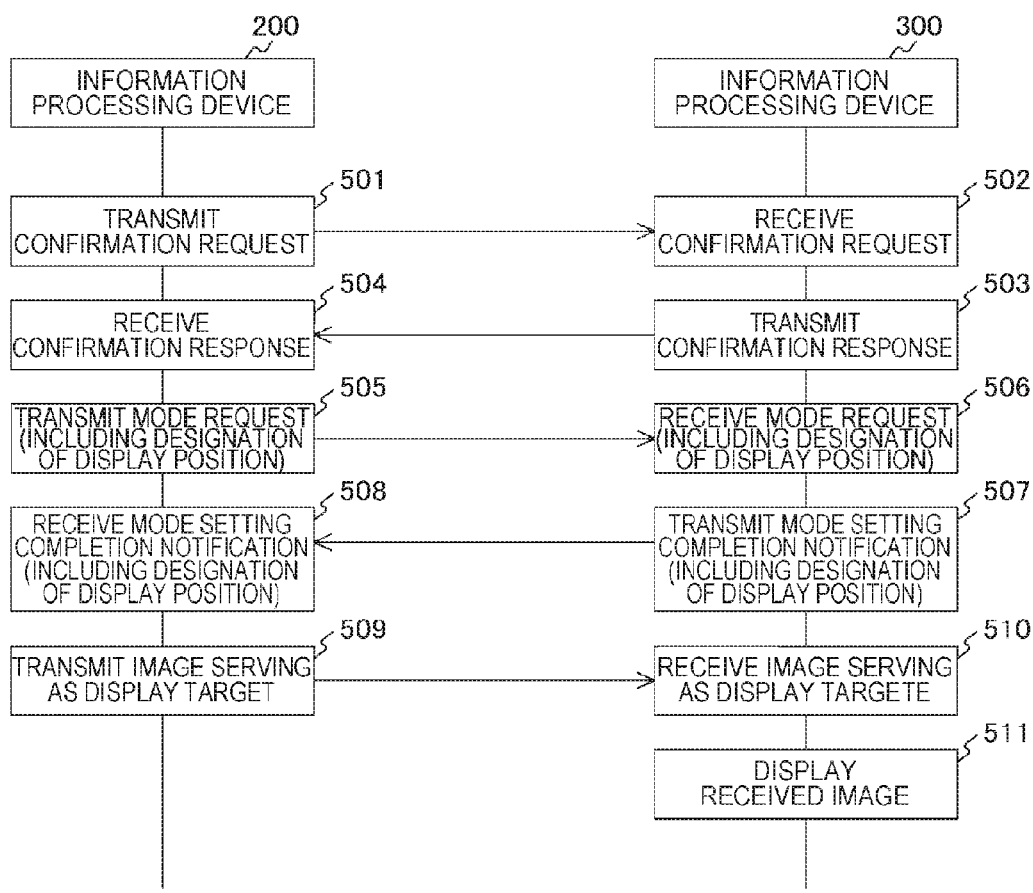
FIG. 6 is a sequence chart illustrating a communication process example between devices included in the communication system 100 according to the first embodiment of the present technology.

FIG. 6 is a sequence chart illustrating a communication process example between devices included in the communication system 100 according to the first embodiment of the present technology. FIG. 6 illustrates an example of a communication process when a request for the display position of the information processing device 300 (the sink device) is performed between the information processing device 200 (the source device) and the information processing device 300 (the sink device) through Capability Negotiation.

For example, when each request is performed at the time of Capability Negotiation from the information processing device 200 to the information processing device 300, the information processing device 300 transmits a capability related to its own information processing device. For example, the information processing device 200 transmits a confirmation request to the information processing device 300 (501 and 502). The confirmation request is used to transmit a request of a display area size of the information processing device 200, an a display area size (however, it is not a transmission resolution) corresponding to multiple sources, and the display position (for example, coordinates) of the information processing device 200, and information related to rotation of a display image and a request of confirmation related to a resolution/audio quality/power consumption performance. The confirmation request is an example, and other content may be requested at the same time. Each piece of information may be transmitted at a time or may be sequentially transmitted.

When the confirmation request is received (502), the information processing device 300 transmits a confirmation response to the information processing device 200 (503 and 504). The confirmation response is used to transmit a response of the display area size of the information processing device 200, the display area size (however, it is not a transmission resolution) corresponding to the multiple sources, and the display position of the information processing device 200 and a response of the rotation information of the display screen and the confirmation related to the resolution/audio quality/power consumption performance. The confirmation response is an example, and other content may be transmitted as a response at the same time.

When the confirmation response is received (504), the information processing device 200 transmits a mode request (including a designation of the display position) to the information processing device 300 (505 and 506). Thus, the information processing device 200 can designate the display position for the information processing device 300.

When the mode request is received (506), the information processing device 300 transmits a mode setting completion notification (including a designation of the display position) to the information processing device 200 (507 and 508). Thus, the information processing device 200 can cause an image to be displayed at the designated display position.

When the mode setting completion notification is received (508), the information processing device 200 transmits an image (image data) serving as a display target to the information processing device 300 (509, 510). In this case, the information processing device 200 transmits the image (image data) serving as the display target to the information processing device 300 based on the received mode setting completion notification. Then, the information processing device 300 causes the received image to be displayed on the display unit 351 (511).

As described above, in the interchange of the capability between the source device and the sink device, the sink device can request the display area size, the display area size (however, it is not a transmission resolution) corresponding to the multiple sources, the display position, and the rotation information of the display screen. Thus, it is possible to notify the source device of the display position of the sink device in real time, and it is possible to control the display position from the source device. In other words, even in the multi-source environment, it is possible to arrange an appropriate display window (an image display region of the source device) at an appropriate position.

[Communication Example]

Figure 7:
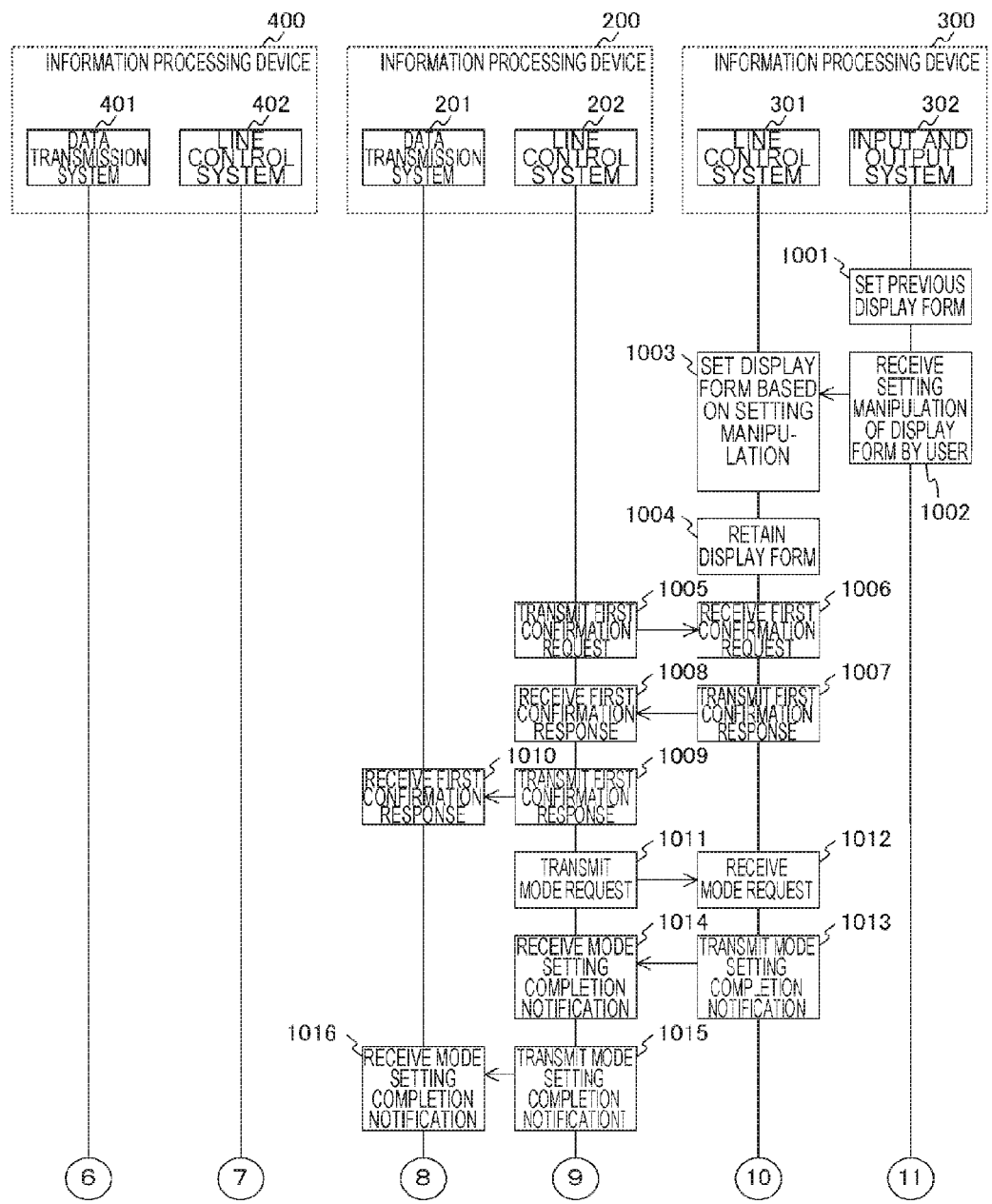
FIG. 7 is a sequence chart illustrating a communication process example between devices included in the communication system 100 according to the first embodiment of the present technology.
Figure 8:
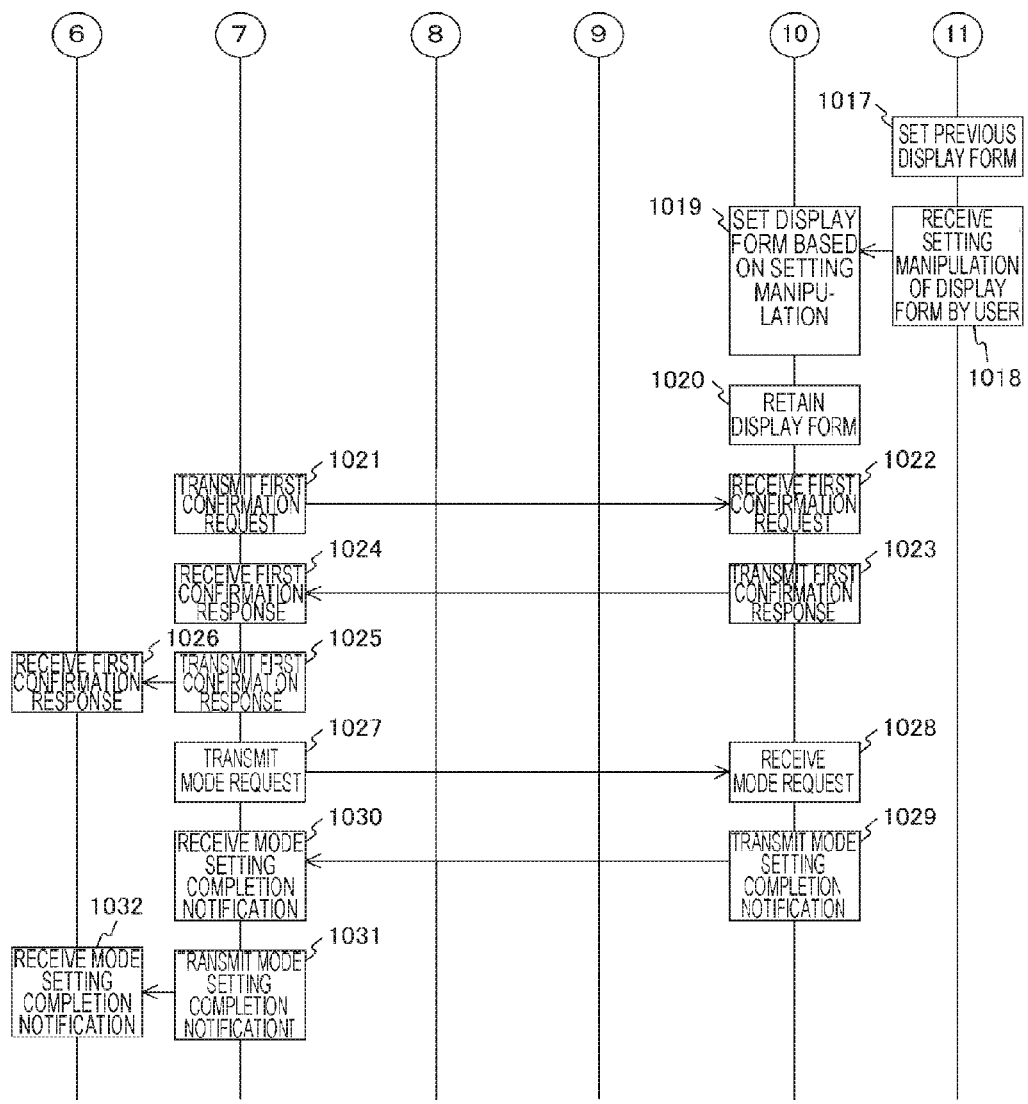
FIG. 8 is a sequence chart illustrating a communication process example between devices included in the communication system 100 according to the first embodiment of the present technology.

FIGS. 7 and 8 are a sequence chart illustrating a communication process example between devices included in the communication system 100 according to the first embodiment of the present technology. FIGS. 7 and 8 illustrate a communication example when the interchange illustrated in FIG. 6 is performed in the topology illustrated in FIG. 1.

In FIGS. 7 and 8, the image and audio signal generation unit 250, the image and audio compression unit 260, and the stream transmission unit 270 among the units included in the information processing device 200 are illustrated as a data transmission system 201. The antenna 210, the wireless communication unit 220, the control signal reception unit 230, and the control unit 240 are illustrated as a line control system 202. Even in the information processing device 400, similarly, they are illustrated as a data transmission system 401 and a line control system 402.

In FIGS. 7 and 8, the antenna 310, the wireless communication unit 320, the stream reception unit 330, the control unit 370, and the control signal transmission unit 380 in the configuration of the information processing device 300 are illustrated as a line control system 301. The image and audio decompression unit 340, the image and audio output unit 350, and the user information acquisition unit 360 are illustrated as an input and output system 302.

First, when the information processing device 300 is powered up, a previous display form (which is a display form when the information processing device 300 is powered down) is set as a display form (which is an image display form and an audio display form) of the information processing device 300 (1001). The control unit 370 of the information processing device 300 causes the management information retention unit 390 to retain the management information of each source device connected to the information processing device 300 using the wireless communication (illustrated in FIG. 4). As illustrated in FIG. 5, the control unit 370 of the information processing device 300 causes the display unit 351 to display the images 11 and 12 corresponding to two streams respectively transmitted from the information processing devices 200 and 400 based on the previous display form.

Subsequently, a case in which the user performs a manipulation of setting the display form (changing manipulation) is assumed (1002). In this case, a control signal related to the setting manipulation is acquired as the user information by the user information acquisition unit 360 and the user information is output to the control unit 370. Then, the control unit 370 changes the content retained in the management information retention unit 390 (illustrated in FIG. 4) based on the user information (1003 and 1004). For example, as illustrated in FIG. 5b, a case in which the setting manipulation (changing manipulation) is performed to set the image 11 based on the image data from the information processing device 200 as the peripheral channel is assumed. In this case, the control unit 370 changes the display form 396 (illustrated in FIG. 4) of the information processing device 200 in the management information retention unit 390 to "SUB" (1003 and 1004).

At the time of the Capability Negotiation from the information processing device 200 to the information processing device 300, each request can be transmitted, and the information processing device 300 can transmit the capability related to its own information processing device. For example, the information processing device 200 transmits a first confirmation request to the information processing device 300 (1005 and 1006). The first confirmation request is used to request the display area size of the information processing device 200, the display area size (however, it is not a transmission resolution) corresponding to the multiple sources, the display position of the information processing device 200, and the information related to the rotation of the display image.

When the first confirmation request is received (1006), the information processing device 300 transmits a first confirmation response to the information processing device 200 (1007 to 1010). The first confirmation response is used to transmit a response of the display area size of the information processing device 200, the display area size (however, it is not a transmission resolution) corresponding to the multiple sources, the display position of the information processing device 200, and the information related to the rotation of the display image.

When the first confirmation response is received (1008), the information processing device 200 transmits the mode request (including a designation of the display position) to the information processing device 300 (1011 and 1012). Thus, the information processing device 200 can designate the display position for the information processing device 300.

When the mode request is received (1012), the information processing device 300 transmits the mode setting completion notification (including a designation of the display position) to the information processing device 200 (1013 to 1016). Thus, the information processing device 200 can cause the image to be displayed at the designated display position.

The information processing device 300 may be powered on, and the interchange between the information processing device 300 and the information processing device 400 may be performed. In this case, similarly to the process (1001 to 1016), the process (1017 to 1032) is performed between the information processing device 300 and the information processing device 400.

The first confirmation request and the first confirmation response are an example, and the first confirmation request and the first confirmation response may be interchanged at the same time or may be interchanged in different orders. Further, other content may be simultaneously or sequentially transmitted.

As illustrated in FIGS. 7 and 8, there is a possibility that a plurality of source devices (the information processing device 200 and the information processing device 400) will transmit the mode request (the mode request illustrated in FIGS. 7 (1011 and 1012) and the mode request illustrated in FIGS. 8 (1027 and 1028)). In this case, there is a possibility that a plurality of source devices will transmit the mode request at the same time. In this regard, a control example of the sink device when the mode requests are received from a plurality of source devices at the same time (or substantially at the same time).

For example, when the mode requests are received from the source devices, the sink device (for example, the information processing device 300) can decide the mode request of the source device that is preferentially processed according to display content of the display unit. In this case, the following two types of decision methods (R1) and (R2) are considered:

(R1) a method in which the sink device receives the mode requests from the source devices in parallel and perform selection based on the received information; and (R2) a method in which the sink device bundles the mode requests transmitted from the source devices and manages a bundle of mode requests as one piece of information using an ID.

In the method (R1), the sink device can directly detect the mode requests transmitted from the source devices. Thus, the sink device can control such that the mode requests transmitted from the source devices are turned on or off. Further, the sink device can decide to give a priority to content of the mode request transmitted from a certain source device. However, in the method (R1), as the number of source devices increases, a processing load of the sink device increases.

In the method (R2), the sink device bundles the mode requests transmitted from a plurality of source devices and then switches content of the mode requests. For this reason, the processing load of the sink device can be reduced. However, in the method (R2), the mode requests transmitted from the source devices are bundled as managed using an ID. Thus, in order for the sink device to perform control such that the mode requests transmitted from the source devices are turned on or off, a header identifying each source device is necessary.

Here, in the image transmission standard, it is often decided by a mode request content switching unit (illustrated in FIGS. 9 to 14) that switches content of the mode request according to the standard. To this end, for example, ports for a transmission control protocol (TCP), a user datagram protocol (UDP), and real time streaming protocol (RTSP), and WebSocket are considered to be prepared and managed.

[On-Off Control Example of Forward Channel]

Figure 9:
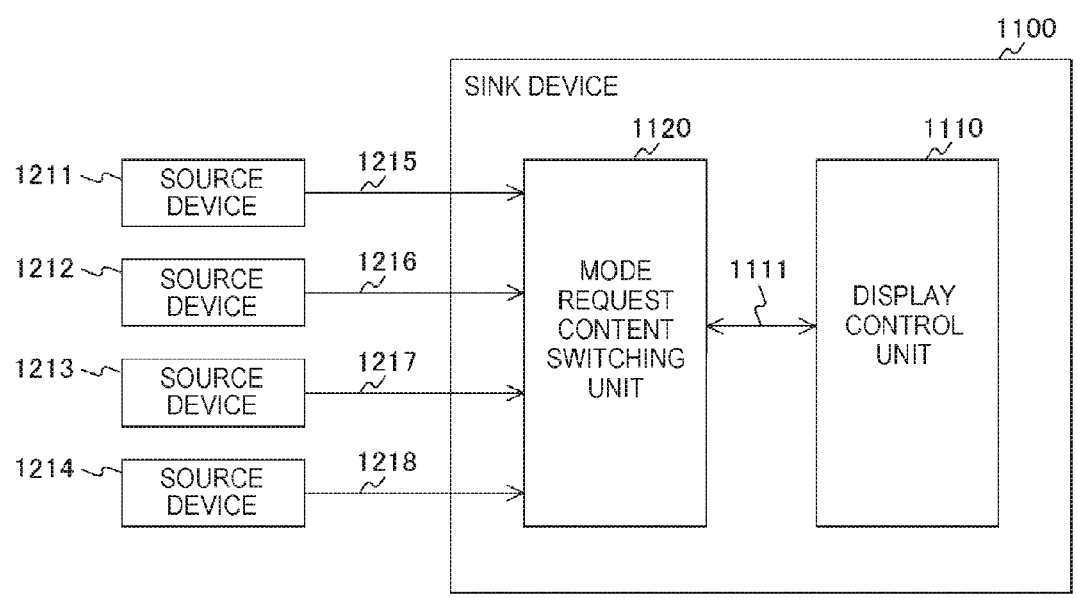
FIG. 9 is a diagram illustrating a configuration example when a sink device performs on-off control of a mode request according to the first embodiment of the present technology.

FIG. 9 is a diagram illustrating a configuration example when the sink device performs on-off control of the mode request according to the first embodiment of the present technology.

FIG. 9 illustrates an example in which on-off control of the mode request is performed between one sink device 1100 and a plurality of source devices 1211 to 1214 according to the decision method (R1). In other words, an example in which the sink device 1100 prepares a plurality of ports for a plurality of source devices 1211 to 1214, and selects the source device based on a request from an upper layer and a state of the display screen. For example, the sink device 1100 may set an Off operation of the source device based on an Off request from the upper layer. Further, for example, the sink device 1100 may set the Off operation of the source device based on a display state of the display screen in the sink device 1100.

Each of the source devices 1211 to 1214 transmits forward channel information (for example, the mode request) to the sink device 1100 (1215 to 1218).

The sink device 1100 includes a display control unit 1110 and a mode request content switching unit 1120. The display control unit 1110 and the mode request content switching unit 1120 correspond to the stream reception unit 330 and the control unit 370 illustrated in FIG. 3.

The display control unit 1110 decides an input from a source device to which switching is performed based on the display position of the image (the image transmitted from the source device) to be displayed on the display unit. The display control unit 1110 notifies the mode request content switching unit 1120 of the decided content (1111).

The display control unit 1110 decides an input from a source device that is turned on and an input from a source device that is turned off based on the display position. After the sink device 1100 and the source device are linked, a stop operation, a reproduction operation, a disconnection operation, a start operation, and the like can be appropriately performed through the interchange between the sink device 1100 and the source device.

The display control unit 1110 can implement exclusive control by ignoring the forward channel information for the ports of the source devices 1211 to 1214. The display control unit 1110 can implement exclusive control by outputting a transmission stop message to the ports.

The mode request content switching unit 1120 switches and receives the forward channel information transmitted from the source devices based on the content decided by the display control unit 1110, and outputs the received information to the display control unit 1110. For example, the mode request content switching unit 1120 receives only the forward channel information transmitted from the source device decided by the display control unit 1110, and outputs the information to the display control unit 1110.

Figure 10:
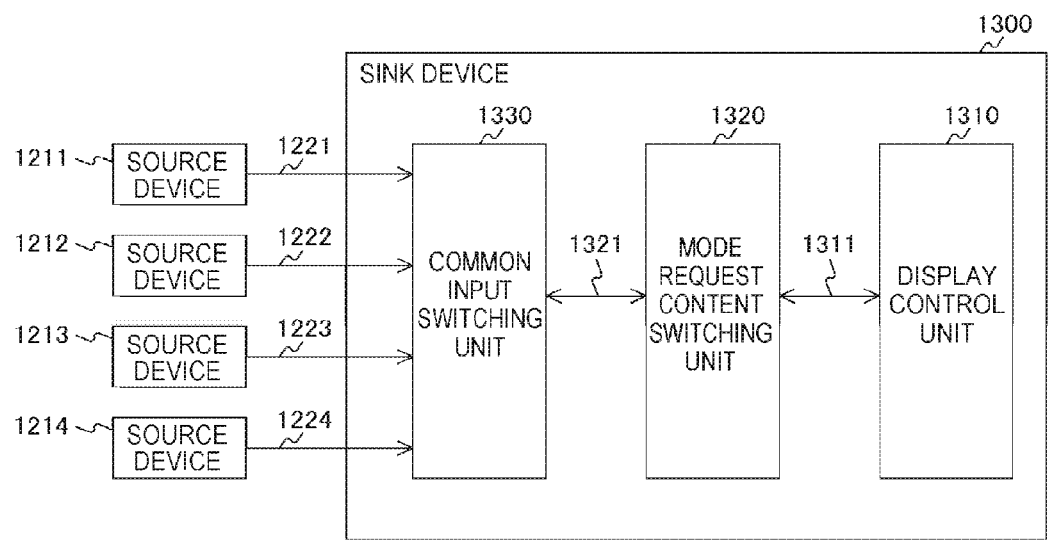
FIG. 10 is a diagram illustrating a configuration example when a sink device performs on-off control of a mode request according to the first embodiment of the present technology.

FIG. 10 is a diagram illustrating a configuration example when the sink device performs on-off control of the mode request according to the first embodiment of the present technology.

FIG. 10 illustrates an example in which the on-off control of the mode request is performed between one sink device 1300 and a plurality of source devices 1211 to 1214 according to the decision method (R2). In other words, the sink device 1300 prepares one port for a bundle of forward channel information, and manages the source devices based on an ID header inserted into a packet. The source devices 1211 to 1214 are the same as the source devices 1211 to 1214 illustrated in FIG. 9.

The sink device 1300 includes a display control unit 1310, a mode request content switching unit 1320, and a common input switching unit 1330. The display control unit 1310, the mode request content switching unit 1320, and the common input switching unit 1330 correspond to the stream reception unit 330 and the control unit 370 illustrated in FIG. 3.

The display control unit 1310 decides an input from a source device which switching is performed based on the display position of the image (the image transmitted from the source device) to be displayed on the display unit. The display control unit 1310 notifies the mode request content switching unit 1320 of the decided content (1311).

The display control unit 1310 decides an input from a source device that is turned on and an input from a source device that is turned off based on the display position. After the sink device 1300 and the source device are linked, a stop operation, a reproduction operation, a disconnection operation, a start operation, and the like can be appropriately performed through the interchange between the sink device 1300 and the source device.

The mode request content switching unit 1320 receives the forward channel information transmitted from the source devices switched by the common input switching unit 1330 based on the content decided by the display control unit 1310. Then, the mode request content switching unit 1320 output the received information to the display control unit 1310.

The common input switching unit 1330 receives information corresponding to a predetermined standard and outputs the received information to the mode request content switching unit 1320. For example, the common input switching unit 1330 receives, for example, the ID information of each source device and control data.

The common input switching unit 1330 performs switching as to an input from a source device that is turned on and an input from a source device that is turned off based on the ID information of each source device that is decided in advance and the request transmitted from the mode request content switching unit 1320.

[On-Off Control Example of UIBC]

The decision methods can be applied to the UIBC. In this regard, an on-off control example of the UIBC will be described below.

Figure 11:
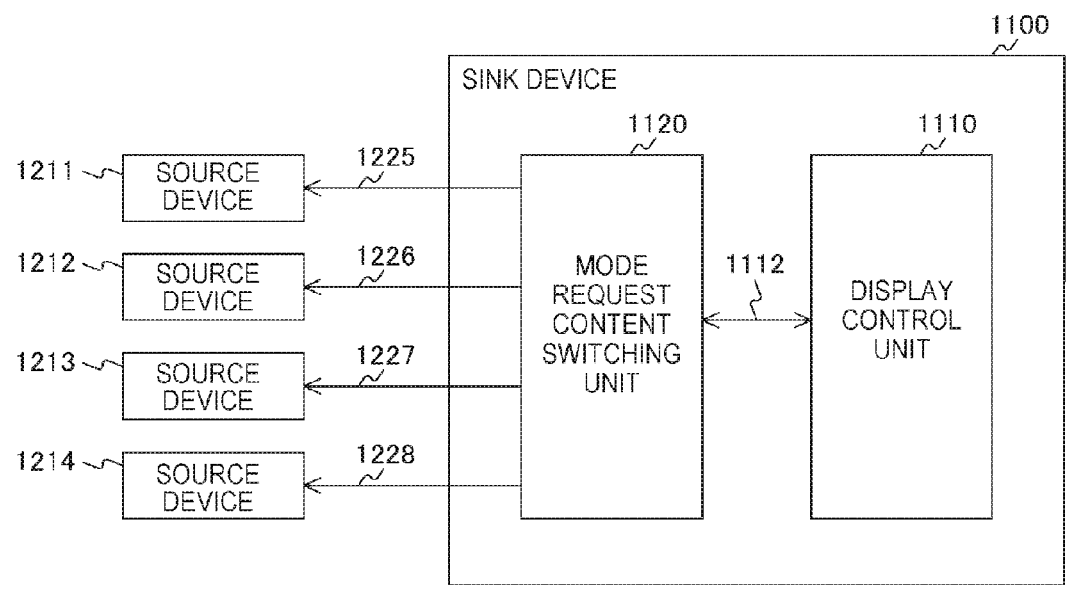
FIG. 11 is a diagram illustrating a configuration example when a sink device performs on-off control of a UIBC according to the first embodiment of the present technology.

FIG. 11 is a diagram illustrating a configuration example when the sink device performs the on-off control of the UIBC according to the first embodiment of the present technology.

FIG. 11 illustrates an example in which the on-off control of the UIBC is performed between one sink device 1100 and a plurality of source devices 1211 to 1214 according to the decision method (R1). In other words, an example in which the sink device 1100 prepare a plurality of ports for a plurality of source devices 1211 to 1214, and selects the UIBC based on the request from the upper layer or the state of the display screen. For example, the sink device 1100 can set an off state of the UIBC based on the Off request from the upper layer. Further, for example, the sink device 1100 can set the off state of the UIBC based on the display state of the display screen in the sink device 1100.

Each of the source devices 1211 to 1214 transmits UIBC information to the sink device 1100. The sink device 1100 transmits the UIBC information to each of the source devices 1211 to 1214 (1225 to 1228).

The display control unit 1110 decides an input from a source device which switching is performed based on the display position of the image (the image transmitted from the source device) to be displayed on the display unit. The display control unit 1110 notifies the mode request content switching unit 1120 of the decided content (1112).

The display control unit 1110 decides an input from a source device that is turned on and an input from a source device that is turned off based on the display position. After the sink device 1100 and the source device are linked, a stop operation, a reproduction operation, a disconnection operation, a start operation, and the like can be appropriately performed through the interchange between the source device 1100 and the sink device.

The display control unit 1110 can implement exclusive control by ignoring the UIBC information for the ports of the source devices 1211 to 1214. The display control unit 1110 can implement exclusive control by outputting a transmission stop message to the ports.

The mode request content switching unit 1120 switches and receives the UIBC information transmitted from the source devices based on the content decided by the display control unit 1110, and outputs the received information to the display control unit 1110. For example, the mode request content switching unit 1120 receives only the UIBC information transmitted from the source device decided by the display control unit 1110, and outputs the information to the display control unit 1110.

Figure 12:
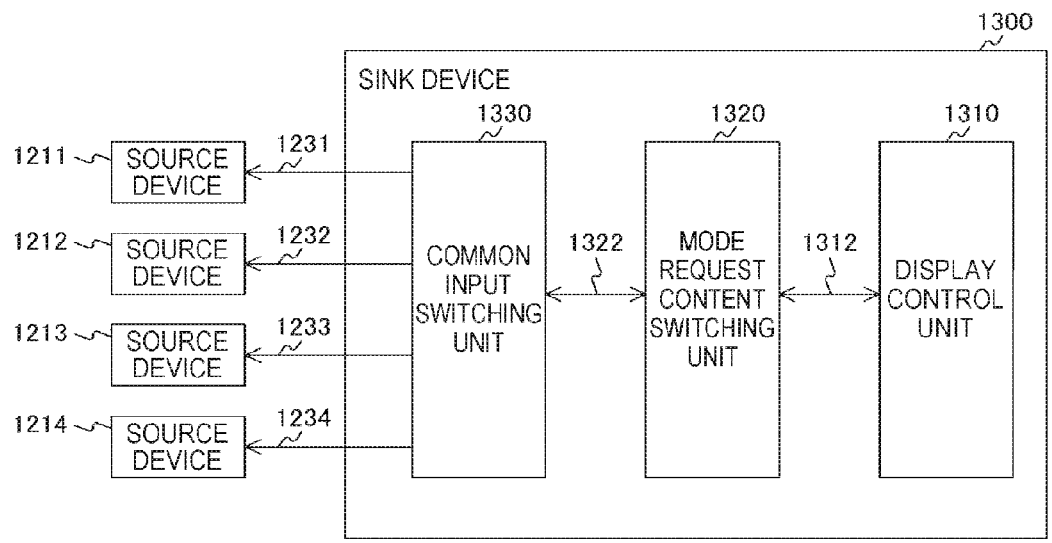
FIG. 12 is a diagram illustrating a configuration example when a sink device performs on-off control of a UIBC according to the first embodiment of the present technology.

FIG. 12 is a diagram illustrating a configuration example when the sink device performs the on-off control of the UIBC according to the first embodiment of the present technology.

FIG. 12 illustrates an example in which the on-off control of the UIBC is performed between one sink device 1300 and a plurality of source devices 1211 to 1214 according to the decision method (R2). In other words, the sink device 1300 prepares one port for a bundle of UIBC information, and manages the source devices based on an ID header inserted into a packet.

The display control unit 1310 decides an input from a source device to which switching is performed based on the display position of the image (the image transmitted from the source device) to be displayed on the display unit. The display control unit 1310 notifies the mode request content switching unit 1320 of the decided content (1312).

The display control unit 1310 decides an input from a source device that is turned on and an input from a source device that is turned off based on the display position. After the sink device 1300 and the source device are linked, a stop operation, a reproduction operation, a disconnection operation, a start operation, and the like can be appropriately performed through the interchange between the source device 1300 and the sink device.

The mode request content switching unit 1320 receives the UIBC information transmitted from the source devices switched by the common input switching unit 1330 based on the content decided by the display control unit 1310. Then, the mode request content switching unit 1320 output the received information to the display control unit 1310.

The common input switching unit 1330 receives information corresponding to a predetermined standard and outputs the received information to the mode request content switching unit 1320. For example, the common input switching unit 1330 receives, for example, the ID information of each source device and control data. The common input switching unit 1330 decides an input from a source device that is turned on and an input from a source device that is turned off based on the ID information of each source device that is decided in advance and the request transmitted from the mode request content switching unit 1320. For example, the mode request content switching unit 1320 receives only the UIBC information transmitted from the source device decided by the display control unit 1310, and outputs the information to the display control unit 1310.

[On-Off Control Example of UIBC at Time of Multi-Sink]

Next, the on-off control example of the UIBC when a plurality of source devices are connected with the sink device will be described.

Figure 13:
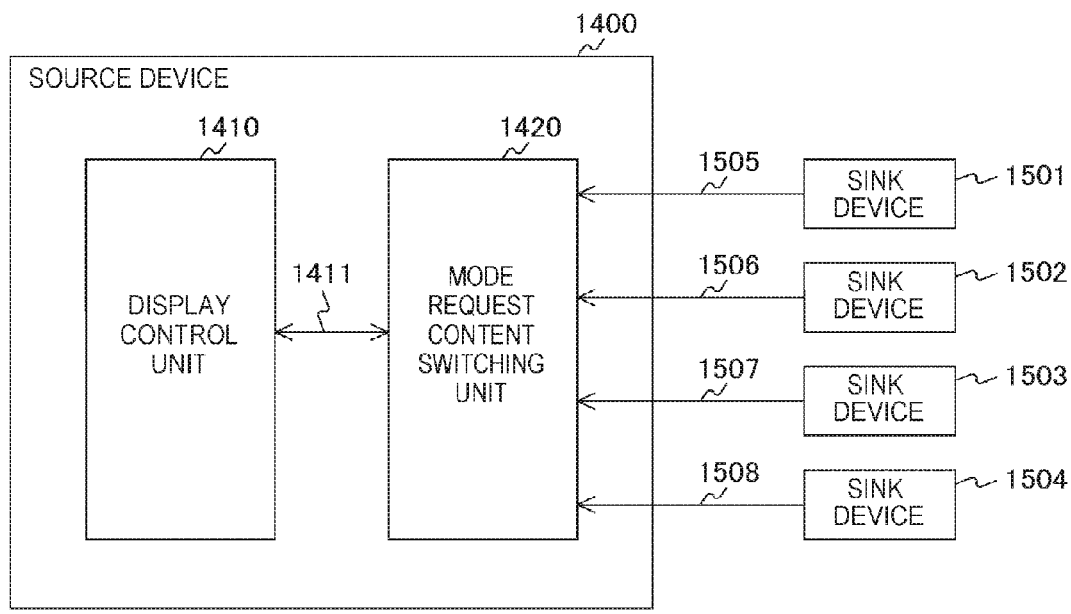
FIG. 13 is a diagram illustrating a configuration example when a sink device performs on-off control of a UIBC according to the first embodiment of the present technology.

FIG. 13 is a diagram illustrating a configuration example when the sink device performs the on-off control of the UIBC according to the first embodiment of the present technology.

FIG. 13 illustrates an example in which the on-off control of the UIBC is performed between a plurality of sink devices 1501 to 1504 and one source device 1400 according to the decision method (R1). In other words, an example in which the source device 1400 prepares a plurality of ports for a plurality of sink devices 1501 to 1504, and the UIBC is selected based on the request from the upper layer or the manipulation of the user on the display screen is illustrated. For example, the source device 1400 can perform the Off request for the UIBC based on the Off request from the upper layer. Further, for example, the source device 1400 can perform the Off request for the UIBC based on the manipulation of the user on the display screen in the sink device 1100.

Each of the sink devices 1501 to 1504 transmits the UIBC information to the source device 1400 (1505 to 1508).

A display control unit 1410 decides an input from a sink device to which switching is performed based on the display position of the image (the image transmitted from the source device) to be displayed on the display unit of each of the sink devices 1501 to 1504. The display control unit 1410 notifies a mode request content switching unit 1420 of the decided content (1411).

The display control unit 1410 decides an input from a sink device that is turned on and an input from a sink device that is turned off based on the display position. After the source device 1400 and the sink device are linked, a stop operation, a reproduction operation, a disconnection operation, a start operation, and the like can be appropriately performed through the interchange between the source device 1400 and the sink device.

The display control unit 1410 can implement exclusive control by ignoring the UIBC information for the ports of the sink devices 1501 to 1504. The display control unit 1410 can implement exclusive control by outputting a transmission stop message to the ports.

The mode request content switching unit 1420 switches and receives the UIBC information transmitted from the sink devices based on the content decided by the display control unit 1410, and outputs the received information to the display control unit 1410. For example, the mode request content switching unit 1420 receives only the UIBC information transmitted from the sink device decided by the display control unit 1410, and outputs the information to the display control unit 1410.

Figure 14:
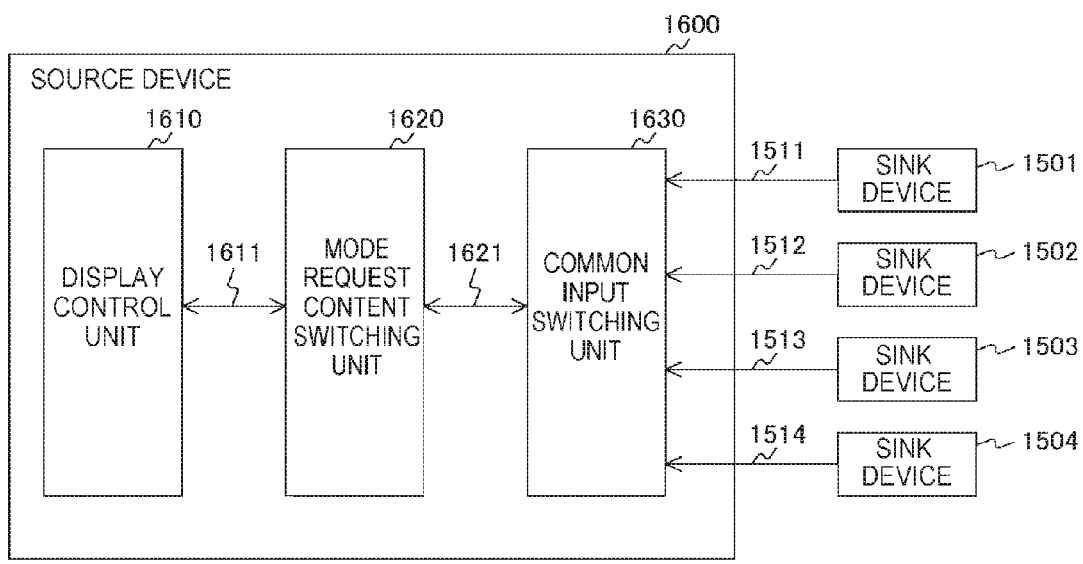
FIG. 14 is a diagram illustrating a configuration example when a sink device performs on-off control of a UIBC according to the first embodiment of the present technology.

FIG. 14 is a diagram illustrating a configuration example when the sink device performs the on-off control of the UIBC according to the first embodiment of the present technology.

FIG. 14 illustrates an example in which the on-off control of the UIBC is performed between a plurality of sink devices 1501 to 504 and one source device 1600 according to the decision method (R2). In other words, the source device 1600 prepares one port for a bundle of UIBC information, and manages the sink devices based on an ID header inserted into a packet.

A display control unit 1610 decides an input from a sink device to which switching is performed based on the display position of the image (the image transmitted from the source device) displayed on the display unit of each of the sink device. The display control unit 1610 notifies a mode request content switching unit 1620 of the decided content (1611).

The display control unit 1610 decides an input from a sink device that is turned on and an input from a sink device that is turned off based on the display position. After the source device 1600 and the source device are linked, a stop operation, a reproduction operation, a disconnection operation, a start operation, and the like can be appropriately performed through the interchange between the source device 1600 and the sink device.

The mode request content switching unit 1620 receives the UIBC information transmitted from the sink devices switched by a common input switching unit 1630 based on the content decided by the display control unit 1610. Then, the mode request content switching unit 1620 outputs the received information to the display control unit 1610 (1611).

The common input switching unit 1630 receives information corresponding to a predetermined standard, and outputs the received information to the mode request content switching unit 1620 (1621). For example, the common input switching unit 1630 receives, for example, the ID information of each sink device and the control data. The common input switching unit 1630 decides an input from a sink device that is turned on and an input from a sink device that is turned off based on the ID information of each sink device that is decided in advance and the request transmitted from the mode request content switching unit 1620. For example, the mode request content switching unit 1620 receives only the UIBC information transmitted from the sink device decided by the display control unit 1610, and outputs the information to the display control unit 1610.

As described above, the control data and the UIBC information can be interchanged between the sink device and the source device. Further, for example, since the control data and the UIBC information can be efficiently interchanged between the sink device and the source device, it is possible to share the port or use the WebSocket, for example. In this regard, an example in which each piece of information is interchanged between the source device and the sink device using the WebSocket will be described with reference to FIGS. 20 and 21.

The present technology is not limited to this example. For example, in the embodiment of the present technology, the on-off control examples of the forward channel, the control data, and the UIBC information have been described, but the present technology is not limited thereto. For example, the same on-off control may be performed even in the RTSP command (a play/pause, a standby/resume, an IDR refresh request, or the like) illustrated in FIG. 18 and FIG. 19. A collaboration operation can be also performed between devices such that the on-off control is performed during a short period so that the on-off control is not recognized from a point of view of the user. The on-off control may refer to a technique of controlling a connection, a disconnection, a start, a stop, validation (reception), and invalidation (ignoring).

Figure 15:
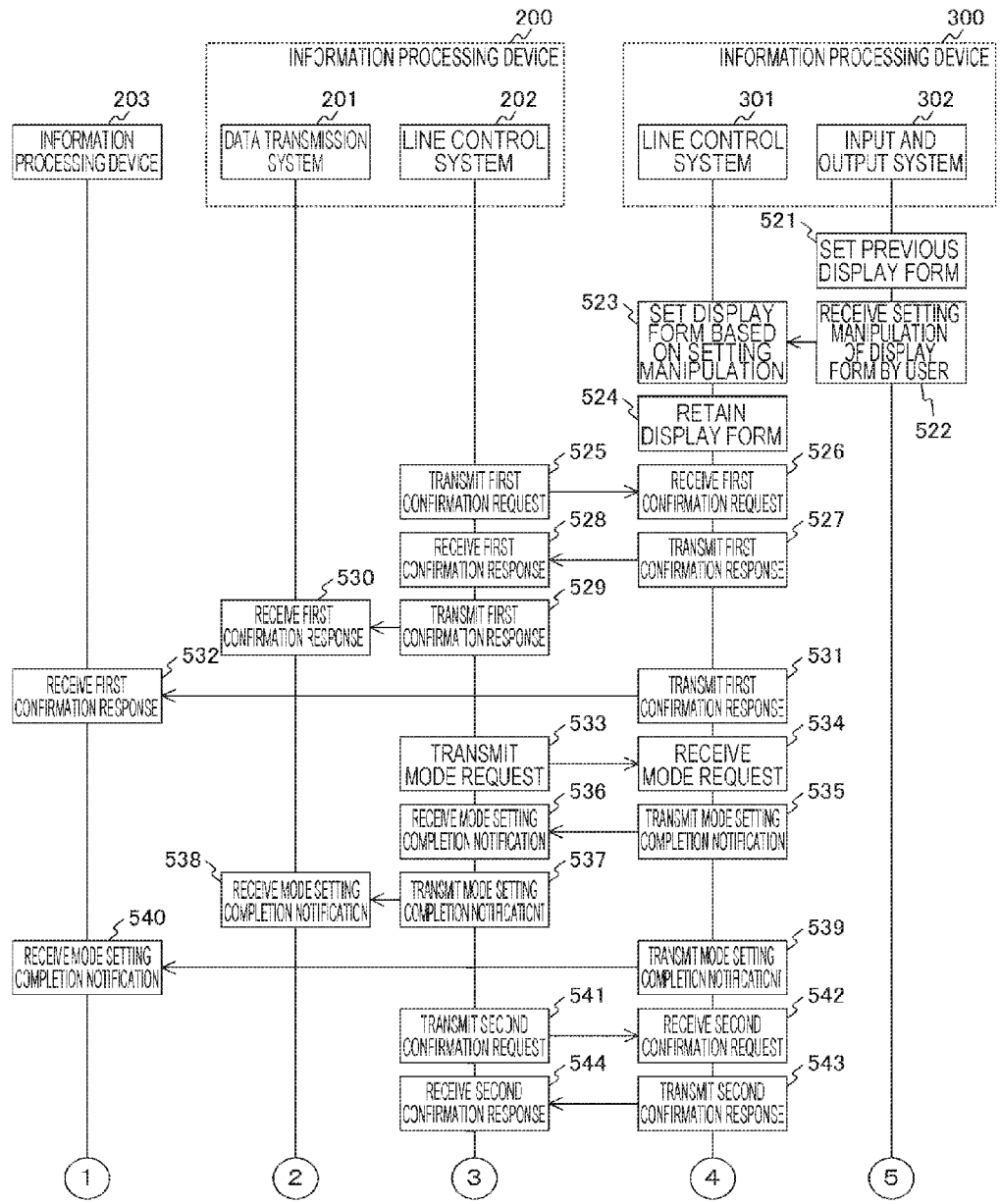
FIG. 15 is a sequence chart illustrating a communication process example between devices included in the communication system 100 according to the first embodiment of the present technology.
Figure 16:
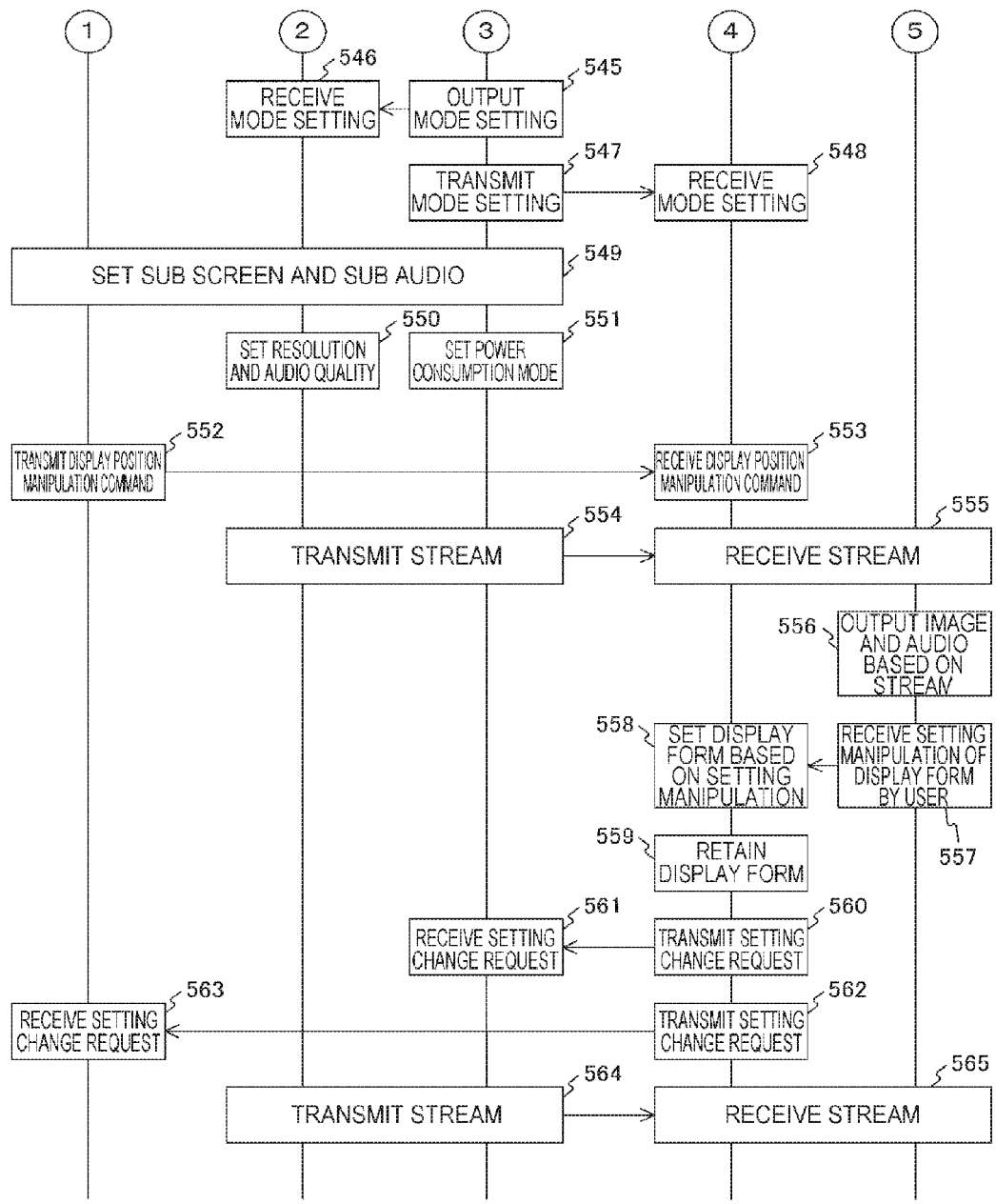
FIG. 16 is a sequence chart illustrating a communication process example between devices included in the communication system 100 according to the first embodiment of the present technology.

For example, a device (for example, a display position control client) other than the source device and the sink device may be added, and the device may manipulate the source devices through the sink device. This example is illustrated in FIGS. 15 and 16. In other words, FIGS. 15 and 16 illustrates an example in which an information processing device 203 (a display position control client) is added, and the information processing device 203 manipulates the information processing device 200 (the source device) through the information processing device 300 (the sink device).

Here, the added device (the device other than the source device and the sink device) may be one or more input device such as a keyboard, a mouse, a joystick or may be connected with the sink device in a wired or wireless manner. A plurality of input devices may be fixedly or removably installed in the sink device. As described above, when the sink device includes a plurality of input devices (for example, including a removable, wired, or wireless connection) manipulation information of a plurality of input devices is included in the UIBC information and transmitted through one or more sink devices. At this time, ID information inserted into a packet of the UIBC information may be inserted as a plurality of pieces of ID information related to a plurality of input devices.

[Communication Example]

FIGS. 15 and 16 are sequence charts illustrating a communication process example between the devices included in the communication system 100 according to the first embodiment of the present technology.

FIGS. 15 and 16 illustrate an example of a communication process when the display position control client (the information processing device (the source device) 203) other than the information processing device 200 (the source device) and the information processing device 300 (the sink device) detects the display position of the sink device. The display position control client (the information processing device 203) is a control client that detects the display position of the information processing device 300 (the sink device), and causes a display position image of the information processing device 300 (the sink device) to be displayed on a display device (not illustrated). For example, the display position and the size of each image displayed on the information processing device 300 (the sink device are displayed on the display device for each source device. Thus, the user of the source device can recognize each image.

In FIGS. 15 and 16, the image and audio signal generation unit 250, the image and audio compression unit 260, and the stream transmission unit 270 among the units included in the information processing device 200 are illustrated as a data transmission system 201. The antenna 210, the wireless communication unit 220, the control signal reception unit 230, and the control unit 240 are illustrated as a line control system 202.

In FIGS. 15 and 16, the antenna 310, the wireless communication unit 320, the stream reception unit 330, the control unit 370, and the control signal transmission unit 380 in the configuration of the information processing device 300 are illustrated as a line control system 301. The image and audio decompression unit 340, the image and audio output unit 350, and the user information acquisition unit 360 are illustrated as an input and output system 302.

First, when the information processing device 300 is powered up, a previous display form (which is a display form when the information processing device 300 is powered down) is set as a display form (which is an image display form and an audio display form) of the information processing device 300 (521). The control unit 370 of the information processing device 300 causes the management information retention unit 390 to retain the management information of each source device connected to the information processing device 300 using the wireless communication (illustrated in FIG. 4). As illustrated in FIG. 5, the control unit 370 of the information processing device 300 causes the display unit 351 to display the images 11 and 12 corresponding to two streams respectively transmitted from the information processing devices 200 and 400 based on the previous display form.

Subsequently, a case in which the user performs a manipulation of setting the display form (changing manipulation) is assumed (522). In this case, a control signal related to the setting manipulation is acquired as the user information by the user information acquisition unit 360 and the user information is output to the control unit 370. Then, the control unit 370 changes the content retained in the management information retention unit 390 (illustrated in FIG. 4) based on the user information (523 and 524). For example, as illustrated in FIG. 5b, a case in which the setting manipulation (changing manipulation) is performed to set the image 11 based on the image data from the information processing device 200 as the peripheral channel is assumed. In this case, the control unit 370 changes the display form 396 (illustrated in FIG. 4) of the information processing device 200 in the management information retention unit 390 to "SUB" (523 and 524).

Further, at the time of the Capability Negotiation from the information processing device 200 to the information processing device 300, each request can be performed, and the information processing device 300 can transmit the capability related to its own information processing device. For example, the information processing device 200 transmits the first confirmation request to the information processing device 300 (525 and 526). The first confirmation request is used to request the display area size of the information processing device 200, the display area size (however, it is not a transmission resolution) corresponding to the multiple sources, and the display position of the information processing device 200.

When the first confirmation request is received (526), the information processing device 300 transmits the first confirmation response to the information processing device 200 (527 to 530). The first confirmation response is used to transmits a response of the display area size of the information processing device 200, the display area size (however, it is not a transmission resolution) corresponding to the multiple sources, and the display position of the information processing device 200. The information processing device 300 transmits the first confirmation response to the information processing device 203 (531 and 532). In this case, the information processing device 300 may include each piece of information (the display area size of another source device, the display area size corresponding to the multiple sources, and the display position of another source device) of another source device other than the information processing device 200 in the first confirmation response and transmit the resulting first confirmation response to the information processing device 203. Thus, the information processing device 203 can rapidly detect the display position of each source device in the sink device.

The information processing device 200 transmits the mode request (including a designation of the display position) to the information processing device 300 (533, 534). Thus, the information processing device 200 can designate the display position for the information processing device 300.

When the mode request is received (534), the information processing device 300 transmits the mode setting completion notification (including a designation of the display position) to the information processing device 200 (535 to 538). The information processing device 300 transmits the mode setting completion notification (including a designation of the display position) to the information processing device 203 (539 and 540). Thus, the information processing device 203 can cause the image to be displayed at the designated display position.

The information processing device 200 transmits a second confirmation request to the information processing device 300 (541 and 542). The second confirmation request is used to request the confirmation related to the resolution/audio quality/power consumption performance, and for example, the first confirmation request may be an operation of a future standard of the Wi-Fi standard (for example, Wi-Fi CERTIFIED Miracast), and the second confirmation request may be an operation within the current Wi-Fi standard (for example, Wi-Fi CERTIFIED Miracast).

When the second confirmation request is received (542), the information processing device 300 transmits a second confirmation response to the information processing device 200 (543 and 544). The second confirmation response is used to transmit a response of the confirmation related to the resolution/audio quality/power consumption performance.

The first and second confirmation requests and the first and second confirmation responses are an example, and the first and second confirmation requests and the first and second confirmation responses may be interchanged at the same time or may be interchanged in different order. Further, other content may be simultaneously or sequentially transmitted.

When the second confirmation response is received (544), the line control system 202 of the information processing device 200 outputs a mode setting (including a designation of the display position) to the data transmission system 201

(545 and 546). The line control system 202 of the information processing device 200 transmits the mode setting (including a designation of the display position) to the information processing device 300 (547 and 548). The mode setting is used to perform a setting related to resolution/audio quality/power consumption performance.

Here, the display position of the image transmitted from the information processing device 200 is assumed to be changed from the middle screen (the main screen) to the peripheral screen (the sub screen) (549). In this case, in the information processing device 200, settings for changing to the peripheral screen (the sub screen) are performed (550 and 551). The information processing device 203 displays the image (the image of the information processing device 200) of the display position in the information processing device 300 as the sub screen. The information processing device 203 transmits a command (a display position manipulation command) for manipulating the display position of the information processing device 200 to the information processing device 300 (552 and 553).

The information processing device 300 receives a stream from the information processing device 200 (554 and 555), and causes an image based on the stream to be displayed on the display unit 351 (556). Then, when the change to the display position requested by the display position manipulation command is performed, the information processing device 300 performs a setting change so that a resolution, an audio, and power consumption that are optimum for the information processing device 300 are set. Further, when the setting manipulation (the change manipulation) of the display form by the user is performed (557), each process is performed according to the setting manipulation (558 and 559). Then, the information processing device 300 transmits a setting change request for performing the setting change to the information processing devices 200 and 203 (560 to 563).

The information processing device 300 receives a stream from the information processing device 200 (564 and 565).

As described above, it is possible to notify the source device of the display position of the sink device in real time, and it is possible to control the display position from the source device.

In the example illustrated in FIGS. 15 and 16, a plurality of source devices are connected to the sink device, but the embodiment of the present technology is not limited to this example. For example, it is possible to correspond even to a connection environment in which only one source device is connected to the sink device (the information processing device 300).

As the screen displayed by the sink device (the information processing device 300), the sink device (the information processing device 300) may receive and display not only the image received from the source device (the information processing device 200) but also the image information received from another connection line with which the sink device (the information processing device 300) is equipped. For example, it is possible to correspond to even when an information processing device that conforms to the Hybridcast standard is used as the sink device. For example, a device (for example, a video viewing device) that conforms to the Hybridcast standard can receive auxiliary information (including a moving image) from a communication line while receiving an image (video) from a broadcast wave. In this regard, the image of the source device (the information processing device 200) may be displayed in a part of an environment that conforms to the Hybridcast standard. This example will be described in a fourth embodiment of the present technology.

Further, the information processing device 300 may perform control such that a sum data transmission speed of the two streams transmitted from each of the information processing devices 200 and 400 is minimized. For example, a maximum allowable value of the sum data transmission speed is set in the control unit 370 of the reception side information processing device 300. After the control unit 370 transmits a change request for decreasing a bit rate to the information processing device 200, the control unit 370 acquires bit rates of two streams transmitted from the information processing devices 200 and 400 from the stream reception unit 330. Subsequently, the control unit 370 calculates a sum data transmission speed of the acquired two streams. Subsequently, the control unit 370 decides the bit rate of the streams transmitted from the information processing device 400 within a range not greater than the set maximum allowable value and transmits a change request for increasing the bit rate to the information processing device 400. When the packet error rate (PER) is large and thus is not receivable in the same frequency channel despite of the setting of the minimum bit rate, a different frequency channel may be used. When the images (the middle channel and the peripheral channel) are paused for a given time or more, the image data may be stopped as long as a manipulation (for example, pointing) is not performed by the user.

In this way, according to the first embodiment of the present technology, even when one sink device receives a plurality of streams transmitted from a plurality of source devices, appropriate stream transmission control (for example, the data transmission speed control) can be performed according to a manipulation, a situation, and an intention of the user. For example, it is possible to decrease the data transmission speeds of some of the plurality of image and audio streams and increase the data transmission speeds of the remaining streams according to an operation, a situation, and an intention of the user.

For example, when a sink device receives and displays a plurality of streams, important images and audios with high quality set timely by the user can be enjoyed. For the otherwise images and audios, the data transmission speeds can be adjusted automatically to the optimum frequency channel, power consumption, and transmission rate. Further, it is possible to manipulate the connection control in real time while stably operating the image transmission mode.

Here, for the management information retained in the management information retention unit 390, a command prepared in Wi-Fi Certified Miracast can be used for exchanging the management information. In this case, capability negotiation or capability re-negotiation defined in the Wi-Fi Display specification can be used. Here, as capability negotiation or capability re-negotiation, for example, RFC5939 or the Wi-Fi Certified Miracast specification can be exemplified. However, capability negotiation or capability re-negotiation is not limited thereto, but is defined as interchange of the device performance information. A communication example of the interchange using a command of the Wi-Fi Certified Miracast specification is illustrated in FIGS. 17 to 19.

[Communication Example of Interchange Using Wi-Fi Certified Miracast Specification Command]

Figure 17:
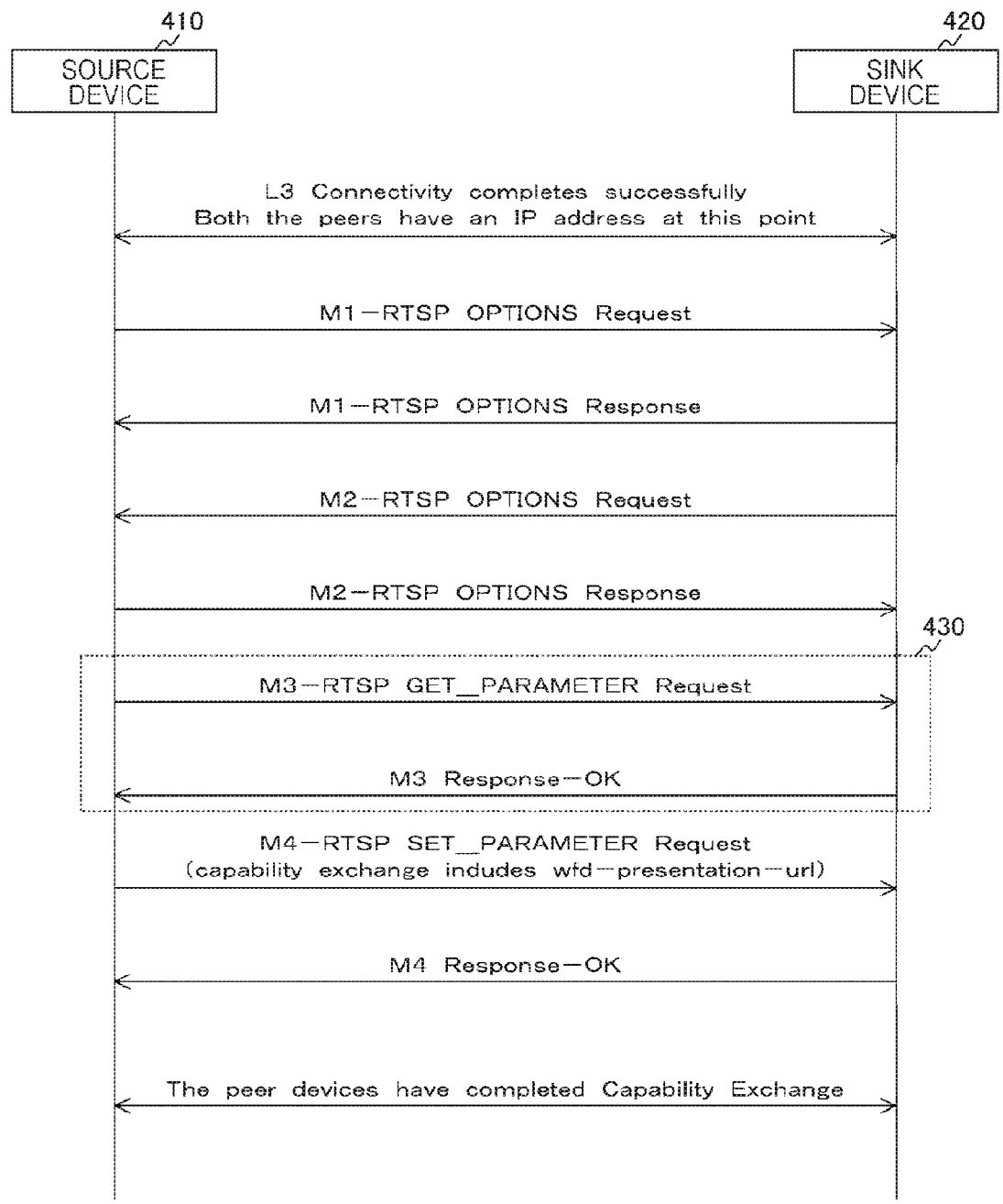
FIG. 17 is a sequence chart illustrating a communication process example between a source device 410 and a sink device 420 according to the first embodiment of the present technology.
Figure 18:
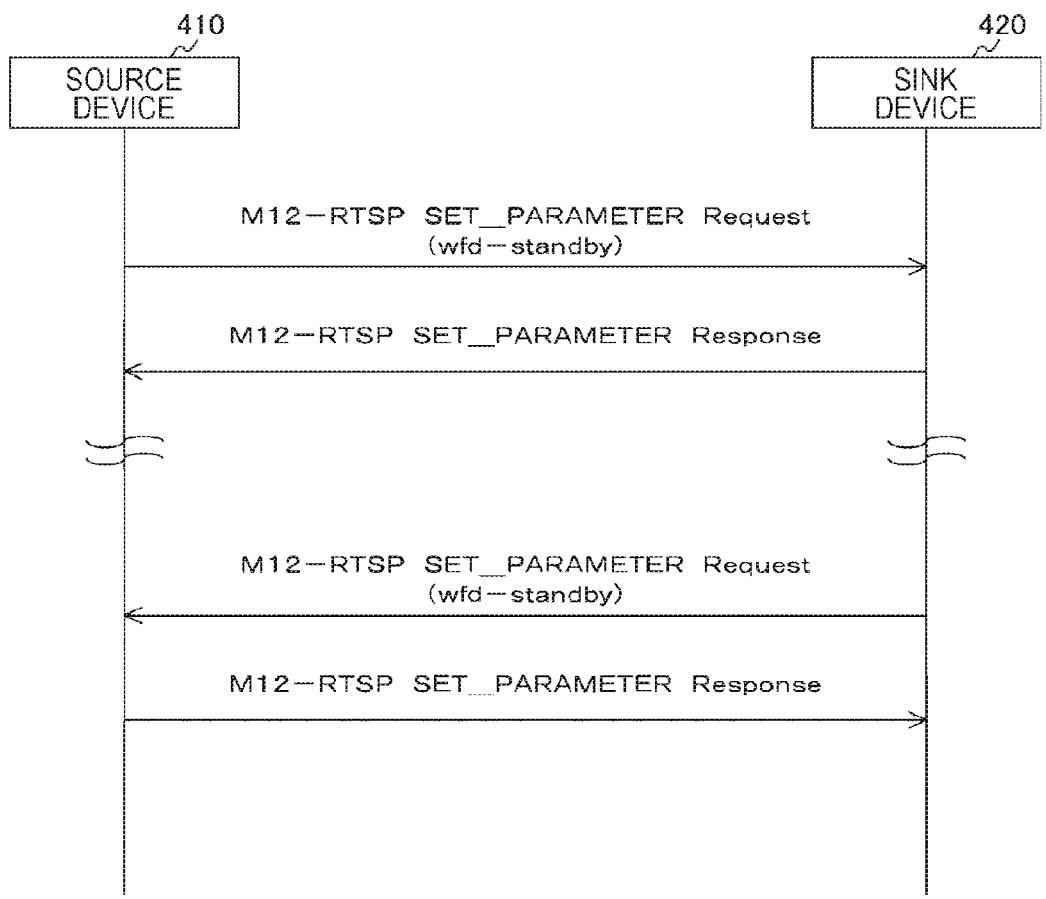
FIG. 18 is a sequence chart illustrating a communication process example between a source device 410 and a sink device 420 according to the first embodiment of the present technology.
Figure 19:
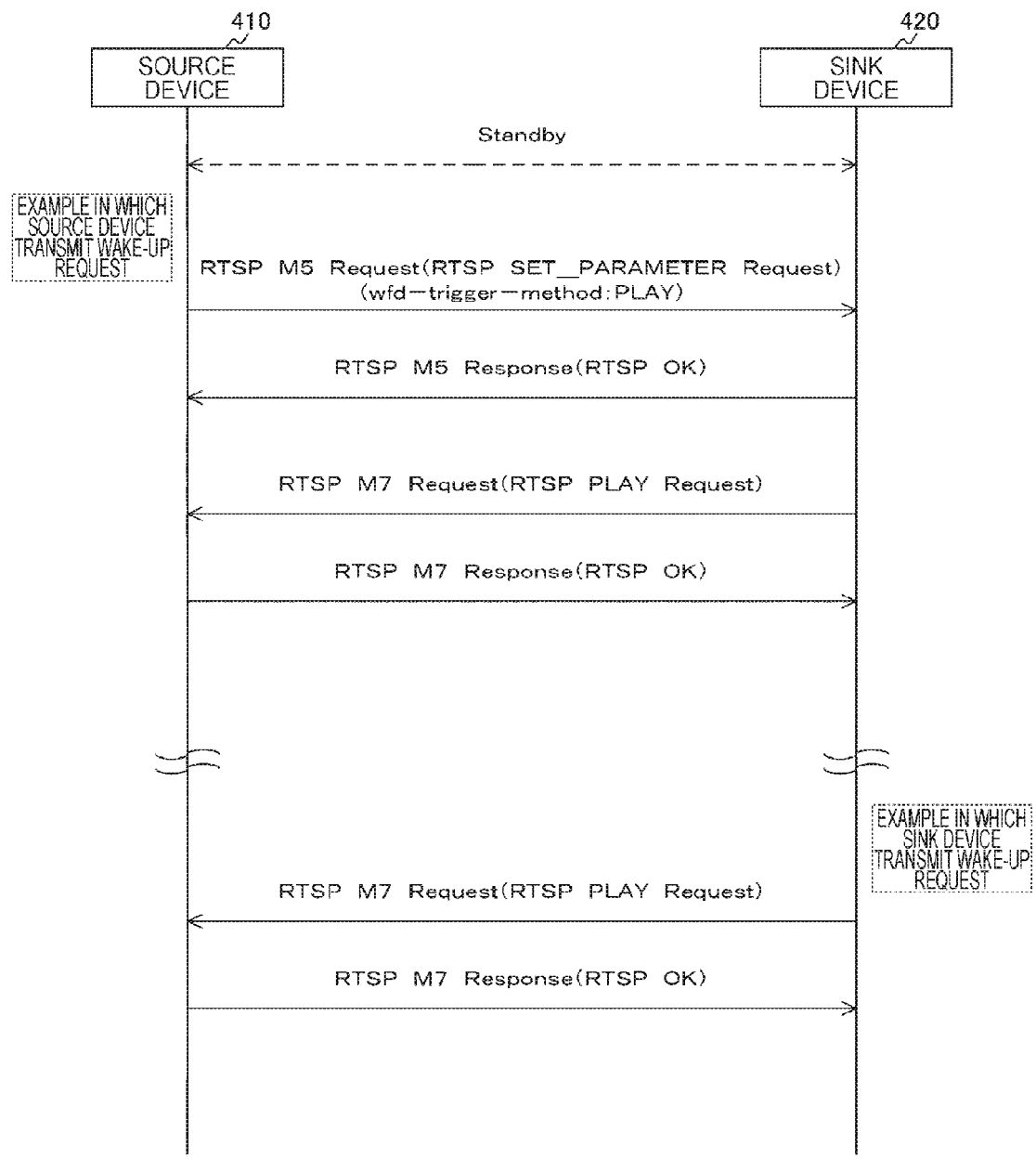
FIG. 19 is a sequence chart illustrating a communication process example between a source device 410 and a sink device 420 according to the first embodiment of the present technology.

FIGS. 17 to 19 are sequence charts illustrating a communication process example between a source device 410 and a sink device 420 according to the first embodiment of the present technology. FIGS. 17 to 19 illustrate a communication example of interchange using an RTSP protocol. A source device 410 corresponds to the information processing devices 200 and 400 and a sink device 420 corresponds to the information processing device 300.

First, the description will be made with reference to FIG. 17. For example, as indicated by a dotted rectangle 430 of FIG. 17, an "RTSP M3 Request" (RTSP GET_PARAMETER Request) message transmitted from the source device 410 to the sink device 420 and an "RTSP M3 Response" (RTSP GET_PARAMETER Response) message transmitted from the sink device 420 to the source device 410 in response to the "RTSP M3 Request" (RTSP GET_PARAMETER Request) message can be used.

On the other hand, the messages may be appropriately transmitted from the source device 410 to the sink device 420. For example, the interchange of the "RTSP M3 Request" (RTSP GET_PARAMETER Request) message and the "RTSP M3 Response" (RTSP GET_PARAMETER Response) message may be omitted, the management information may be included in a message to be transmitted from the source device 410 to the sink device 420, the management information may be transmitted from the source device 410 to the sink device 420, and the sink device may select the information and retain the information in the management information retention unit 390. For example, when the content protection setting is performed, link protection setup is performed after M3 Response. Therefore, it is desirable to perform communication while ensuring a secrecy ability of a link set once by transmitting only messages of M4 or higher.

The interchange of information regarding the power consumption mode can be performed with predetermined messages using the RTSP protocol. For example, three kinds of management information of the following (1) to (3) can be exchanged.

(1) "setting to the standby mode,"
(2) "when the source device cancels the standby mode or when the source device cancels the standby mode of the sink device," and
(3) "when the sink device cancel the standby mode or when the sink device cancels the standby mode of the source device."

Now, the description will be made with reference to FIG. 18. For example, when a command prepared in Wi-Fi Certified Miracast is used, an "RTSP M12 Request" (RTSP SET_PARAMETER (with WFD-standby)) message transmitted from the source device 410 to the sink device 420 and an "RTSP M12 Response" (RTSP OK) message transmitted from the sink device 420 to the source device 410 in response to the "RTSP M12 Request" (RTSP SET_PARAMETER (with WFD-standby)) message can be used in the interchange of (1) "setting to the standby mode," as described above. On the other hand, the same also applies to the setting to the standby mode from the sink device 420 to the source device 410.

Next, the description will be made with reference to FIG. 19. For example, (2) "when the source device cancels the standby mode or when the source device cancels the standby mode of the sink device," as described above, the source device 410 interchanges an "RTSP M5 Request" (RTSP SET_PARAMETER (Request (wfd-trigger-method: PLAY)) message transmitted to the sink device 420 and an "RTSP M5 Response" (RTSP OK) message transmitted from the sink device 420 to the source device 410 in response to the "RTSP M5 Request" (RTSP SET_PARAMETER (Request (wfd-trigger-method: PLAY)) message. The sink device 420 can uses an "RTSP M7 Request" (RTSP PLAY Request) message transmitted to the source device 410 and an "RTSP M7 Response" (RTSP OK) message transmitted from the source device 410 to the sink device 420 in response to the "RTSP M7 Request" (RTSP PLAY Request) message.

For example, (3) "when the sink device cancel the standby mode or when the sink device cancels the standby mode of the source device," as described above, the sink device 420 can use the "RTSP M7 Request" (RTSP PLAY Request) message transmitted to the source device 410 and the "RTSP M7 Response" (RTSP OK) message transmitted from the source device 410 to the sink device 420 in response to the "RTSP M7 Request" (RTSP PLAY Request) message.

In this way, the wireless communication unit 320 can perform the exchange of the capability information with capability negotiation or capability re-negotiation defined in the Wi-Fi Display specification. For example, the capability information is exchanged with the RTSP M3 message in capability negotiation or capability re-negotiation.

In this way, for example, the wireless communication unit 320 of the information processing device 300 performs the communication with the information processing device 200 to exchange the capability information regarding the information processing device 300 and the capability information regarding the information processing device 200. The wireless communication unit 220 of the information processing device 200 performs the communication with the information processing device 300 to exchange the capability information regarding the information processing device 200 and the capability information regarding the information processing device 300. In this case, the wireless communication units 220 and 320 can exchange the capability information with capability negotiation or capability re-negotiation.

The control unit 370 of the information processing device 300 performs the stream transmission control with the information processing device 200 based on the capability information regarding the information processing device 200, the radio wave propagation measurement information regarding the communication with the information processing device 200, and the use of the information processing device 300. A stream transmission method is different from in the embodiment of the present technology, but the control unit 240 of the information processing device 200 can also perform the stream transmission control with the information processing device 300 based on the control performed from the information processing device 300 based on the capability information regarding the information processing device 200 and the radio wave propagation measurement information regarding the communication of the stream with the information processing device 300.

The control unit 370 of the information processing device 300 performs the control such that the power consumption mode is set in the information processing device 200 based on the capability information (for example, the information indicating whether the device is a mobile device) regarding the information processing device 200. In this case, the control unit 370 can perform the control such that the low power consumption mode is set in the information processing device 200 based on the capability information regarding the information processing device 200 and the management information for managing the information processing device 200. The control unit 240 of the information processing device 200 sets the power consumption mode based on the control performed from the information processing device 300 based on the capability information regarding the information processing device 200. In the embodiment of the present technology, the example of the topology in which two source devices are used has been described, but an embodiment of the present technology is not limited thereto. For example, when the number of devices is 2 or more, it is necessary to control data transmission speed control corresponding to the number of devices and state transition is considerable. Therefore, the control is difficult, but benefit can be obtained. It is possible to also correspond to topology in which two or more source devices are connected.

[Communication Example Between Source Device and Sink Device Using Web Socket]

Next, an example in which each piece of information is interchanged between the source device and the sink device using the Web Socket will be described.

Here, the WebSocket is a communication standard in which if a connection is established between a server and a client even once, a data interchange can be performed through socket communication without being conscious of a communication process unless explicitly disconnected. In the WebSocket, the server and all the clients between which the connection is established can share data and perform transmission and reception in real time. In other words, in the WebSocket, it is possible to maintain the port, and it is possible to image transmission and audio transmission in real time.

Here, in the Wi-Fi CERTIFIED Miracast, there is the UIBC from the sink device to the source device as described above. As in control from the source device to the sink device, a request related to a control line is assumed to be increased in a topology environment of multiple sources or multiple sinks.

In this regard, in the first embodiment of the present technology, each piece of information is interchanged between the source device and the sink device using the WebSocket. For example, in the Capability Negotiation, it is possible to interchange each piece of information for setting the WebSocket between the source device and the sink device and perform a new additional setting for the WebSocket.

[Example of Setting UIBC and WebSocket Separately]

First, an example of setting the UIBC and the WebSocket separately will be described.

[Setting Example of UIBC]

FIGS. 20 and 21 are sequence charts illustrating a communication process example between the source device 410 and the sink device 420 according to the first embodiment of the present technology. FIGS. 20 and 21 illustrate a communication example (a setting example of the UIBC) for setting the UIBC in the Capability Negotiation. The UIBC setting method is specified in the Wi-Fi CERTIFIED Miracast standard.

When the UIBC is set, Wfd-uibc-Capability is interchanged between the source device 410 and the sink device 420 through an M3 message (RTSP GET_PARAMETER). The purpose of this interchange is to enable the source device 410 to confirm whether or not the sink device 420 has a UIBC function therein.

As illustrated in a of FIG. 20, the source device 410 receives the capability information of the sink device 420 from the sink device 420, and transmits a UIBC line setting request to the sink device 420 through an M4 message. Instead of transmitting the UIBC line setting request through the M4 message, the connection request may be transmitted through an M14 message after the image transmission starts. When the M14 message is transmitted, the request from the source device 410 but also the UIBC line setting request from the sink device 420 to the source device 410 may be performed. This example is illustrated in a of FIG. 21.

The UIBC is hardly enabled only through the interchange of the M4/M14 message. For this reason, as illustrated in b of FIG. 20 and b of FIG. 21, an M15 message is interchanged after a response to the UIBC line setting request is received. Thus, the UIBC line is enabled.

[Setting Example of WebSocket]

FIGS. 22 and 23 are sequence charts illustrating a communication process example between the source device 410 and the sink device 420 according to the first embodiment of the present technology. FIGS. 22 and 23 illustrate a communication example (a setting example of the WebSocket) for setting the WebSocket in the Capability Negotiation.

When the WebSocket is set, Wfd-websocket-Capability is interchanged between the source device 410 and the sink device 420 through the M3 message (RTSP GET_PARAMETER). The purpose of this interchange is to enable the source device 410 to confirm whether or the sink device 420 has a Web Socket function therein.

As illustrated in a of FIG. 22, the source device 410 receives the capability information of the sink device 420 from the sink device 420, and transmits a WebSocket line setting request to the sink device 420 through the M4 message. Instead of transmitting the Web Socket line setting request through the M4 message, the connection request may be transmitted through the M14 message after the image transmission starts. When the M14 message is transmitted, the request from the source device 410 but also the WebSocket line setting request from the sink device 420 to the source device 410 may be performed. This example is illustrated in a of FIG. 23.

The WebSocket is hardly enabled only through the interchange of the M4/M14 message. For this reason, as illustrated in b of FIG. 22 and b of FIG. 23, the M15 message is interchanged after a response to the WebSocket line setting request is received. Thus, the WebSocket line is enabled.

[Setting Example of UIBC and WebSocket]

Figure 24:
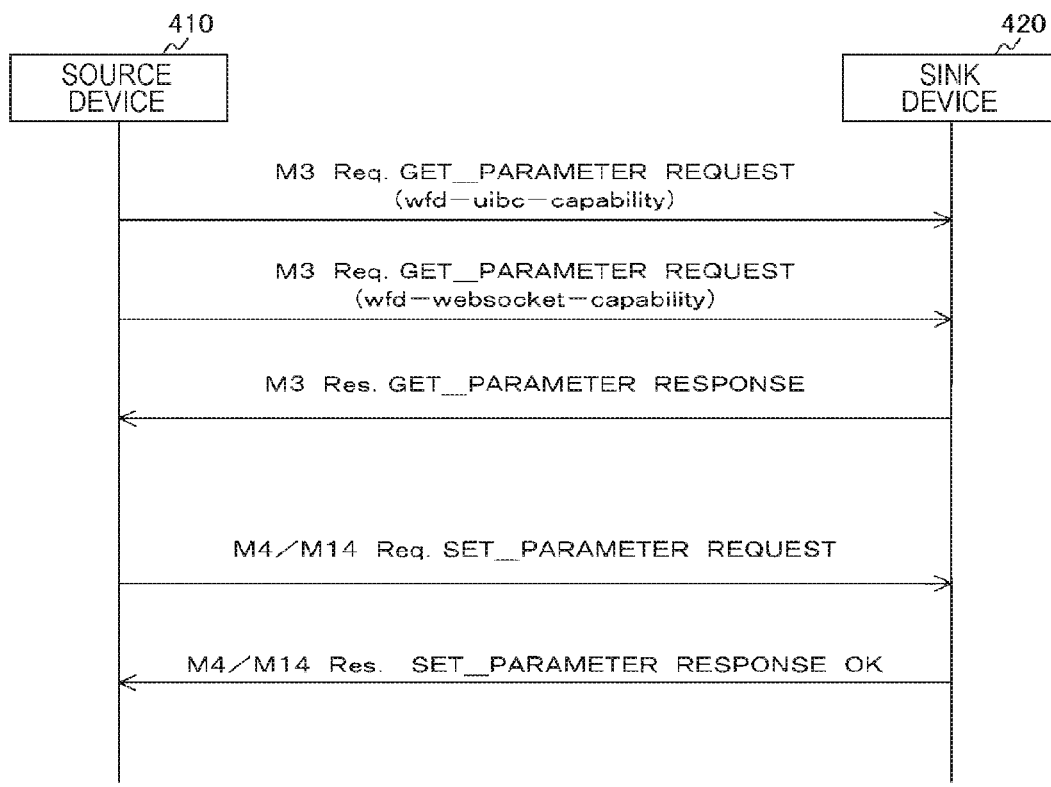
FIG. 24 is a sequence chart illustrating a communication process example between a source device 410 and a sink device 420 according to the first embodiment of the present technology.

FIG. 24 is a sequence chart illustrating a communication process example between the source device 410 and the sink device 420 according to the first embodiment of the present technology. FIG. 24 illustrates a communication example (a setting example of the UIBC and the Web Socket) for setting the UIBC and the Web Socket in the Capability Negotiation.

In other words, FIG. 24 illustrates a communication example in which the UIBC connection request/response illustrated in FIGS. 20 and 21 and the Web Socket connection request/response illustrated in FIGS. 22 and 23 are performed. For example, wfd-websocket-Capability is defined as the WebSocket line, and the Capability Negotiation as to whether or not the WebSocket line is implemented is performed between the source device 410 and the sink device 420.

Further, FIG. 24 illustrates an example in which a port number for the WebSocket is set to a different port number from that for the UIBC. As described above, by using a different port for the Web Socket, it is possible to use the connection links of both the UIBC and the WebSocket, and it is possible to perform a process having a high real-time property.

Further, FIG. 24 illustrates an example in which, when a new command and the UIBC are designated as different ports on the TCP, the new command and the UIBC interchange real-time data, and thus the UIBC and the WebSocket are determined as different categories.

Specifically, Wfd-uibc-Capability is interchanged between the source device 410 and the sink device 420 through the M3 message (Req.GET_PARAMETER_REQUEST). Further, Wfd-websocket-Capability is interchanged between the source device 410 and the sink device 420 through the M3 message (Req.GET_PARAMETER_REQUEST). The purpose of this interchange is to enable the source device 410 to confirm whether the sink device 420 has the UIBC function and the Web Socket function therein.

The capability of the UIBC and the capability of the WebSocket are transmitted from the sink device 420 to the source device 410 through the M3 message (Res. GET_PARAMETER_RESPONSE). For example, when "GENERIC (coordinates)" is designated for the UIBC, the following content is transmitted:

```
wfd_uibc_capability: input_category_list = GENERIC;
generic_cap_list = Mouse, SingleTouch;
hidc_cap_list = none; port = none
```

Further, for example, when "HIDC (USB)" is designated for the UIBC, the following content is transmitted:

```
wfd_uibc_capability: input_category_list = HIDC;
generic_cap_list = none;
hidc_cap_list = Mouse/BT, RemoteControl/Infrared; port = none
```

For example, for the WebSocket, the following content is transmitted:

```
wfd-websocket-capability =
"wfd_websocket_capability:" SP ("none" / (input-category-val
";xxxx;" tcp-port)) CRLF; "none" if not supported
```

Further, information for designating the UIBC and the WebSocket is transmitted from the source device 410 to the sink device 420 through the M4/M14 message (Req.GET_PARAMETER_REQUEST). For example, when "GENERIC (coordinates)" is designated for the UIBC, the following content is transmitted. An example of a frame format when the content is transmitted is illustrated in FIG. 25.

```
wfd_uibc_capability: input_category_list = GENERIC;
generic_cap_list = Mouse, SingleTouch;
hidc_cap_list = none; port = 1000
wfd_uibc_setting: enable
```

For example, when "ROC (USB)" is designated for the UIBC, the following content is transmitted:

```
wfd_uibc_capability: input_category_list = HIDC;
generic_cap_list = none;
hidc_cap_list = Mouse/BT, RemoteControl/Infrared; port = 1000
wfd_uibc_setting: enable
```

For example, for the WebSocket, the following content is transmitted:

```
wfd-websocket-capability: connection control terminal function;
xxxx;
port=8000
Wfd_websocket_setting: enable
```

Here, for example, a CTRL (corresponding to (B1) to (B3) described in the second embodiment of the present technology, for example) is described in the "connection control function."

FIG. 25 illustrates an example of a frame format of the UIBC transmitted from the source device 410 to the sink device 420 through the M4/M14 message (Req.SET_PARAMETER_REQUEST).

[Frame Format Example of UIBC]

FIG. 25 illustrates an example of the frame format of the UIBC interchanged between the source device 410 and the sink device 420 according to the first embodiment of the present technology. FIG. 25 illustrates an example of the frame format of the UIBC when a Generic Input is designated.

b of FIG. 25 illustrates content stored in a field "Generic Input Type ID" illustrated in a of FIG. 25.

c of FIG. 25 illustrates content stored in a field "Describe" of a of FIG. 25.

In the above example, the same method as the connection method of the UIBC is used as the connection method of the WebSocket, but a different method from the connection method of the UIBC may be used as the connection method of the WebSocket. Further, the example using a definition of the attribute such as wfd-WebSocket-Capability has been described, but the present technology is not limited to this example. For example, a different attribute may be used as long as it has the equivalent function.

In the example illustrated in FIG. 24, the different port number from the port number for the UIBC is set as the port number for the Web Socket, but the same port may be set for the UIBC and the WebSocket. In this regard, FIG. 26 illustrates a connection example in which the UIBC and the WebSocket are operated through the same port.

[Setting Example of UIBC and WebSocket when Same Port is Set for UIBC and Web Socket]

Figure 26:
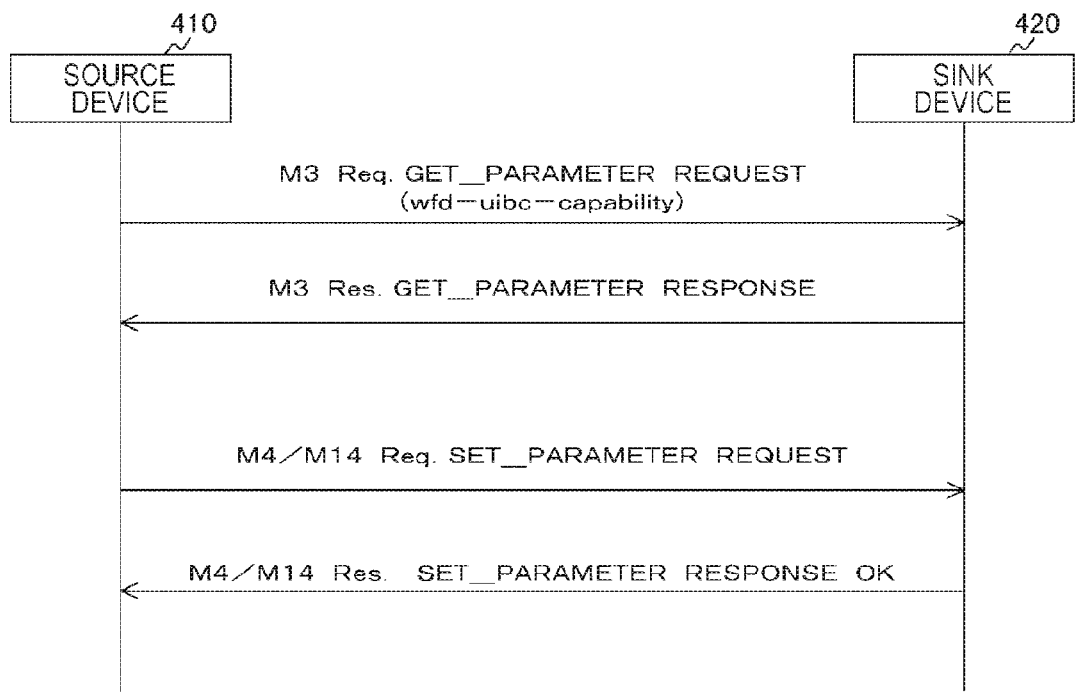
FIG. 26 is a sequence chart illustrating a communication process example between a source device 410 and a sink device 420 according to the first embodiment of the present technology.

FIG. 26 is a sequence chart illustrating a communication process example between the source device 410 and the sink device 420 according to the first embodiment of the present technology. FIG. 26 illustrates a communication example (a setting example of the UIBC and the Web Socket) for setting the UIBC and the Web Socket in the Capability Negotiation.

For example, it can be implemented by extending the Wi-Fi CERTIFIED Miracast standard. For example, the "WebSocket" is added to a category such as input-cat of the M3 message (Req.GET_PARAMETER_REQUEST). For example, the sink device 420 may select the GENERIC among the GENERIC, the HIDC, and the Web Socket.

In this case, for example, the following content is transmitted from the sink device 420 to the source device 410 as the M3 message (Res.GET_PARAMETER_RESPONSE):

```
wfd_uibc_capability: input_category_list = WebSocket;
generic_cap_list = connection control function;
hidc_cap_list = none; port = none
```

In this example, the example corresponding to one category has been described, but it is possible to correspond to two or more categories at the same time.

For example, the following content is transmitted from the source device 410 to the sink device 420 as the M4/M14 message (Req.SET_PARAMETER_REQUEST):

```
wfd_uibc_capability: input_category_list = WebSocket;
generic_cap_list = connection control function;
hidc_cap_list = none; port = 1000
wfd_uibc_setting: enable
```

As described above, it is possible to designate the same port for the UIBC and the Web Socket on the TCP.

In this example, the example corresponding to one category has been described, but it is possible to correspond to two or more categories at the same time.

The example in which the WebSocket is added to input-cat when the same port is set has been described, but the present technology is not limited to this example. For example, it may be set as any other category. The Capability Negotiation may be performed twice instead of setting two input-cats at the same time.

Figure 27:
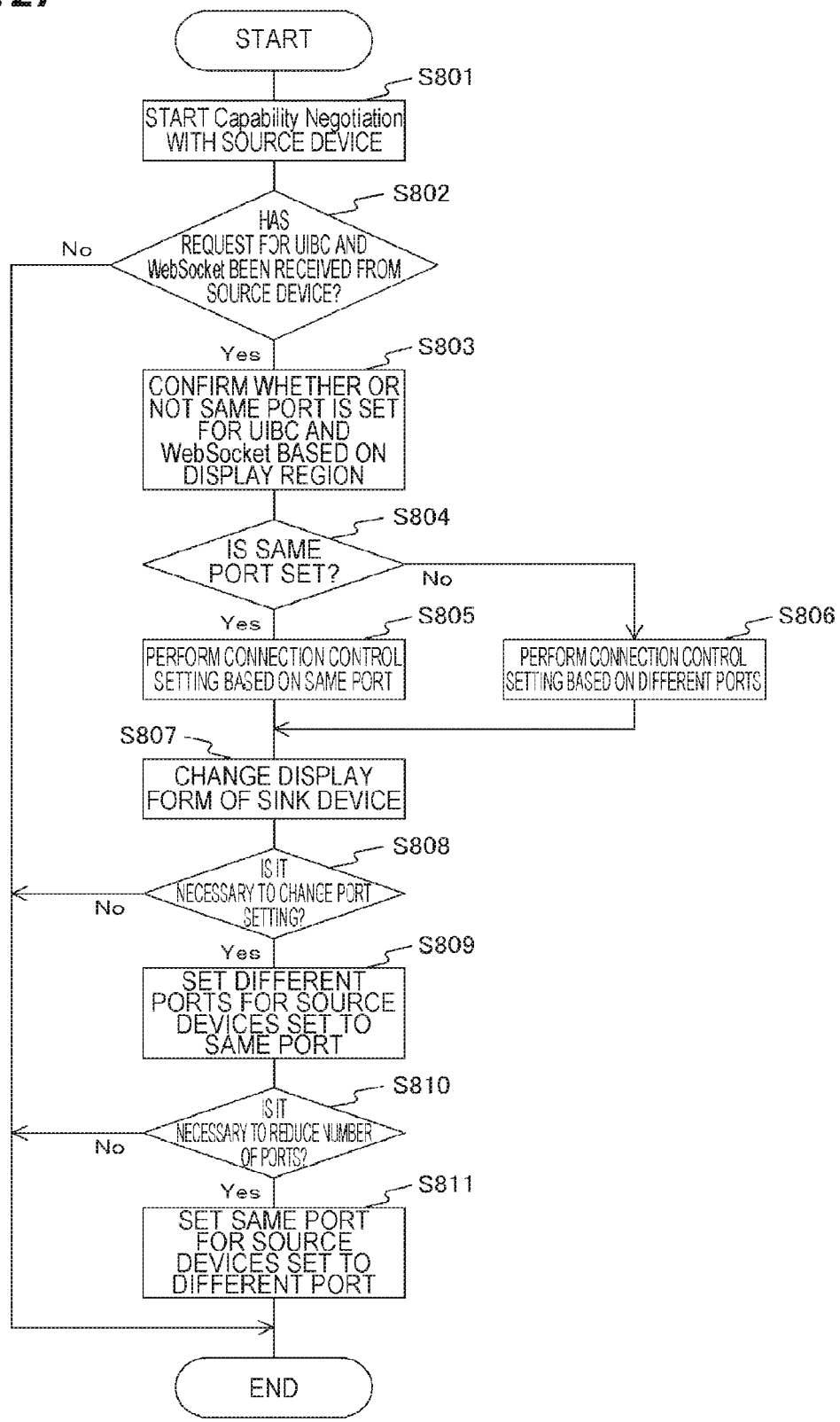
FIG. 27 is a flowchart illustrating an example of a processing procedure of a port setting process performed by an information processing device 300 according to the first embodiment of the present technology.

The example in which the connection method is changed according to whether the same port is set for the UIBC and the Web Socket or the different ports are set for the UIBC and the WebSocket has been described above. However, switching from the same port to the different ports (or the different ports to the same port) may be performed in the middle of the connection (or after the connection). For example, after the Capability Negotiation of the same port is performed in the UIBC and the Web Socket, switching to the different ports may be performed when the usage frequency of the UIBC is high. FIG. 27 illustrates an example of switching the port as described above.

[Operation Example of Information Processing Device (Sink Device)]

FIG. 27 is a flowchart illustrating an example of a processing procedure of a port setting process performed by the information processing device 300 according to the first embodiment of the present technology.

First, the control unit 370 of the information processing device 300 starts the Capability Negotiation with the source device (step S801). Then, the control unit 370 determines whether or not the request for the UIBC and the WebSocket has been received from the source device (step S802). When the request has not been receives (step S802), the operation of the port setting process ends.

When the request for the UIBC and the WebSocket has been received from the source device (step S802), the control unit 370 confirms whether or not the same port is set for the UIBC and the WebSocket based on the display region of the display unit 351 (step S803).

When there is no problem even though the same port is set for the UIBC and the WebSocket (step S804), the control unit 370 performs a connection control setting based on the same port (step S805). For example, the interchange for setting the same port for the UIBC and the WebSocket is performed as illustrated in FIG. 26.

When a problem occurs if the same port is set for the UIBC and the WebSocket (step S804), the control unit 370 performs the connection control setting based on the different ports (step S806). For example, the interchange for setting the different ports for the UIBC and the Web Socket is performed as illustrated in FIG. 24.

Then, the control unit 370 changes the display form of the display unit 351 for displaying the image transmitted from the source device (step S807). Then, after changing the display form, the control unit 370 determines whether or not there is a source device whose port setting has to be changed (step S808). When there is no source device whose port setting has to be changed (step S808), the operation of the port setting process ends.

When there is a source device whose port setting has to be changed (step S808), the control unit 370 performs control such that the different ports are set for the source devices (in which the UIBC and the WebSocket are set to the same port) (step S809).

Then, the control unit 370 determines whether or not the number of ports has to be reduced (step S810). When the number of ports need not be reduced (step S810), the operation of the port setting process ends.

When the number of ports has to be reduced (step S810), the control unit 370 performs control such that the same port is set for the source devices in which the UIBC and the WebSocket are set to the different ports (step S811). Steps S802 to S811 is an example of a control process set forth in claims.

As described above, the wireless communication unit 320 of the information processing device 300 performs the real-time image transmission with the source device according to the Wi-Fi CERTIFIED Miracast specification. The control unit 370 performs control such that the image based on the image information transmitted from the source device is displayed on the display unit 351, and the port used in a plurality of communication schemes (the UIBC and the Web Socket) for interchanging the control information related to the image with the source device is set. In this case, for example, when the port is set on the TCP session generated between the information processing device 300 and the source device, the control unit 370 transmits the information (for example, the information described above with reference to FIGS. 24 and 25) for designating a plurality of communication schemes using the port to the source device.

The control unit 370 can set a plurality of ports for a plurality of communication schemes as the port used for a plurality of communication schemes. In this case, the control unit 370 can set a plurality of ports according to the request transmitted from the source device.

Further, the control unit 370 can set one port for a plurality of communication schemes as the port used for a plurality of communication schemes.

The control unit 370 can transmit the information related to the display form of the image of the source device in the display unit 351 to the source device using any one of a plurality of communication schemes and change the display form of the display based on the control information transmitted from the source device. The control information is, for example, the manipulation information related to the manipulation for changing the display form of the source device image received in the source device.

The source device side can perform the same operation. For example, the control unit 240 of the information processing device 200 transmits the image information for causing the image to be displayed on the display unit of the sink device side to the sink device. The control unit 240 can perform control such that the port used for a plurality of communication schemes for interchanging the control information related to the image with the sink device is set.

Here, for example, when different ports are set for the UIBC and the WebSocket, it is necessary to set two different links for each source device. In other words, the number of ports of the source device that are necessary is increased to be twice. For this reason, for example, when several tens of thousands of source devices are connected to the sink device, it may be hard to allocate the ports. In this case, the system response is likely to get worse. In this regard, in the first embodiment of the present technology, one or more ports are appropriately set according to the usage environment.

The sink device can switch the control channel of the UIBC to the source device that transmits the request in the middle of connection to transmit the information related to the display position of the sink device based on the request transmitted from the source device. The source device can switch the control channel of the UIBC to the sink device that transmits the request in the middle of connection to transmit the display position information of the source device based on the manipulation transmitted from the sink device.

Here, it is possible to transmit and receive image data or audio data as well as a text using the control line of the Web Socket. In this regard, an example in which image data or audio data are transmitted and received using the control line of the WebSocket will be described below.

[Transmission Example of Image Data and Audio Data Using WebSocket]

Figure 28:
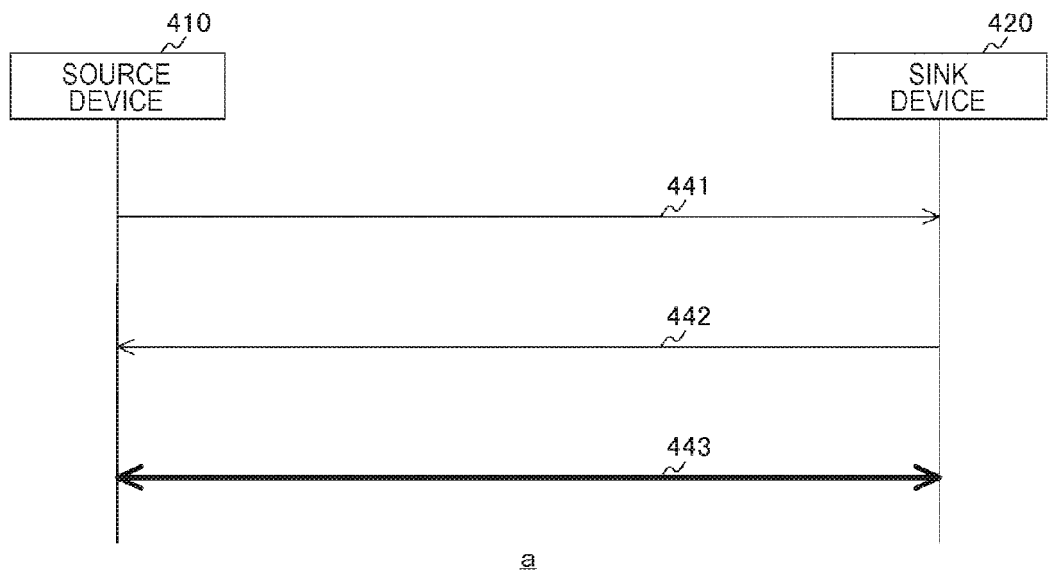
FIG. 28 is a diagram illustrating a communication example of image data or audio data using a WebSocket between a source device 410 and a sink device 420 according to the first embodiment of the present technology.

FIG. 28 is a diagram illustrating a communication example of image data or audio data using the WebSocket between the source device 410 and the sink device 420 according to the first embodiment of the present technology. a of FIG. 28 illustrates a communication process example between the source device 410 and the sink device 420. b and c of FIG. 28 illustrates an example of a frame format of the WebSocket interchanged between the source device 410 and the sink device 420.

In the example illustrated in FIG. 28, the source device 410 of the Wi-Fi CERTIFIED Miracast functions as a client of the WebSocket, and the sink device 420 functions as a server of the Web Socket.

For example, the source device 410 transmits Host, Sec-WebSocket-Key, and Sec-WebSocket-Version to the sink device 420 (441). Host is used to designate a connection destination of the WebSocket. Sec-WebSocket-Key is used to obtain a handshake response. Sec-WebSocket-Version is used to designate a version of the WebSocket.

The sink device 420 generates a value of Sec-WebSocket-Accept based on a value of Sec-WebSocket-Key received from the source device 410. Then, the sink device 420 transmits the generated Sec-WebSocket-Accept to the source device 410 (442). Here, Sec-WebSocket-Accept is used to maintain a connection with the client.

The source device 410 transmits the frame format illustrated in b of FIG. 28 to the sink device (441). In the frame format, data serving as a transmission target can be designated by a WebSocket Type ID. An example of the Web Socket Type ID is illustrated in c of FIG. 28.

Further, image data or audio data is interchanged between the source device 410 and the sink device 420 as binary data of the WebSocket (443).

For example, when FIN is 0x0, it indicates that the payload is continued, and thus the sink device 420 performs connection with immediately previous data. Further, when FIN is 0x1, it is a flag indicating the end of the payload, and thus the sink device 420 processes the payload.

For example, RSV is an extension bit.

For example, when opcode is 0x0, it indicates that the payload is continued, and the sink device 420 performs connection with immediately previous data. Further, when opcode is 0x1, it indicates that the payload is a text, and when opcode is 0x2, it indicates that the payload is binary.

For example, MASK is a bit indicating whether or not a message is an encoded message. The message from the source device 410 to the sink device 420 is necessarily an encoded message.

As described above, when a binary value of opcode is used, image data or audio data can be interchanged between the source device 410 and the sink device 420 as the binary data of the WebSocket. In other words, image data and audio data can be transmitted using the Web Socket standard format. Thus, prior authentication can be performed using image data or audio data. Further, it is possible to correspond to various kinds of other use cases.

The image data and audio data can be performed between the source device and the sink device using the Web Socket while performing the image transmission according to the Wi-Fi CERTIFIED Miracast standard.

As described above, the control unit 370 of the information processing device 300 can acquire the image information and the audio information transmitted from the source device using the WebSocket. The control unit 370 can cause an image based on the image information to be displayed on the display unit 351 and cause a sound based on the audio information to be output from the audio output unit 352.

As described above, in the first embodiment of the present technology, the sink device can perform connection control terminal management of all the source devices and receive the connection control manipulation from all the source devices. For example, it is possible to correspond even to an environment in which all the source devices are prohibited from entering the image transmission mode due to limitations of transmission bands. In other words, in an environment in which images transmitted from a plurality of source devices are displayed on the display unit of the sink device side, it is possible to stably operate the image transmission mode and performing a real-time connection control manipulation.

When images transmitted from a plurality of source devices are displayed one sink device, it is possible to notify the source device of the display positions of the images in the sink device in real time, and the source device can control the display position. Further, it is possible to interchange the information related to the display position using the UIBC and the WebSocket.

Thus, by reducing useless processes of the source device and performing processes in the sink device, the load of the source device can be reduced. It is possible to perform a process having a high real-time property by using the connection links of both the UIBC and the WebSocket. For example, even in the environment in which the number of source devices is large, it is possible to reduce the load of the sink device and perform the position information process and the UIBC transmission process.

As described above, the information related to the source device and the image of the source device can be displayed on the display unit of the sink device side in association with each other. In this case, it is possible to perform a manipulation in the order in which the request is received according to the request transmitted from the source device.

2. SECOND EMBODIMENT

In a second embodiment of the present technology, an example in which the connection between the source device and the sink device via the access point and the direct connection between the source device and the sink device are switched (or simultaneously used) will be described.

[Configuration Example of Communication System]

Figure 29:
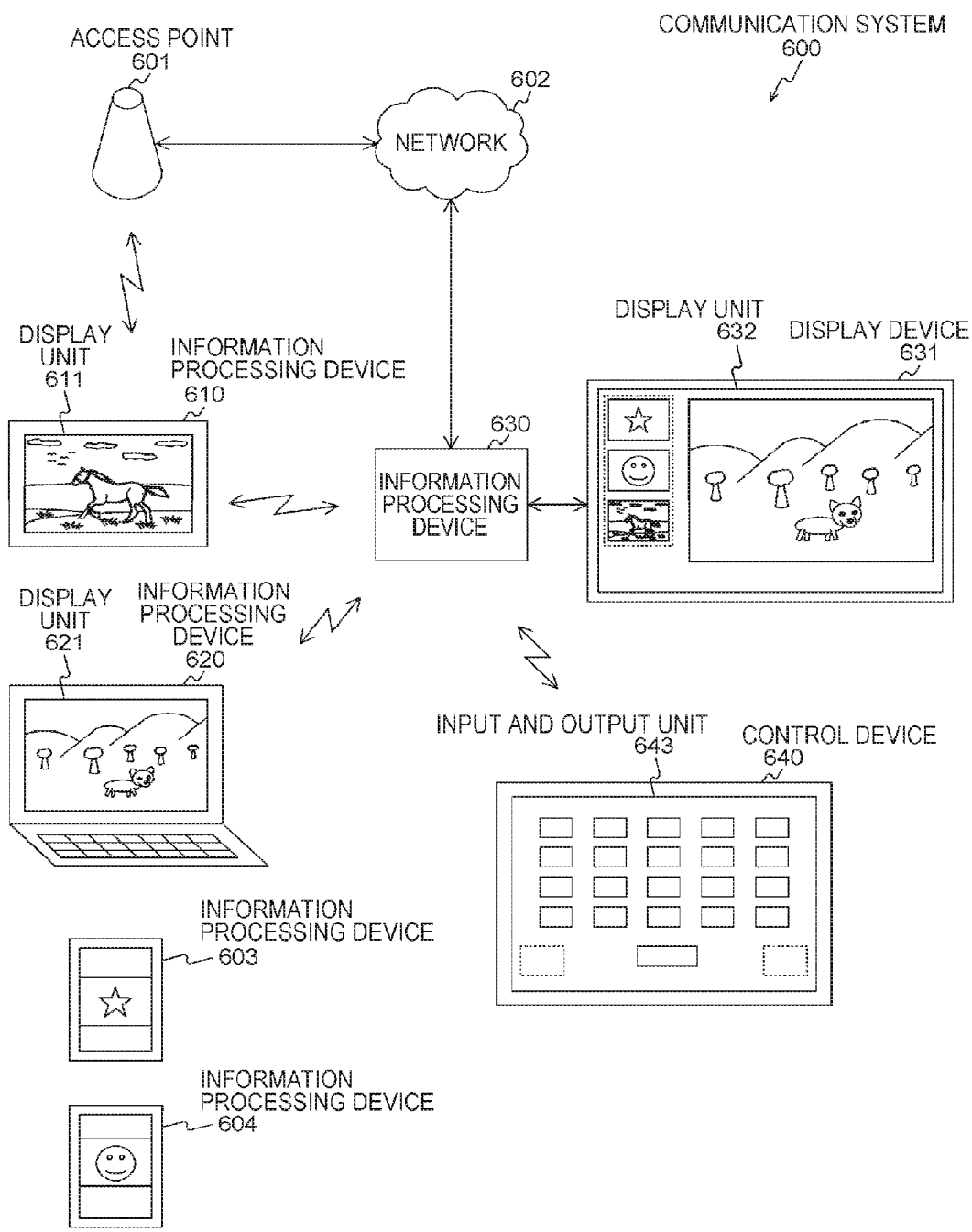
FIG. 29 is a diagram illustrating a system configuration example of a communication system 600 according to the second embodiment of the present technology.

FIG. 29 is a diagram illustrating a system configuration example of a communication system 600 according to the second embodiment of the present technology.

The communication system 600 includes an access point 601, a network 602, information processing devices 603, 604, 610, 620, and 630, a display device 631, and a control device 640.

The access point 601 is an access point of a wireless LAN (for example, Wi-Fi). For example, the access point 601 has a function of an infrastructure mode of an IEEE802.11 standard. The access point 601 is connected to one or more information processing devices (for example, a transmission side information processing device (source device) and a reception side information processing device (sink device)).

The access point 601 can be connected with the information processing device 630 via a wired line (for example, Ethernet (registered trademark)). For example, the access point 601 can be connected with the information processing device 630 via the network 602. The access point 601 may be connected with an internal bus of the information processing device 630 and perform a process. Examples of the internal bus of the information processing device 630 include a Universal Serial Bus (USB), Peripheral Component Interconnect (PCI), and PCI Express. The connection between the access point 601 and the information processing device 630 may be a wired connection or a wireless connection (for example, the wireless LAN). For example, in the case of the wireless LAN, the network 602 is connected to the information processing device 630, and the information processing device 630 has to determine whether a transmission/reception process is a transmission/reception process with the access point 601 or a transmission/reception process with the information processing device 610.

In the second embodiment of the present technology, an example in which the access point 601 and the information processing devices 603, 604, 610, and 620 are connected using the wireless LAN (for example, the wireless LAN corresponding to IEEE 802.11 a/b/g/n/ac/ad) will be described. An example in which the access point 601 and the information processing device 630 are connected via an Ethernet line will be described.

Further, an example in which the information processing devices 603, 604, 610, and 620 are assumed to be the transmission side information processing device (source device), and the information processing device 630 is assumed to be the reception side information processing device (sink device) will be described. The information processing devices 603, 604, 610, and 620 correspond to the information processing device 200 illustrated in FIG. 2, and the information processing device 630 corresponds to the information processing device 300 illustrated in FIG. 3. In the following description, the information processing device 610 will be mainly described as the source device, and the description similarly applies to the information processing devices 603, 604, and 620.

The information processing device 610 is the transmission side information processing device (the source device) that transmits an image. The information processing device 610 is an information processing device that can be connected with the access point 601 in the infrastructure mode.

Here, a connection example in which the information processing device 610 establishes the connection with the access point 601 in the infrastructure mode will be described. The information processing device 610 transmits a connection request signal to the access point 601 in response to a beacon signal transmitted from the access point 601. As described above, the information processing device 610 starts an operation (a connection establishment operation) for establishing the connection with the access point 601 by transmitting the connection request signal.

The connection establishment operation is an operation of linking a level of a layer 2. For example, a connection authentication process of determining whether or not the information processing device 610 is connected as an application is necessary in addition to password authentication using packet identification (PID) performed in the wireless LAN.

The information processing device 610 can establish the connection with the information processing device 630 through P2P direct communication (for example, WiFi Direct). For example, the information processing device 610 has a protocol capable of establishing the connection with the information processing device 630 through the WiFi Direct and enabling image communication such as the Wi-Fi CERTIFIED Miracast or digital living network alliance (DLNA).

The information processing device 610 may be a low-speed image and audio transmission device (a standby device) that establishes the connection with the access point 601 and interchanges various kinds of information with the information processing device 630 via the access point 601. Further, when the information processing device 610 is used only as the low-speed image and audio transmission device, the information processing device 610 may not have a protocol capable of enabling high-speed image audio transmission.

The information processing device 630 has a communication function for establishing a connection with the access point 601, the information processing devices 603, 604, 610, and 620, or the control device 640. The information processing device 630 has a function of establishing the connection with the access point 601, the information processing devices 603, 604, 610, and 620, and the control device 640 and controlling all protocols. The information processing device 630 has a communication function of establishing a connection with a private LAN or a global LAN.

Here, it is important to stabilize the connection between the information processing device 630 and the information processing devices 603, 604, 610, and 620. Thus, it is desirable to use a frequency different from a radio frequency used by the access point 601 for the connection between the information processing device 630 and the information processing devices 603, 604, 610, and 620. In the second embodiment of the present technology, an example in which a frequency band such as 2.4 GHz, 5 GHz, or 60 GHz of IEEE 802.11 a/b/g/n/ac/ad is used will be described. Here, any other wireless standard or any other frequency band may be used.

The information processing device 630 has a display function of displaying an image. The display function is a function of performing screen display of a television or a projector. The information processing device 630 may cause an image to be displayed on a display unit with which the information processing device 630 is equipped or may cause an image to be displayed on an external display device. In the second embodiment of the present technology, an example in which the display device 631 separate from the information processing device 630 is installed will be described.

When the display device 631 separate from the information processing device 630 is installed as described above, the information processing device 630 and the display device 631 can be connected through wired connection or wireless connection. For example, when the information processing device 630 and the display device 631 are connected through wired connection, the connection can be established using a wireline cable (for example, High- Definition Multimedia Interface (HDMI) (registered trademark), Mobile High-Definition Link (MEL), DisplayPort, or USB3.0). Further, for example, when the information processing device 630 and the display device 631 are connected through wireless connection, the connection can be established using the wireless LAN. A plurality of display devices may be connected to the information processing device 630.

The control device 640 is a connection control device that manages the information processing devices (the information processing devices 603, 604, 610, 620, and 630) included in the communication system 600, and detects and controls the connection of the information processing devices and a display state. For example, the control device 640 manages and detects information (for example, terminal identification information and capability information) related to the information processing devices and an operation state (for example, a communication mode and a group participation state) of the information processing devices. The control device 640 is connected with the information processing device 630 using wireless communication. For example, a communication scheme (for example, the wireless LAN) supported by the information processing device 630 may be used as the wireless communication. An infrared scheme, any other wireless scheme, or a wired line may be used. The control device 640 may have a protocol for establishing the connection with the access point 601 and establish the connection with the information processing device 630 via the access point 601.

For example, the control device 640 can manage the information processing devices by detecting whether or not the information processing device is participating in the group or has left the group. Each of the source devices participating in the group performs, for example, a process of transmitting a command to the access point 601 or the information processing device 630 at a level at which power consumption is not influenced. When the command is received directly or indirectly via the access point 601, the information processing device 630 notifies the control device 640 of information related to the source device from which the command has been received. Thus, the control device 640 can confirm whether or not the source device has left the group.

For example, the control device 640 causes an image (for example, an icon) corresponding to the source device participating in the group to be displayed on an input and output unit 643. For example, the control device 640 confirms whether or not the source device participating in the group has left the group, and when the source device that has left the group is detected, the control device 640 deletes the image (for example, the icon) corresponding to the source device that has left the group from the input and output unit 643. For example, when a command transmitted from a certain information processing device is determined to have not received during a predetermined period of time, the control device 640 determines the information processing device to have left the group. Then, the control device 640 deletes the image (for example, the icon) corresponding to the information processing device that has left the group from the input and output unit 643.

The control device 640 can cause the image (for example, the icon) corresponding to the information processing device participating in the group to be displayed on the input and output unit 643 according to a place where the information processing devices exists. For example, position information (for example, a latitude and a longitude) of each information processing device may be acquired, and an absolute position of the information processing device may be decided based on the position information. It is possible to decide relative positions of the information processing devices based on the positions of the information processing devices decided as described above and arrange the students. The information processing devices can acquire the position information, for example, using the Global Positioning System (GPS).

For example, the relative position of the information processing device may be detected using radio waves. For example, the information processing device 630 may acquire radio wave strengths from a plurality of information processing devices and acquire a relative position (a position of the own information processing device) with the other information processing devices based on the radio wave strengths using a triangulation technique. The control device 640 may acquire the relative positions obtained as described above and arrange the image of the information processing device.

An example in which the control device 640 manages one or more information processing devices connected to the information processing device 630, and the images indicating the information processing devices are displayed on the input and output unit 643 of the control device 640 is described. However, one or more information processing devices connected to the information processing device 630 may be managed by the information processing device 630, and the images indicating the information processing devices may be displayed on the display unit of the information processing device 630 or the display device 631.

[Switching Example of Communication Mode of Source Device]

Here, a switching method when the communication modes (the low-speed image and audio transmission mode (the standby mode), and the high-speed image audio transmission mode) of the source device are switched will be described.

For example, the following (B1) to (B3) can be used as triggers for switching of the communication modes of the source device:

(B1) switching using the source device (for example, active switching according to a manipulation of the user using the source device);

(B2) switching using the control device (for example, switching (remote manipulation switching) according to a manipulation of the user using the control device 640); and (B3) switching using the sink device (for example, switching according to a manipulation of the user using the sink device (or the display device 631 connected thereto)).

The manipulation (the switching manipulation) of the user in each device is, for example, the manipulation of the user using the manipulation reception unit (for example, a manipulation member or a touch panel) with which each device is equipped or the manipulation of the user using the user information acquisition unit (for example, a detection unit that detects a gesture) with which each device is equipped.

In (B1), for example, a manipulation input of an application or a manipulation member installed in the source device in advance can be used as a switching trigger. For example, when the switching manipulation is performed in the source device, a command related to switching of the communication mode is transmitted to the sink device (the information processing device 630). When the command is received, the sink device (the information processing device 630) performs control such that the band of the source device that has transmitted the command is increased or decreased while performing control for the other bands. The sink device (the information processing device 630) transmits information indicating that the communication mode of the source device that has transmitted the command has been switched to the control device 640. In this case, the control device 640 may output notification information indicating that the communication mode has been switched (through a display or an audio output).

In (B2), for example, the manipulation of the user in the sink device (the information processing device 630) can be used as the switching trigger. For example, when the switching manipulation of the source device is performed in the sink device (the information processing device 630), control is performed such that the band of the source device in which the switching manipulation has been performed is increased or decreased while performing control for the other bands. The sink device (the information processing device 630) transmits information indicating that the communication mode of the source device in which the switching manipulation has been performed has been switched to the control device 640. In this case, similarly to the case of (B1), the control device 640 may output notification information indicating that the communication mode has been switched.

In (B3), for example, the manipulation of the user in the control device 640 can be used as the switching trigger. For example, when the switching manipulation of the source device is performed in the control device 640, information (for example, the terminal identification information) related to the source device in which the switching manipulation has been performed is transmitted to the sink device (the information processing device 630). When the information is received, the sink device (the information processing device 630) performs control such that the band of the source device in which the switching manipulation has been performed is increased or decreased while performing control for the other bands.

The control device 640 manages device connected to the control device 640 as described above. The control device 640 confirms whether or not each device has left the group, and when there is a device that has left the group, the control device 640 deletes the image (for example, the icon) corresponding to the device that has escaped from the control of its own information processing device from the input and output unit 643.

Here, the manipulation of the user in the control device 640 will be described. For example, the control device 640 cause the image (for example, the icon) corresponding to the information processing device participating in the group to be displayed on the input and output unit 643 so that the image is arranged according to a place where the information processing devices exists. In this case, an information processing device that is set to a low-speed image audio transmission mode is assumed to perform switching to a high-speed image audio transmission mode (the peripheral channel). In this case, a manipulation of moving an image corresponding to the information processing device serving as a switching target to a first region (for example, a presentation region) is performed. For example, the drag & drop manipulation is performed. Thus, the information processing device that is set to the low-speed image audio transmission mode can be switched to the high-speed image audio transmission mode (the peripheral channel).

Further, for example, an information processing device that is set to the high-speed image audio transmission mode (the middle channel or the peripheral channel) is assumed to perform switching to the low-speed image audio transmission mode. In this case, a manipulation of moving an image corresponding to the information processing device serving as a switching target to a second region (for example, a standby region) is performed. For example, a drag & drop manipulation is performed. Thus, an information processing device that is set to the high-speed image audio transmission mode (the middle channel or the peripheral channel) can be switched to the low-speed image audio transmission mode.

Similarly to the cases of (B1) and (B2), the control device 640 may output the notification information indicating that the communication mode has been switched.

The control device 640 may cause the images indicating the information processing devices to have different display states according to the communication mode. For example, the contour of the image indicating the information processing device set to the high-speed image audio transmission mode (the middle channel) is indicated by a thick line, and the contour of the image indicating the information processing device set to the high-speed image audio transmission mode (the peripheral channel) is indicated by a fine line. The information processing device set to the low-speed image audio transmission mode may be indicated by a dotted line. As another example, the color of the image indicating the information processing device set to the high-speed image audio transmission mode (the middle channel) is red, and the color of the image indicating the information processing device set to the high-speed image audio transmission mode (the peripheral channel) is blue. Further, the color of the image indicating the information processing device set to the low-speed image audio transmission mode may be white.

In the second embodiment of the present technology, a connection scheme of indirectly connecting a source device with a sink device via an access point is employed in the low-speed image audio transmission mode as described above. In the high-speed image audio transmission mode, a connection scheme of directly connecting the source device with the sink device without intervention of the access point is employed.

[Operation Example of Information Processing Device (Source Device)]

Figure 30:
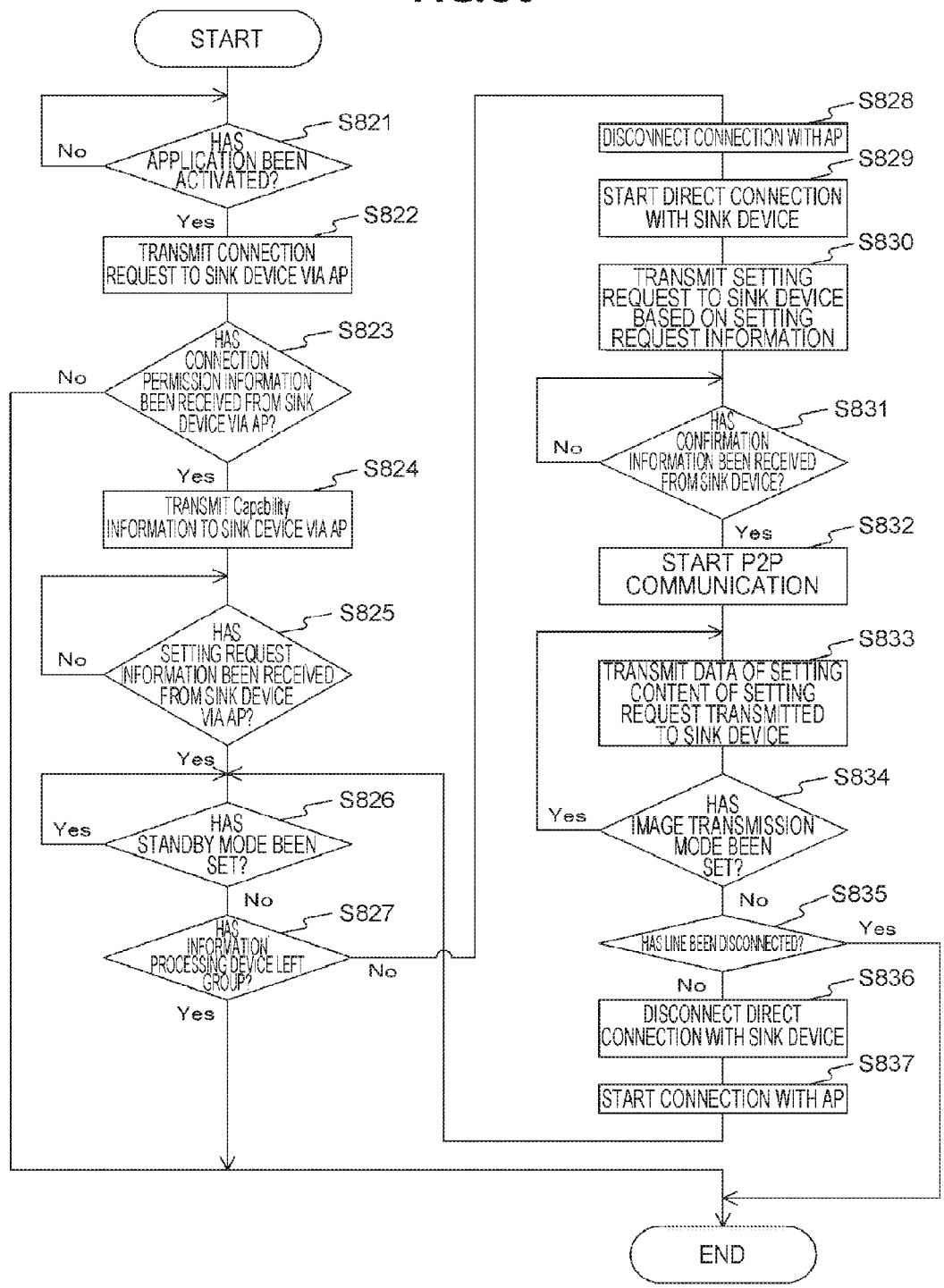
FIG. 30 is a flowchart illustrating an example of a processing procedure of a data transmission process performed by the information processing device 610 according to the second embodiment of the present technology.

FIG. 30 is a flowchart illustrating an example of a processing procedure of the data transmission process performed by the information processing device 610 according to the second embodiment of the present technology.

FIG. 30 illustrates an example in which the source device (the information processing device 610) is directly connected to the access point and then starts each process as default. In other words, the information processing device 610 activates an application that is installed in advance, and transmits the connection request to the sink device via a specific access point (the access point 601). Further, FIG. 30 illustrates an example in which the source device (the information processing device 610) is connected to the information processing device 630 serving as the sink device and connected to the access point 601 serving as a specific access point.

First, the information processing device 610 activates an application for performing communication with the sink device (the information processing device 630) (step S821). After the activation, the sink device (the information processing device 630) serving as a connection target is selected (step S821).

Then, the control unit of the information processing device 610 transmits the connection request to the information processing device 630 via the access point 601 (AP) (step S822). Then, the control unit of the information processing device 610 determines whether or not the connection permission information has been received from the information processing device 630 via the access point 601

(step S823). When the connection permission information has not been received from the information processing device 630 (step S823), the operation of the data transmission process ends. In this case, the operation of the data transmission process may end when the connection permission information has not been received within a predetermined period of time.

When the connection permission information has been received from the information processing device 630 (step S823), the control unit of the information processing device 610 transmits the capability information of the information processing device 610 to the information processing device 630 via the access point 601 (step S824).

Then, the control unit of the information processing device 610 determines whether or not the setting request information has been received from the information processing device 630 via the access point 601 (step S825). When the setting request information has not been received (step S825), it is continuously monitored.

When the setting request information has been received (step S825), in the information processing device 610, the standby mode is set as the initial state. Then, the control unit of the information processing device 610 determines whether or not the standby mode has been set (step S826). Then, when the standby mode has been set in the information processing device 610 (step S826), it is continuously monitored.

When the standby mode has not been set (when the image transmission mode has been set) (step S826), the control unit of the information processing device 610 determines whether or not the information processing device 610 has left the group (step S827). Here, when the information processing device 610 has left the group, for example, when the information processing device 610 has moved to a place that neither the radio waves of the access point nor the sink device reaches, a manipulation of the user for leaving the group may be performed. This manipulation of the user may be, for example, a manipulation of pressing a leaving button (for example, a manipulation of pressing the manipulation member or a manipulation of pressing the touch panel). The manipulation of the user is assumed to be performed in any one of the information processing device 610, another source device, the sink device, and the control device 640.

Then, when the information processing device 610 has left the group (step S827), the operation of the data transmission process ends. When the information processing device 610 has not left the group (step S827), the control unit of the information processing device 610 disconnects the connection with the information processing device 630 via the access point 601 (step S828).

Then, the control unit of the information processing device 610 performs the P2P connection process for performing the direct connection with the information processing device 630 (step S829). After the P2P connection process is completed (step S829), the control unit of the information processing device 610 transmits the connection request to the information processing device 630 based on the setting request information received from the information processing device 630 (step S830).

Then, the control unit of the information processing device 610 determines whether or not the confirmation information indicating permission for reception of an image corresponding to the connection request has been transmitted from the information processing device 630 (step S831). When the confirmation information has not been transmitted from the information processing device 630 (step S831), it is continuously monitored.

When the confirmation information has been transmitted from the information processing device 630 (step S831), the control unit of the information processing device 610 starts the direct P2P connection with the information processing device 630 (step S832). Then, the control unit of the information processing device 610 performs the negotiation of the image parameter and the audio parameter with the information processing device 630 based on the connection request corresponding to the received confirmation information, and transmits the image data (step S833).

Then, the control unit of the information processing device 610 determines whether or not the image transmission mode has been set (step S834). Then, when the image transmission mode has been set in the information processing device 610 (step S834), the process returns to step S833.

When the image transmission mode has not been set (when the standby mode has been set) (step S834), the control unit of the information processing device 610 determines whether or not the line has been disconnected (step S835). For example, when the information processing device 610 has left the group, the line with the access point 601 or the information processing device 630 is disconnected. Then, when the line has been disconnected (step S835), the operation of the data transmission process ends.

When the line is not disconnected (step S835), the control unit of the information processing device 610 disconnects the direct connection with the information processing device 630 (step S836). Then, the control unit of the information processing device 610 starts the connection with the access point 601 (step S837).

As described above, the information processing device 610 performs real-time image transmission with the information processing device 630 according to the Wi-Fi CERTIFIED Miracast specification. The control unit of the information processing device 610 performs control such that setting request information for causing the information processing device 610 to perform a setting related to the real-time image transmission is received from the information processing device 630 via the access point 601. Further, the control unit of the information processing device 610 performs control such that a setting request for performing a setting based on the setting request information is transmitted to the information processing device 630 through the direct communication with the information processing device 630. The setting request information is generated based on the capability information (related to the information processing device 610) interchanged between the information processing device 610 and the information processing device 630 via the access point 601.

Further, when the connection state is switched, the control unit of the information processing device 610 can perform control such that the connection process is performed using at least one of port information and IP information related to a connection before the switching. The switching of the connection state is switching from the connection state with the information processing device 630 via the access point 601 to the connection state with the information processing device 630 by the direct communication or inverse switching.

In the image transmission mode (the peripheral channel), the control unit of the information processing device 610 performs control such that an image to be displayed on the peripheral channel region in the display device 631 is transmitted through the wireless transmission path of the low frequency band. In the image transmission mode (the peripheral channel), the control unit of the information processing device 610 performs control such that an image to be displayed on the middle channel region in the display device 631 is transmitted through the wireless transmission path of the high frequency band.

The control unit of the information processing device 610 performs control such that the setting request is transmitted to the information processing device 630 through the direct communication based on the manipulation of the user in any one of the devices. Alternatively, the control unit of the information processing device 610 performs control such that the setting request is transmitted to the information processing device 630 through the direct communication in a predetermined order (for example, the order of images displayed on the peripheral channel region side by side).

The control unit of the information processing device 630 performs control such that the setting request information for causing the information processing device 610 to perform the setting related to the real-time image transmission is transmitted to the information processing device 610 via the access point 601. Further, the control unit of the information processing device 630 performs control such that the setting request for performing a setting based on the setting request information is received from the information processing device 610 through the direct communication with the information processing device 610.

When switching between the access point and the direct connection is performed as described above, the switching period of time can be reduced. For example, in an environment in which the band control is performed on a plurality of source devices, an Infrastructure environment, and a WiFi Direct (or the Wi-Fi CERTIFIED Miracast) environment, the switching period of time can be reduced. Thus, the seamless connection switching can be provided.

In a multi-source environment, it is possible to set a connection order and share image information of a high-quality image while causing a plurality of source devices to participate in the group. For example, it is possible to notify the sink device (or the control device) of the source device that participates in an Infrastructure environment. In the WiFi Direct (or Wi-Fi CERTIFIED Miracast) environment, it is possible to perform the image transmission through the direct communication through a frequency channel different from that in the Infrastructure environment. Thus, even when a plurality of source devices are connected to a single display device (sink device), stable image communication can be performed. Further, even when hardly any of the source devices are switched to the image transmission mode due to wireless band restrictions, all connections can be stably established.

As the number of connected devices in the group increases, the overhead of connection control increases, band usage efficiency gets worse, and thus it is difficult to perform image transmission stably. On the other hand, in the embodiment of the present technology, it is possible to provide the communication system capable of performing stable image transmission even in the environment in which the number of connected devices is large. In other words, in the embodiment of the present technology, it is possible to perform appropriate control when communication is performed between a plurality of information processing devices.

Here, the sink device can include a server of the WebSocket therein and perform a state management of connected devices. For example, when the standby mode is set, the WebSocket can be operated via the access point through a connection line for the Web Socket necessary for the state management of connected devices. Further, when the image transmission mode is set, the WebSocket can be operated on the Wi-Fi CERTIFIED Miracast. Through theses operations, even when the client of the WebSocket performs switching such as (1) to (3) described above, switching information is transferred to the sink device in real time. The sink device can return the management result to the client (the source device) of the WebSocket in real time.

[Example in which Connection with Public Line Other than Initially Connected Access Point can be Established]

In the above example, when the source device is connected to the sink device, the connection with the sink device via the access point or the direct connection with the sink device is performed. Here, the user using the source device may move when the source device is a portable information processing device (for example, a smartphone or a tablet terminal). In this case, for example, the user using the source device may also move to a place in which it is difficult to establish the connection with the access point. In this case, the user may desire to continuously perform the connection with the sink device. In this regard, an example in which the user using the source device moves to a place in which it is difficult to establish the connection with the access point will be described below.

[Operation Example of Information Processing Device (Source Device)]

Figure 31:
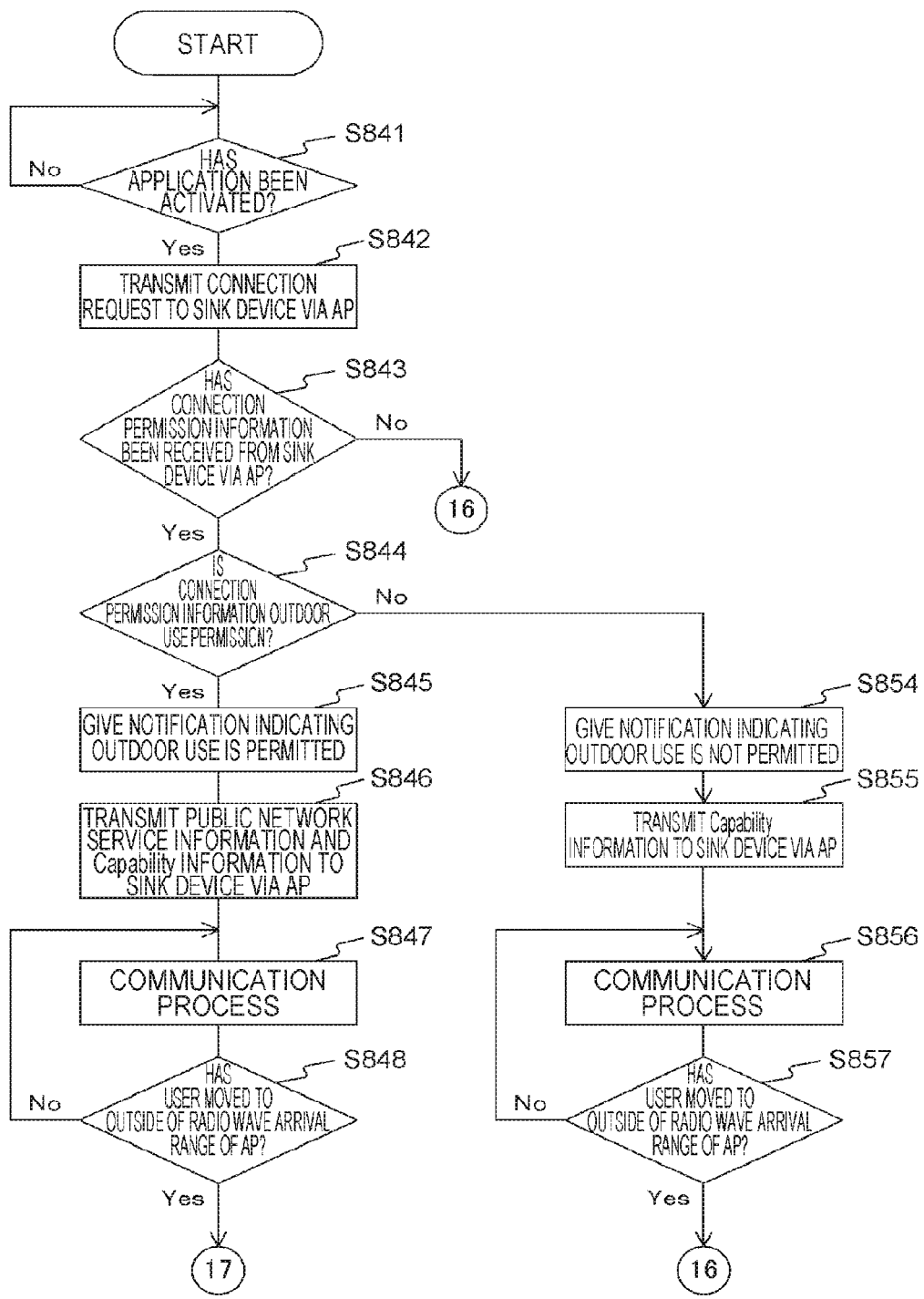
FIG. 31 is a flowchart illustrating an example of a processing procedure of a data transmission process performed by the information processing device 610 according to the second embodiment of the present technology.
Figure 32:
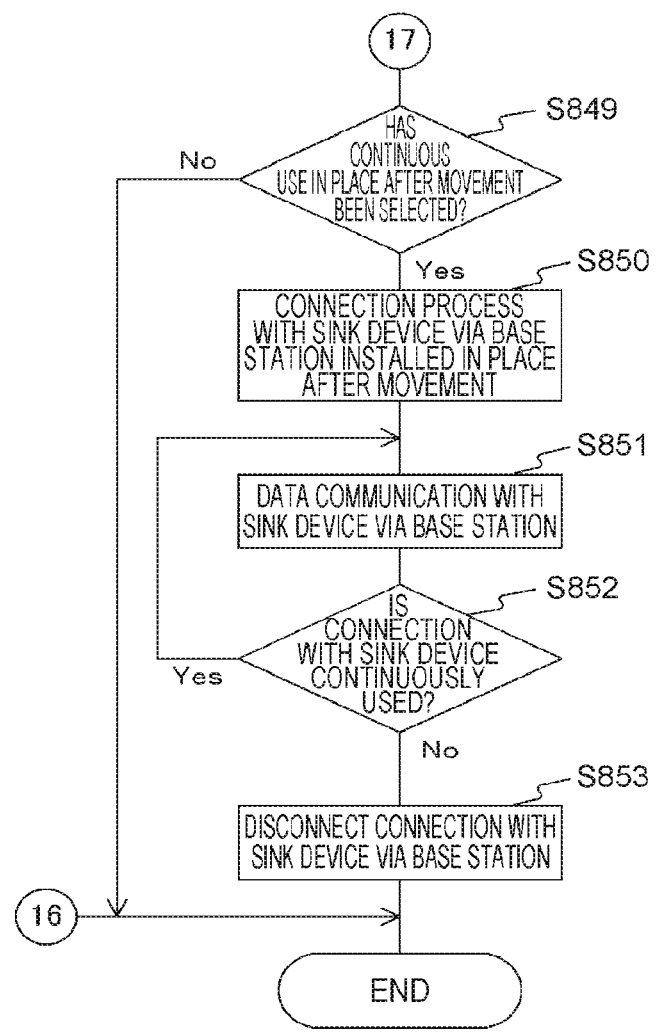
FIG. 32 is a flowchart illustrating an example of a processing procedure of a data transmission process performed by the information processing device 610 according to the second embodiment of the present technology.

Each of FIGS. 31 and 32 is a flowchart illustrating an example of a processing procedure of a data transmission process performed by the information processing device 610 according to the second embodiment of the present technology.

[Operation Example of Information Processing Device (Source Device)]

FIGS. 31 and 32 illustrate an example in which, as a default, after the source device (the information processing device 610) is directly connected to the access point, the source device (the information processing device 710) starts each process and can also be connected to a public line other than the access point. The example illustrated in FIGS. 31 and 32 is a modified example of FIG. 30, and a description of parts that are common to FIG. 30 is partially omitted.

First, an application is activated (step S841), and the connection request is transmitted to the information processing device 630 via the access point 601 (AP) (step S842). Then, the control unit of the information processing device 610 determines whether or not the connection permission information has been received from the information processing device 630 via the access point 601 (step S843). When the connection permission information has not been received from the information processing device 630 (step S823), the operation of the data transmission process ends. Steps S841 to S843 correspond to steps S821 to S823 illustrated in FIG. 30.

When the connection permission information has been received from the information processing device 630 (step S843), the control unit of the information processing device 610 determines whether or not information (outdoor use information) for giving permission for outdoor use is included in the connection permission information (step S844). The outdoor use information is permission information indicating whether or not the connection with the information processing device 630 via the access point other than the access point 601 or the base station is permitted. Further, when the information processing device 630 transmits the connection permission information in response to the connection request received via the access point 601 (AP), the information processing device 630 acquires the outdoor use information (permission or non-permission) from the control device 640, includes the acquired outdoor use information (permission or non-permission) in the connection permission information, and transmits the resulting connection permission information. Further, although "permission" is stored as the outdoor use information, when it is a time zone other than a time zone set as the available group participation time, the information processing device 630 includes the outdoor use information of the non-permission in the connection permission information and transmits the resulting connection permission information. In other words, the control device 640 can perform scheduling (schedule management), manage scheduled participation times, and permit the outdoor use only in the time zone. The outdoor use information may be included in the capability information and transmitted from the sink device to the source device.

Further, when the outdoor use information of the permission is included in the connection permission information and transmitted, the information processing device 630 includes setting information for using the public network in a place that the radio waves of the access point 601 do not reach in the connection permission information.

In this example, the permission or the non-permission for the outdoor use is set in advance, but the permission or the non-permission may be set in each device each time there is the connection request from the source device. For example, the manipulation for setting the permission or the non-permission can be performed using at least one of the other source devices (for example, the information processing devices 603, 604, and 620), the sink device (the information processing device 630), and the control device 640.

For example, the information processing device 630 can cause a display screen for selecting the permission or the non-permission to be displayed on the input and output unit 643 of the control device 640 and receive a selection manipulation of the permission or the non-permission performed on the display screen.

Further, for example, the information processing device 630 can cause the display screen for selecting the permission or the non-permission to be displayed on the display unit 632 of the display device 631 and receive the selection manipulation of the permission or the non-permission using the display screen. For example, the selection manipulation of the permission or the non-permission can be received through a manipulation input using the manipulation member or a manipulation input based on a gesture.

Further, for example, the information processing device 630 causes the display screen (for example, pop-up) for selecting the permission or the non-permission to be displayed on a display unit 621 of another source device (for example, the information processing device 620). Then, the information processing device 630 can receive the selection manipulation of the permission or the non-permission performed on the display screen.

As described above, the permission or the non-permission can be set each time there is the connection request from the source device. Thus, for example, even when confidentiality or a degree of importance is different, the permission or the non-permission can be appropriately set.

In this example, the sink device functions as the group authentication server, and performs management of determining whether or not the sink device gives permission for the outdoor use. However, a management device (for example, a management server) that manages the permission and the non-permission of the outdoor use in association with the source device may be newly installed, and the management of determining whether or not permission for the outdoor use is given may be performed through the management device.

When the outdoor use information for giving the permission for the outdoor use is included in the connection permission information (step S844), the control unit of the information processing device 610 causes information indicating that the outdoor use is permitted to be displayed on the display unit 611 (step S845). For example, information indicating that the use within the same floor (the range that the radio waves of the access point 601 reach) and the outdoor use are permitted can be displayed in a pop-up manner, and the user can be notified of it.

Then, the control unit of the information processing device 610 transmits the capability information related to the information processing device 610 and public network service information to the information processing device 630 via the access point 601 (step S846). Here, the public network service information is information that enables the information processing device 610 to use a public network service, and includes, for example, a connection destination telephone number (a telephone number of the information processing device 610), an authentication password, or the like.

Then, the control unit of the information processing device 610 performs a communication process (step S847). In the communication process, the process (steps S825 to S837) illustrated in FIG. 30 is performed.

Then, the control unit of the information processing device 610 determines whether or not the user has moved to the outside of the radio wave transfer range of the access point 601 (step S848). Then, when the user has not moved to the outside of the radio wave transfer range of the access point 601 (step S848), the process returns to step S847.

When the user has moved to the outside of the radio wave transfer range of the access point 601 (step S848), the control unit of the information processing device 610 confirms whether or not the user desires the outdoor use continuously (step S849). For example, the user may perform an operation (for example, a communication end manipulation) of disconnecting the connection with the sink device. Thus, it is confirmed whether or not the user desires the outdoor use continuously.

For example, the control unit of the information processing device 610 causes a pop-up screen including information indicating that the user has moved to the outside of the radio wave transfer range of the access point 601 and a selection button for selecting whether or not the user desires the outdoor use continuously to be displayed on the display unit 611. Then, the control unit of the information processing device 610 determines whether or not the selection button for selecting the continuous outdoor use has been pressed on the pop-up screen (step S849). In other words, the control unit of the information processing device 610 determines whether or not the continuous use in a place after movement has been selected (step S849). When the continuous use in the place after the movement has not been selected (step S849), the operation of the data transmission process ends.

As described above, when the outdoor use information (permission information) for giving the permission for the outdoor use has been received, the control unit of the information processing device 610 performs control such that the interchange with the information processing device 630 via the access point other than the access point 601 or the base station is performed. In this case, the control unit of the information processing device 610 can perform control such that at least one of image data and audio data is received from the information processing device 630 via the access point other than the access point 601 or the base station and output.

In this example, the confirmation of the continuous outdoor use is performed each time the movement to the outside of the radio wave transfer range of the access point 601 is detected, but the presence or absence of the continuous outdoor use may be set in advance. By setting the presence or absence of the continuous outdoor use in advance as described above, switching between the use within the same floor and the outdoor use can be automatically performed seamlessly.

When the continuous use in the place after the movement is selected (step S849), the information processing device 630 performs the connection process via the base station installed in the place after the movement (step S850). For example, the control unit of the information processing device 630 determines whether or not the information processing device 610 has moved to the outside of the radio wave transfer range of the access point 601. Then, when the information processing device 610 has moved to the outside of the radio wave transfer range of the access point 601, the control unit of the information processing device 630 performs the connection process for establishing the connection with the information processing device 610 via the base station installed in the place after the movement. For example, when the telephone number is included in the public line service information received from the information processing device 610, the control unit of the information processing device 630 originates a call to the information processing device 610 via the public network based on the telephone number. Then, the control unit of the information processing device 610 performs the connection process with the information processing device 630 via the public network.

Here, when the user has moved to the outside of the radio wave transfer range of the access point 601, the user owning the information processing device 610 may not view the display unit 632 of the display device 631 and audio output from the display device 631 may be hardly audible. In this regard, the information processing device 630 performs an interchange for confirming whether or not the information processing device 610 can receive an image and audio at a point in time at which the connection with the information processing device 610 is established via the public network. Then, the information processing device 630 determines whether the information processing device 610 can receive both or either of the image and the audio.

Based on the determination result, the information processing device 630 performs the data communication (the image data and the audio data) with the information processing device 610. In other words, the control unit of the information processing device 610 performs the data communication (the image data and the audio data) with the information processing device 630 via the public network. In the data communication, a two-way interchange is performed between the information processing device 610 and the information processing device 630.

For example, the control unit of the information processing device 630 transmits at least one of the display screen displayed on the display unit 632 of the display device 631 and the audio output from the display device 631. In the case of outdoor places, it may be difficult to view the display screen displayed on the display unit 611 of the information processing device 610. In this case, only the audio may be transmitted. Data to be transmitted can be configured to be modified by the user of the information processing device 610.

Further, when the two-way data interchange is performed between the information processing device 610 and the information processing device 630, the information processing device 630 may confirm a transmission path (for example, a band or a communication state) to the information processing device 610 via the public network. Then, the information processing device 630 may switch data to be transmitted based on the confirmation result. For example, when a large-capacity transmission path is secured, the information processing device 630 transmits both of the image data and the audio data. Further, for example, when the large-capacity transmission path is not secured, the information processing device 630 reduces an amount of image data by transcoding or transmits only the audio data.

Then, the control unit of the information processing device 610 determines whether or not the connection with the information processing device 630 via the public network is continuously used (step S852). For example, the control unit of the information processing device 610 causes a display screen for selecting whether or not the connection with the information processing device 630 via the public network is continuously used to be displayed (consistently or regularly) on the display unit 611. Then, based on the selection manipulation in the display screen, the control unit of the information processing device 610 can determine whether or not the connection with the information processing device 630 via the public network is continuously used.

When the connection with the information processing device 630 via the public network is continuously used (step S852), the process returns to step S851. When the connection with the information processing device 630 via the public network is not continuously used (step S852), the control unit of the information processing device 610 disconnects the connection with the information processing device 630 via the public network (step S853).

When the outdoor use information indicating that the outdoor use is not permitted is included in the connection permission information (step S844), the control unit of the information processing device 610 causes information indicating that the outdoor use is not permitted to be displayed on the display unit 611 (step S854).

Then, the control unit of the information processing device 610 transmits the capability information related to the information processing device 610 to the information processing device 630 via the access point 601 (step S855).

Then, the control unit of the information processing device 610 performs the communication process (step S856). In the communication process, the process (steps S825 to S837) illustrated in FIG. 30 is performed.

Then, the control unit of the information processing device 610 determines whether or not the user has moved to the outside of the radio wave transfer range of the access point 601 (step S857). Then, when the user has not moved to the outside of the radio wave transfer range of the access point 601 (step S857), the process returns to step S856. When the user has moved to the outside of the radio wave transfer range of the access point 601 (step S857), the process proceeds to step S853.

As described above, when the sink device and a plurality of source devices share information, the information can be interchanged regardless of the position of the source device. For example, even when the student owning the information processing device 610 has moved to the outside of the radio wave arrival range 605 of the access point 601, the information processing device 610 can be connected to the information processing device 630 via the base station. For example, the student may move from the classroom in which a presentation has been given to a laboratory or a place outside a university. Further, for example, when the communication system 600 is installed in an office, a salesman may go out of a conference room in which a presentation has been given. In this case, the salesman can listen to details of a conference outside (for example, in a train).

In the example illustrated in FIGS. 31 and 32, the management based on the WebSocket is not limited to the access point and the Wi-Fi CERTIFIED Miracast and can be performed even in switching with the public line. For example, when the public line is used, the management based on the WebSocket may be performed on the public line.

3. THIRD EMBODIMENT

In the second embodiment of the present technology, the example in which the source device is connected to the sink device or the access point through the manipulation of the user or the operation of the user has been described.

Here, the source device may be connected to the access point or the sink device using the wireless LAN, and then the connection may be disconnected. In this case, the connection setting of the wireless LAN may be stored in the source device even after the connection is disconnected. In this case, the source device may be automatically connected to the access point or the sink device even if the user owning the source device does not perform a setting manipulation for connection or the like.

In this regard, in the third embodiment of the present technology, an example in which the source devices are automatically connected to the access point or the sink device will be described. In an environment in which the source device is automatically connected to the access point or the sink device, there may be a plurality of access points connected to various kinds of sink devices. Thus, by continuously maintaining the connection of the source device to the plurality of access points through soft handover, such an environment is implemented.

First, an example in which the source device is automatically connected to the access point will be described. For example, a case in which it is automatically connected to a private wireless LAN continuously is assumed.

[Operation Example of Information Processing Device (Source Device)]

Figure 33:
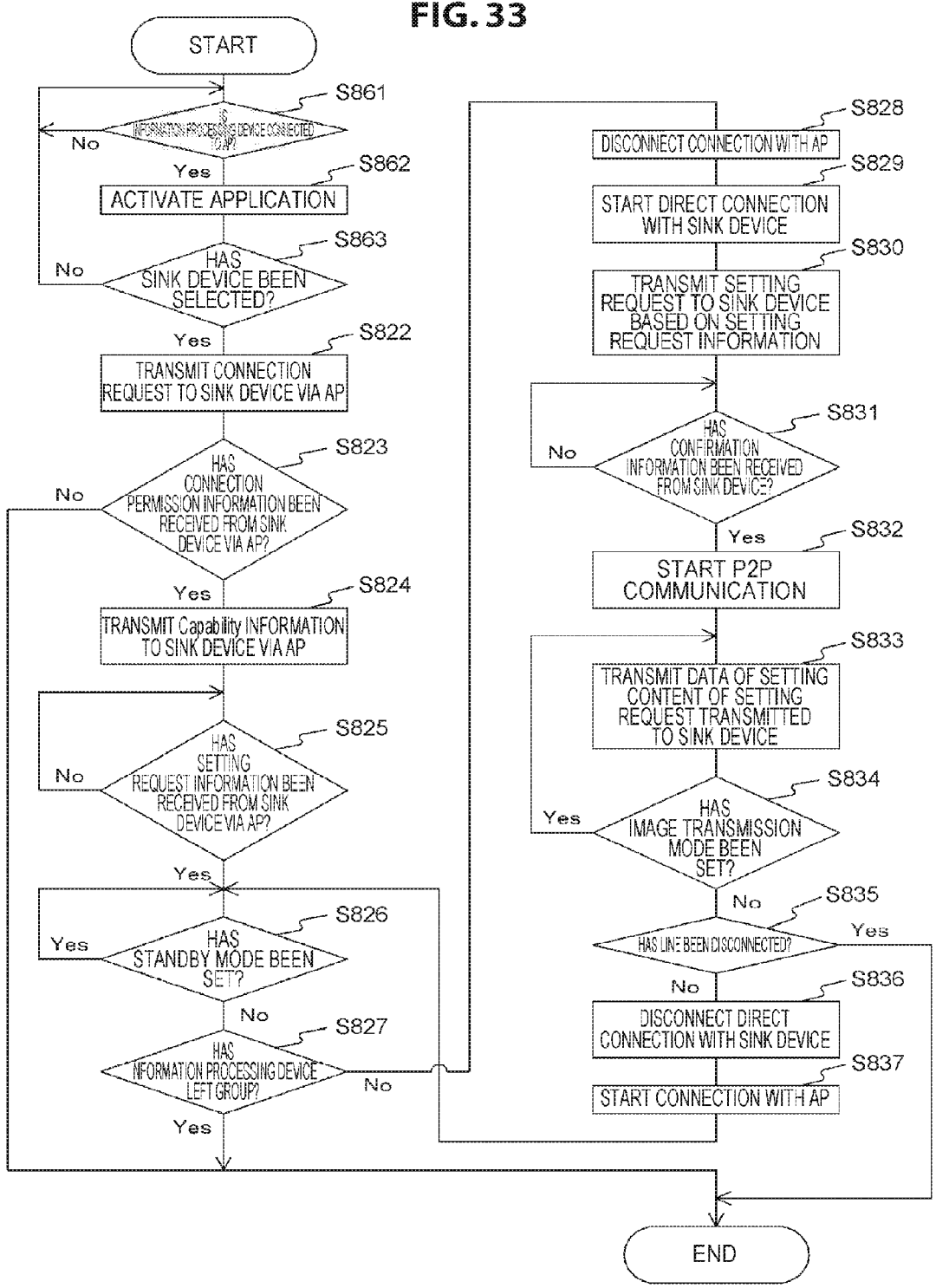
FIG. 33 is a flowchart illustrating an example of a processing procedure of a data transmission process performed by the information processing device 610 according to the third embodiment of the present technology.

FIG. 33 is a flowchart illustrating an example of a processing procedure of a data transmission process performed by the information processing device 610 according to the third embodiment of the present technology. The example illustrated in FIG. 33 is a modified example of FIG. 30, parts that are common to FIG. 30 are denoted by the same reference numerals, and thus a description thereof is partially omitted.

First, the information processing device 610 is automatically handed over and connected to the access point installed in the place in which the information processing device 610 is located (step S861). For example, the user owning the information processing device 610 may move to a specific floor to participate in the group. In this environment, the information processing device 610 activates an application (step S862). After the activation, the control unit of the information processing device 610 attempts the device discovery process for a sink device that is desired to be connected.

A plurality of sink devices corresponding to the activated application may be discovered through the device discovery process. In this case, the selection screen for selecting a desired sink device from a plurality of discovered sink devices may be displayed on the display unit 611 of the information processing device 610, and the desired sink device may be selected on the selection screen by the manipulation of the user (step S863). A device closest to the source device among a plurality of discovered sink devices may be automatically selected and connected (step S863).

Next, an example in which the source device is automatically connected to the sink device and access point will be described. For example, the connection setting of the sink device is assumed to be stored in the source device, and the source device is assumed to move into the radio wave arrival range of the sink device and be automatically connected to the sink device.

[Operation Example of Information Processing Device (Source Device)]

Figure 34:
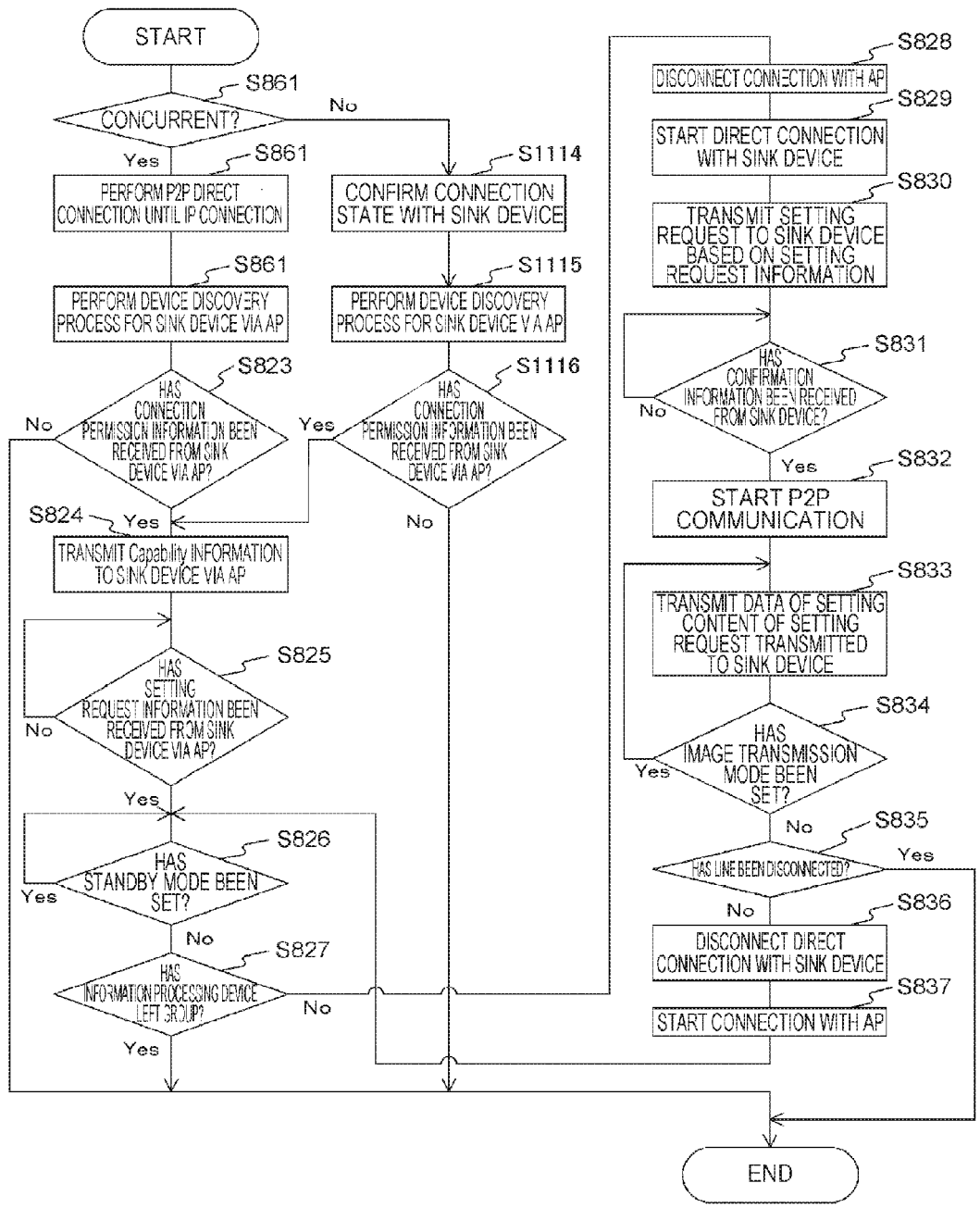
FIG. 34 is a flowchart illustrating an example of a processing procedure of a data transmission process performed by the information processing device 610 according to the third embodiment of the present technology.

FIG. 34 is a flowchart illustrating an example of a processing procedure of the data transmission process performed by the information processing device 610 according to the third embodiment of the present technology. The example illustrated in FIG. 34 is a modified example of FIG. 30, parts that are common to FIG. 30 are denoted by the same reference numerals, and thus a description thereof is partially omitted.

First, the control unit of the information processing device 610 determines whether or not the information processing device 610 has a concurrent function (a time division concurrent function or a simultaneous use concurrent function) as a wireless LAN function (step S871). When the information processing device 610 has the concurrent function, the information processing device 610 can establish the time division connection or the simultaneous connection with both of the access point and the sink device without performing disconnection switching of the access point and the sink device.

When the information processing device 610 has the concurrent function (step S871), the control unit of the information processing device 610 performs a setting (a setting up to acquisition of an IP address) up to a layer 3 through the automatic connection (step S872). Then, the control unit of the information processing device 610 makes an attempt to establish the connection with the sink device via the access point (step S873). Here, when the connection with the sink device is established based on both links of the connection via the access point and the direct P2P connection, it is desirable that the device discovery process be performed through only one of the connection via the access point and the direct P2P connection. For example, a priority may be given to the connection via the access point, only link connection may be maintained for the direct P2P connection, and the image transmission according to the Wi-Fi CERTIFIED Miracast may be stopped. In this case, in the image transmission mode, a high-speed operation can be performed during a next switching period of time without wasting the frequency band used in the Wi-Fi CERTIFIED Miracast.

When the information processing device 610 has no concurrent function (step S871), the control unit of the information processing device 610 confirms the connection state with the sink device (step S874). Here, for example, when the connection with the sink device is the direct P2P connection, the direct P2P connection is first disconnected, and switching to the connection via the access point is performed. Further, when the connection with the sink device is the connection via the access point, the connection is maintained. Further, when the information processing device 610 has no concurrent function, the port information and the IP information of the connection state are retained in the information processing device 710 and diverted.

Then, the control unit of the information processing device 610 performs the device discovery process via the access point (step S875). After the device discovery process, the control unit of the information processing device 610 determines whether or not the connection permission information has been received from the sink device via the access point (step S876).

Here, in an environment in which the number of participating devices is small, direct P2P connection may be maintained without change. In this case, when the connection permission information has been received from the sink device via the access point (step S876), the process proceeds to step S828.

As described above, it is possible to appropriately detect the current setting information without the user worrying about the connection setting. Further, it is possible to perform association so that the same operation as in the second embodiment of the present technology is performed.

As described above, even in the device connection management, since the line via the access point is consistently connected, it is unnecessary to switch the management based on the WebSocket between the access point and the Wi-Fi CERTIFIED Miracast. Thus, it is possible to consistently perform the management through the link via the access point.

4. FOURTH EMBODIMENT

The first to third embodiments of the present technology have been described in connection with the example in which a plurality of source devices are connected with one sink device. However, the first to third embodiments of the present technology can be applied even when one source device is connected with a plurality of sink devices. Further, the first to third embodiments of the present technology can be applied even when a plurality of source devices are connected with a plurality of sink devices.

In this regard, the fourth embodiment of the present technology will be described in connection with an example in which one source device is connected with a plurality of sink devices.

[Configuration Example of Communication System]

Figure 35:
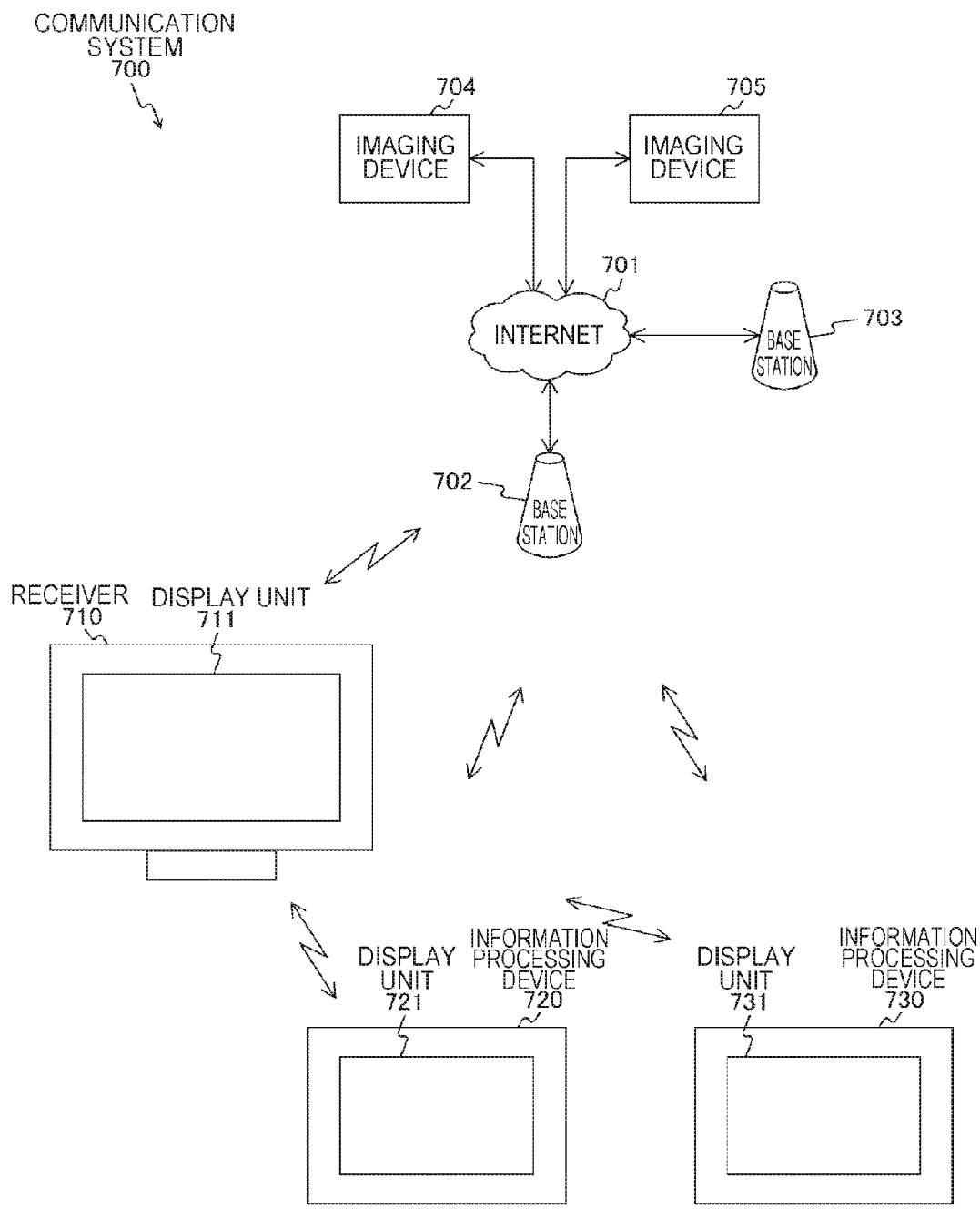
FIG. 35 is a diagram illustrating a system configuration example of a communication system 700 according to the fourth embodiment of the present technology.

FIG. 35 is a diagram illustrating a system configuration example of a communication system 700 according to a fourth embodiment of the present technology.

The communication system 700 includes the Internet 701, base stations 702 and 703, imaging devices 704 and 705, a receiver 710, and information processing devices 720 and 730.

The base stations 702 and 703 are a base station that enables the receiver 710 and the information processing devices 720 and 730 to be connected to the Internet 701 using wireless communication.

The imaging devices 704 and 705 are an imaging device that photographs a subject and generates image data. The imaging devices 704 and 705 can transmit the generated image data to the receiver 710 and the information processing devices 720 and 730 via the Internet 701.

The receiver 710 is a television receiver (for example, a television receiver with a video recording function) that receives a broadcast wave from each broadcast station and displays an image (a stereoscopic image or a planar image). The receiver 710 is assumed to be an information processing device capable of providing a display environment in which a broadcast and communication are fused as in a hybridcast.

The receiver 710 can transmit various kinds of images (for example, an image input from an external device, an image based on a broadcast wave, an image stored in an internal storage unit, and an image displayed on the display unit 711) to the information processing devices 720 and 730 using wireless communication.

The receiver 710 is assumed to be the transmission side information processing device (the source device), and the information processing devices 720 and 730 are assumed to be the reception side information processing device (the sink device). The receiver 710 is assumed to correspond to the information processing device 200 illustrated in FIG. 2, and the information processing devices 720 and 730 are assumed to correspond to the information processing device 300 illustrated in FIG. 3.

For example, the information processing device 720 can receive image data (for example, image data obtained by photographing a landscape) transmitted from the imaging devices 704 and 705 via the base station 702 and cause an image based on each piece of image data to be displayed on the display unit 721. Similarly, the information processing device 730 can receive image data (for example, image data obtained by photographing a landscape) transmitted from the imaging devices 704 and 705 via the base station 702 and cause an image based on each piece of image data to be displayed on the display unit 731.

The receiver 710 can cause the image based on the broadcast wave received from each broadcast station to be displayed on the display unit 711. The receiver 710 can transmit image data based on the broadcast wave received from each broadcast station to the information processing devices 720 and 730. In this case, the information processing devices 720 and 730 can cause the image based on the broadcast wave to be displayed on the display units 721 and 731, respectively.

The image based on the broadcast wave may not be displayed on the source device and the sink device at the same time due to a copyright issue. In this regard, when the source device (the receiver 710) transmits the image data based on the broadcast wave to be displayed on the sink device (the information processing devices 720 and 730), the image is erased from the source device before the transmission. Another image is prevented from being overwritten on the image (the image based on the broadcast wave) displayed on the sink device.

The image based on the broadcast wave may be an image corresponding to a high-bandwidth digital content protection system (HDCP). For this reason, when the image (the HDCP use image) based on the broadcast wave is displayed on the display unit 721, the information processing device 720 causes another image not to overlap the image based on the broadcast wave. For example, the information processing device 720 causes the images transmitted from the imaging devices 704 and 705 not to be overwritten on the image (the HDCP use image) based on the broadcast wave and displayed.

Further, when an image transmitted from one source device is displayed on a plurality of sink devices, similarly to the first to third embodiments of the present technology, it is possible to notify the sink devices of the display position of the source device in real time and control the display position from the sink device. For example, when the image transmitted from the receiver 710 is displayed on the information processing devices 720 and 730, it is possible to notify the information processing devices 720 and 730 of the display position of the receiver 710 and control the display position from the information processing devices 720 and 730.

For example, the information processing devices 720 and 730 can set a desired image and acquire the image from the receiver 710. For example, the information processing device 720 is assumed to set keyword information (for example, a Japan national football team). In this case, images related to the keyword information (for example, the Japan national football team) are extracted in the receiver 710, and the extracted images are transmitted from the receiver 710 to the information processing device 720. Then, the images related to the keyword information (for example, the Japan national football team) can be displayed on the display unit 721 of the information processing device 720.

[Operation Example when Non-Display Region is Notified of]

As described above, another image is prevented from overlapping the HDCP use image. In this regard, an example in which a region (a non-display region) that does not overlap another image is decided and reported to another device will be described.

First, the description will proceed with an operation example of the source device in the multi-sink environment.

Figure 36:
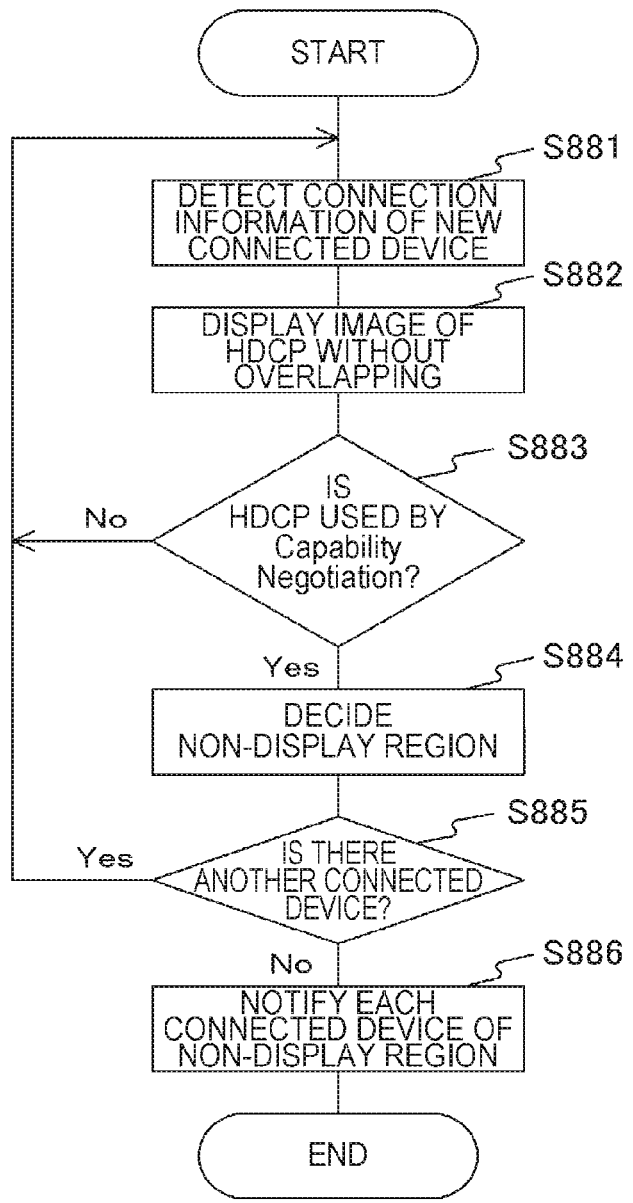
FIG. 36 is a flowchart illustrating an example of a processing procedure of a non-display region notification process performed by a receiver 710 (a source device) according to a fourth embodiment of the present technology.

FIG. 36 is a flowchart illustrating an example of a processing procedure of a non-display region notification process performed by the receiver 710 (the source device) according to the fourth embodiment of the present technology.

First, a control unit of the receiver 710 detects whether or not the sink device that newly participates in has a capability capable of decoding the HDCP at the time of the Capability Negotiation of the sink device connected to the receiver 710 as connection information (step S881).

Then, the control unit of the receiver 710 performs control such that another image except the image of the receiver 710 is not overwritten when the sink device that newly participates in decodes and displays the HDCP at the time of the Capability Negotiation (step S882).

Then, the control unit of the receiver 710 determines whether or not the HDCP is used for the connection between the receiver 710 and the sink device based on the capability information (step S883). When the HDCP is not used for the connection between the receiver 710 and the sink device (step S883), the process returns to step S881.

When the HDCP is used for the connection between the receiver 710 and the sink device (step S883), the control unit of the receiver 710 decide the region (the non-display region) in which the images received from a plurality of source devices are prevented from being displayed to overlap (step S884).

Then, the control unit of the receiver 710 determines whether or not there is another sink device connected to the receiver 710 (step S885). When there is another sink device connected to the receiver 710 (step S885), the process returns to step S881.

When there is another sink device connected to the receiver 710 (step S885), the control unit of the receiver 710 notifies the sink devices of the decided non-display region (step S886).

Next, an operation example of the sink device in the multi-source environment will be described. This operation example will be also described with reference to FIG. 36.

First, a control unit of the information processing device 720 detects the source device that newly participates in uses the HDCP at the time of the Capability Negotiation of the source device connected to the information processing device 720 as the connection information (step S881).

Then, the control unit of the information processing device 720 displays the image without overlapping when the source device that newly participates in uses the HDCP at the time of the Capability Negotiation of the source device connected to the information processing device 720 (step S882).

Then, the control unit of the information processing device 720 determines whether or not the HDCP is used for the connection between the information processing device 720 and the source device based on the capability information (step S883). When the HDCP is not used for the connection between the information processing device 720 and the source device (step S883), the process returns to step S881.

When the HDCP is used for the connection between the information processing device 720 and the source device (step S883), the control unit of the information processing device 720 decides the region (the non-display region) in which the images received from a plurality of source devices are prevented from being displayed to overlap (step S884).

Then, the control unit of the information processing device 720 determines whether or not there is another source device connected to the information processing device 720 (step S885). When there is another source device connected to the information processing device 720 (step S885), the process returns to step S881.

When there is no another source device connected to the information processing device 720 (step S885), the control unit of the information processing device 720 notifies the source devices of the decided non-display region (step S886).

As described above, when the image transmitted from one source device are displayed on a plurality of sink devices, it is possible to notify the sink devices of the display position of the source device in real time. Thus, it is possible to control the display position from the sink device.

5. APPLICATION EXAMPLES

The technology of the present disclosure can be applied to various products. For example, the information processing device 200, 300, 400, 603, 604, 610, 620, 630, 720, 730, and the receiver 710 may be realized as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation device. In addition, the information processing device 200, 300, 400, 603, 604, 610, 620, 630, 720, 730, and the receiver 710 may be realized as a terminal which performs machine-to-machine (M2M) communication (which is also referred to as a machine-type communication (MTC) terminal) such as a smart meter, a vending machine, a remote monitoring device, or a point-of-sale (POS) terminal. Furthermore, the information processing device 200, 300, 400, 603, 604, 610, 620, 630, 720, 730, and the receiver 710 may be a wireless communication module (for example, an integrated circuit module configured in one die) mounted in these terminals.

5-1. First Application Example

Figure 37:
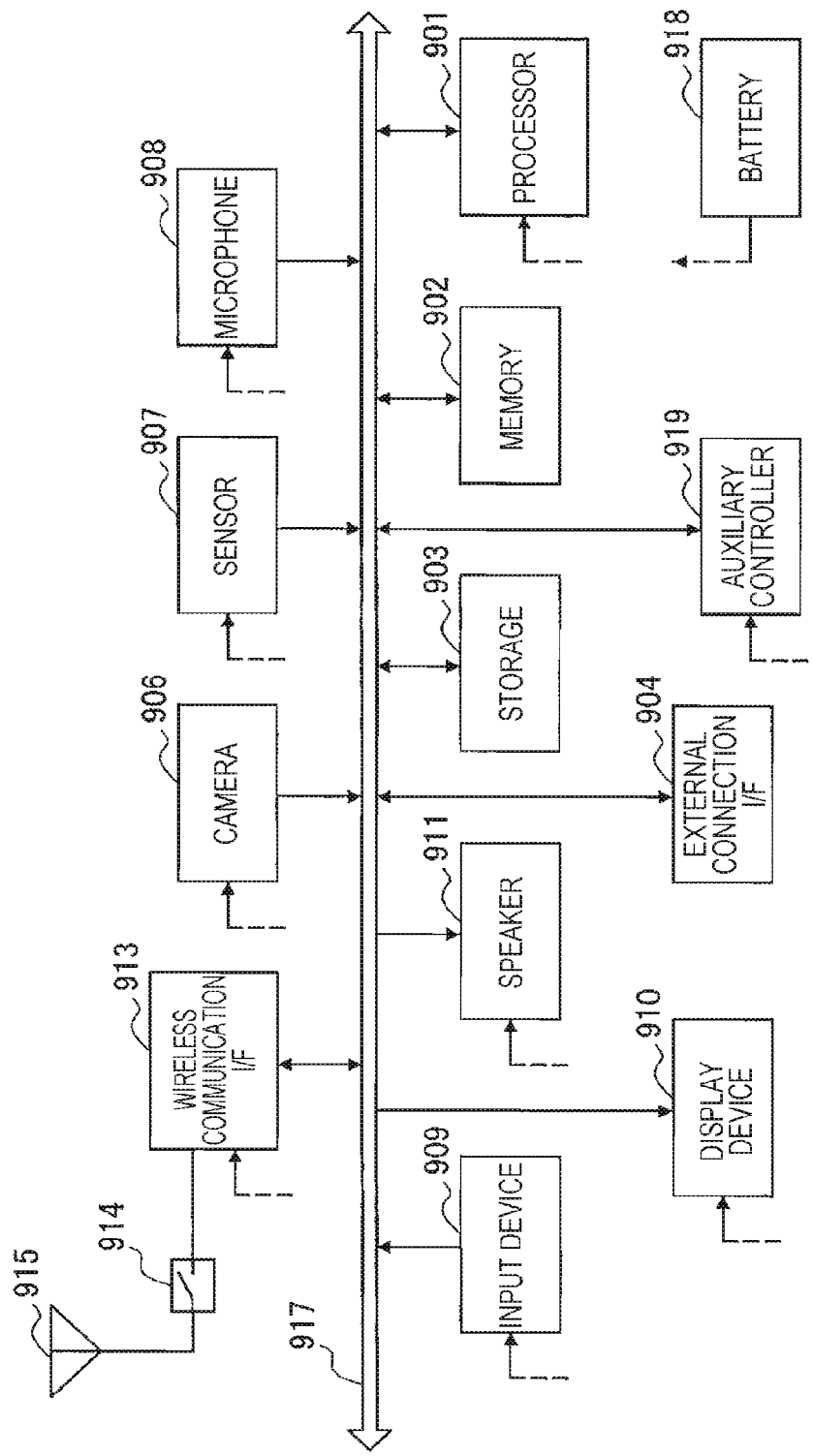
FIG. 37 is a block diagram illustrating an example of a schematic configuration of a smartphone.

FIG. 37 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another device via a wireless LAN access point in an infrastructure mode. In addition, the wireless communication interface 913 can directly communicate with another device in an ad hoc mode or a direct communication mode such as Wi-Fi direct, or the like. In the Wi-Fi Direct, unlike the ad-hoc mode, one of two terminals operates as an access point, but communication is performed directly between the terminals. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals. A wireless communication interface function for establishing a connection with the public line that conforms to IEEE 802.16, the 3GPP specifications (for example, W-CDMA, GSM, WiMAX, WiMAX2, LTE, and LTE-A), or the like may be provided so that communication with the public line is performed.

It should be noted that the smartphone 900 is not limited to the example of FIG. 37 and may include a plurality of antennas (for example, an antenna for a wireless LAN, an antenna for the proximity wireless communication scheme, an antenna for the public line communication, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 37 via feeder lines, which are partially shown as dashed lines in the figure. The auxiliary controller 919 operates a minimum necessary function of the smartphone 900, for example, in a sleep mode.

In the smartphone 900 shown in FIG. 37, the control unit 240, and the control unit 370 described using FIG. 3 may be implemented by the wireless communication interface 913. In addition, at least some of these functions may be implemented by the processor 901 or the auxiliary controller 919.

The smartphone 900 may operate as a wireless access point (a software AP) by executing an access point function at an application level through the processor 901. The wireless communication interface 913 may have a wireless access point function.

5-2 Second Application Example

Figure 38:
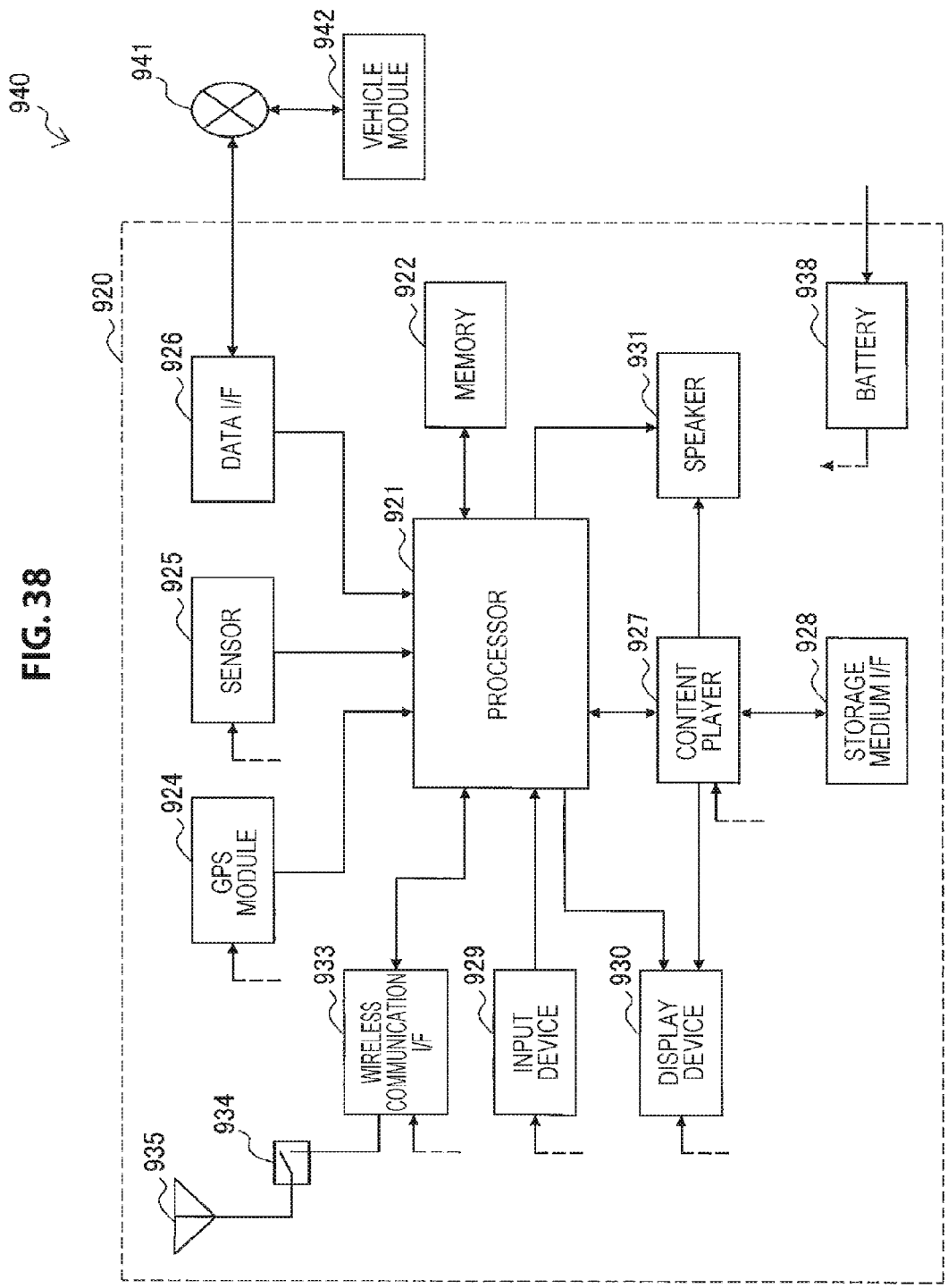
FIG. 38 is a block diagram illustrating an example of a schematic configuration of a car navigation device.

FIG. 38 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another device via a wireless LAN access point in an infrastructure mode. In addition, the wireless communication interface 933 can directly communicate with another device in an ad hoc mode or a direct communication mode such as Wi-Fi Direct. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation device 920 may include a plurality of antennas, not limited to the example of FIG. 38. In that case, the antenna switches 934 may be omitted from the configuration of the car navigation device 920.

The battery 938 supplies power to blocks of the car navigation device 920 illustrated in FIG. 38 via feeder lines that are partially shown as dashed lines in the figure. The battery 938 accumulates power supplied form the vehicle.

In the car navigation device 920 illustrated in FIG. 38, the control unit 240 described using FIG. 2 and the control unit 370 described using FIG. 3 may be implemented by the wireless communication interface 933. At least a part of the functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disc), a memory card, and a Blu-ray disc (registered trademark) can be used.

Effects described in the present description are just examples, the effects are not limited, and there may be other effects.

Additionally, the present technology may also be configured as below.

(1)

An information processing device, including:

a wireless communication unit configured to perform real-time image transmission with at least one sink device according to a wireless fidelity (Wi-Fi) CERTIFIED Miracast specification; and a control unit configured to perform control related to the real-time image transmission based on control information for controlling the information processing device according to the Wi-Fi CERTIFIED Miracast specification, the control information being received from the at least one sink device, wherein the control unit performs control such that on-off switching of a user input back channel (UIBC) for transmitting manipulation information in the sink device that has transmitted the control information is performed when a plurality of pieces of control information are received.

(2)

The information processing device according to (1), wherein the wireless communication unit receives the control information on a transmission control protocol (TCP) session generated between the information processing device and the sink device.

(3)

The information processing device according to (1) or (2), wherein the control of the on-off switching is control of any one of a connection, a disconnection, a start, a stop, validation, and invalidation.

(4)

The information processing device according to (3), wherein the control unit performs control such that the UIBC is validated for a first sink device among the at least one sink device, and the UIBC is invalidated for a second sink device.

(5)

The information processing device according to (4), wherein the wireless communication unit gives a notification indicating that the UIBC is set to be valid to the first sink device, and gives a notification indicating that the UIBC is set to be invalid to the second sink device.

(6)

The information processing device according to (5), wherein the control information is a GET_PARAMETER Response, and the notification is transmitted as SET_PARAMETER.

(7)

The information processing device according to (3), wherein the control unit performs control such that the UIBC is validated for a first sink device among the at least one sink device, and the UIBC is invalidated for all the sink devices except the first sink device among the sink devices that have transmitted the control information.

(8)

The information processing device according to any of (1) to (7), wherein the wireless communication unit receives a plurality of pieces of manipulation information associated with ID information as UIBC information, and the control unit identifies corresponding manipulation information with reference to an ID header included in the ID information.

(9)

The information processing device according to claim 8, wherein the at least one sink device includes a plurality of input devices, and the plurality of pieces of manipulation information are transmitted from the plurality of input devices via the at least one sink device.

The information processing device according to (8).

(10)

The information processing device according to (8) or (9), wherein the wireless communication unit sets one port for a bundle of the plurality of pieces of UIBC information, and performs communication.

(11)

The information processing device according to any of (1) to (10), wherein the wireless communication unit performs communication as a source device.

(12)

An information processing method, including:

a wireless communication process of performing real-time image transmission with at least one sink device according to a wireless fidelity (Wi-Fi) CERTIFIED Miracast specification; and a control process of performing control related to the real-time image transmission based on control information for controlling the information processing device according to the Wi-Fi CERTIFIED Miracast specification, the control information being received from the at least one sink device, wherein the control process includes performing control such that on-off switching of a user input back channel (UIBC) for transmitting manipulation information in the sink device that has transmitted the control information is performed when a plurality of pieces of control information are received.

(13)

An information processing device, including:

a wireless communication unit configured to perform real-time image transmission with at least one source device according to a wireless fidelity (Wi-Fi) CERTIFIED Miracast specification; and a display unit configured to display an image received through the real-time image transmission, wherein the wireless communication unit receives control information related to turning-on or off of a user input back channel (UIBC) for transmitting manipulation information in the information processing device among at least one sink device from a first source device when the first source device among the at least one source device performs the real-time image transmission with the at least one sink device.

Additionally, the present technology may also be configured as below.

(C1)

An information processing device, including:

a wireless communication unit configured to perform real-time image transmission with another information processing device according to a wireless fidelity (Wi-Fi) CERTIFIED Miracast specification; and a control unit configured to perform control such that an image based on image information transmitted from the other information processing device is displayed on a display unit, and a port used for a plurality of communication schemes for interchanging control information related to the image with the other information processing device is set.

(C2)

The information processing device according to (C1), wherein the control unit transmits information designating the plurality of communication schemes using the port to the other information processing device when the port is set on a transmission control protocol (TCP) session generated between the information processing device and the other information processing device.

(C3)

The information processing device according to (C2), wherein the control unit transmits information designating a user input back channel (UIBC) and a WebSocket as the plurality of communication schemes to the other information processing device.

(C4)

The information processing device according to (C3), wherein the control unit acquires image information and audio information transmitted from the other information processing device using the Web Socket, causes an image based on the image information to be displayed on the display unit, and causes an audio based on the audio information to be output from an audio output unit.

(C5)

The information processing device according to any one of (C1) to (C4), wherein the control unit sets a plurality of ports for the plurality of communication schemes as the port used for a plurality of communication schemes.

(C6)

The information processing device according to (C5), wherein the control unit sets the plurality of ports according to a request transmitted from the other information processing device.

(C7)

The information processing device according to any one of (C1) to (C4), wherein the control unit sets one port for the plurality of communication schemes as the port used for a plurality of communication schemes.

(C8)

The information processing device according to any one of (C1) to (C7), wherein the control unit transmits information related to a display form of the image in the display unit to the other information processing device using any one of the plurality of communication schemes, and changes the display form of the image based on control information transmitted from the other information processing device.

(C9)

The information processing device according to (C8), wherein the control information is manipulation information related to a manipulation for changing the display form of the image received in the other information processing device.

(C10)

The information processing device according to any one of (C1) to (C9), wherein the control unit causes the image and information indicating the other information processing device to be displayed on the display unit in association with each other.

(C11)

An information processing device, including:

a wireless communication unit configured to perform real-time image transmission with another information processing device according to a wireless fidelity (Wi-Fi) CERTIFIED Miracast specification; and a control unit configured to perform control such that image information for causing an image to be displayed on a display unit with which the other information processing device is equipped or a display unit connected to the other information processing device is transmitted to the other information processing device, and a port used for a plurality of communication schemes for interchanging control information related to the image with the other information processing device is set.

(C12)

An information processing device, including:

a wireless communication unit configured to perform real-time image transmission with a plurality of information processing devices according to a wireless fidelity (Wi-Fi) CERTIFIED Miracast specification; and a control unit configured to perform control such that an image based on image information transmitted from the plurality of information processing devices is displayed on a display unit, and when a plurality of ports for interchanging control information related to the image are set for the plurality of information processing devices, an information processing device that interchanges the control information is selected among the plurality of information processing devices, and switching of the port for interchanging the control information with the selected information processing device is performed.

(C13)

An information processing device, including:

a wireless communication unit configured to perform real-time image transmission with a plurality of information processing devices according to a wireless fidelity (Wi-Fi) CERTIFIED Miracast specification; and a control unit configured to perform control such that image information for causing an image to be displayed on display units with which the plurality of information processing devices are equipped or display units connected to the plurality of information processing devices is transmitted to the plurality of information processing device, and when a plurality of ports for interchanging control information related to the image are set for the plurality of information processing devices, an information processing device that interchanges the control information is selected among the plurality of information processing devices, and switching of the port for interchanging the control information with the selected information processing device is performed.

(C14)

An information processing device, including:

a wireless communication unit configured to perform data transmission with a plurality of other information processing devices; and a control unit configured to receive control information for controlling the information processing device from the plurality of other information processing devices and select the control information transmitted from an appropriate device.

(C15)

The information processing device according to (C14), wherein the control unit receives the control information on a transmission control protocol (TCP) session generated between the information processing device and the other information processing device.

(C16)

A communication system, including:

first and second information processing devices configured to perform real-time image transmission according to a wireless fidelity (Wi-Fi) CERTIFIED Miracast specification, wherein the first information processing device transmits image information to the second information processing device, and the second information processing device includes a control unit configured to perform control such that an image based on the image information transmitted from the first information processing device is displayed on a display unit, and a port used for a plurality of communication schemes for interchanging control information related to the image with the first information processing device is set.

(C17)

An information processing method, including:

a display process of causing an image based on image information transmitted from another information processing device to be displayed on a display unit according to a wireless fidelity (Wi-Fi) CERTIFIED Miracast specification; and a control process of setting a port used for a plurality of communication schemes for interchanging control information related to the image with the other information processing device.

(C18)

A program causing a computer to execute:

a display process of causing an image based on image information transmitted from another information processing device to be displayed on a display unit according to a wireless fidelity (Wi-Fi) CERTIFIED Miracast specification; and a control process of setting a port used for a plurality of communication schemes for interchanging control information related to the image with the other information processing device.

REFERENCE SIGNS LIST 100 communication system
200 information processing device
201 data transmission system
202 line control system
203 information processing device
210 antenna
220 wireless communication unit
230 control signal reception unit
240 control unit
250 image and audio signal generation unit
260 image and audio compression unit
270 stream transmission unit
300 information processing device
301 the line control system
302 input and output system
310 antenna
320 wireless communication unit
330 stream reception unit
340 image and audio decompression unit
350 image and audio output unit
351 display unit
352 audio output unit
360 user information acquisition unit
361 imaging unit
370 control unit
380 control signal transmission unit
390 management information retention unit 400 information processing device
410 source device
420 sink device
600 communication system
601 access point
602 network
603, 604, 610, 620, 630 information processing device
611 display unit
621 display unit
631 display device
632 display unit
640 control device
643 input and output unit
700 communication system
701 the Internet
702, 703 base station
704, 705 imaging device
710 receiver
711 display unit
720, 730 information processing device
721, 731 display unit
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle module
1100, 1300, 1501 to 1504 sink device
1110, 1310, 1410, 1610 display control unit
1120, 1320, 1420, 1620 mode request content switching unit
1211 to 1214, 1400, 1600 source device
1330, 1630 common input switching unit

The invention claimed is:

1. An information processing device, comprising:
processing circuitry configured to
perform real-time image transmission with at least one sink device according to a Wi-Fi CERTIFIED Miracast specification; and
perform control related to the real-time image transmission based on control information for controlling the information processing device according to the Wi-Fi CERTIFIED Miracast specification, the control information being received from the at least one sink device,
wherein the processing circuitry performs control such that on-off switching of a user input back channel (UIBC) for transmitting manipulation information in the sink device that has transmitted the control information is performed when a plurality of pieces of control information are received.

2. The information processing device according to claim 1, wherein the processing circuitry receives the control information on a transmission control protocol (TCP) session generated between the information processing device and the sink device.

3. The information processing device according to claim 1,
wherein the control of the on-off switching is control of any one of a connection, a disconnection, a start, a stop, validation, and invalidation.

4. The information processing device according to claim 3,
wherein the processing circuitry performs control such that the UIBC is validated for a first sink device among the at least one sink device, and the UIBC is invalidated for a second sink device.

5. The information processing device according to claim 4,
wherein the processing circuitry gives a notification indicating that the UIBC is set to be valid to the first sink device, and gives a notification indicating that the UIBC is set to be invalid to the second sink device.

6. The information processing device according to claim 5, wherein the control information is a GET_PARAMETER Response, and the notification is transmitted as SET_PARAMETER.

7. The information processing device according to claim 3,
wherein the processing circuitry performs control such that the UIBC is validated for a first sink device among the at least one sink device, and the UIBC is invalidated for all the sink devices except the first sink device among the sink devices that have transmitted the control information.

8. The information processing device according to claim 1,
wherein the processing circuitry receives a plurality of pieces of manipulation information associated with ID information as UIBC information, and identifies corresponding manipulation information with reference to an ID header included in the ID information.

9. The information processing device according to claim 8,
wherein the at least one sink device includes a plurality of input devices, and
the plurality of pieces of manipulation information are transmitted from the plurality of input devices via the at least one sink device.

10. The information processing device according to claim 8,
wherein the processing circuitry sets one port for a bundle of the plurality of pieces of UIBC information, and performs communication.

11. The information processing device according to claim 1,
wherein the wireless communication unit performs communication as a source device.

12. An information processing method, comprising:
a wireless communication process of performing real-time image transmission with at least one sink device according to a Wi-Fi CERTIFIED Miracast specification; and
a control process of performing control related to the real-time image transmission based on control information for controlling the information processing device according to the Wi-Fi CERTIFIED Miracast specification, the control information being received from the at least one sink device,
wherein the control process includes performing control such that on-off switching of a user input back channel (UIBC) for transmitting manipulation information in the sink device that has transmitted the control information is performed when a plurality of pieces of control information are received.

13. An information processing device, which acts as a sink device, comprising:
processing circuitry configured to
perform real-time image reception with at least one source device according to a Wi-Fi CERTIFIED Miracast specification; and
a display configured to display an image received through the real-time image transmission,
wherein the processing circuitry transmits control information to the at least one source device, the control information related to turning-on or off of a user input back channel (UIBC) for receiving manipulation information from the at least one source device, when the at least one source device performs the real-time image transmission with the information processing apparatus and based on a display state of an image received from the at least one source device.

* * * * *